United States Patent [19]

Kitahashi et al.

[11] Patent Number: 5,799,701

[45] Date of Patent: Sep. 1, 1998

[54] METHOD OF AND AN APPARATUS FOR LINING A PIPELINE

[75] Inventors: Naoki Kitahashi; Yasushi Kitayama, both of Shiga; Eiki Akimoto, Iruma; Hamao Yamashiro, Sayama, all of Japan

[73] Assignees: Sekisui Kagaku Kogyo Kabushiki Kaisha, Osaka; Adachi Construction Industry Co., Ltd., Tokyo, both of Japan

[21] Appl. No.: 687,431

[22] PCT Filed: Aug. 25, 1995

[86] PCT No.: PCT/JP95/01689

§ 371 Date: Aug. 9, 1996

§ 102(e) Date: Aug. 9, 1996

[87] PCT Pub. No.: WO96/06296

PCT Pub. Date: Feb. 29, 1996

[30] Foreign Application Priority Data

| Aug. 25, 1994 | [JP] | Japan | 6-224125 |
| Jan. 26, 1995 | [JP] | Japan | 7-029937 |
| Jul. 21, 1995 | [JP] | Japan | 7-206810 |
| Aug. 18, 1995 | [JP] | Japan | 7-232084 |

[51] Int. Cl.$^6$ .................................... F16L 55/18
[52] U.S. Cl. ............... 138/97; 138/98; 138/154; 405/150.1
[58] Field of Search ............. 138/97, 98, 154; 405/150.1

[56] References Cited

U.S. PATENT DOCUMENTS

| 3,122,115 | 2/1964 | Siegwart | 138/154 X |
| 3,606,670 | 9/1971 | Wienand et al. | 138/154 X |
| 4,687,690 | 8/1987 | Menzel | 138/154 X |
| 4,995,929 | 2/1991 | Menzel | 138/154 X |
| 5,074,943 | 12/1991 | Menzel | 138/154 X |
| 5,101,863 | 4/1992 | Fujii et al. | 138/97 X |

FOREIGN PATENT DOCUMENTS

| 3-180324 | 8/1991 | Japan . | |
| 4-103337 | 4/1992 | Japan . | |
| WO 90/05873 | 5/1990 | WIPO | 138/97 |

*Primary Examiner*—William Stryjewski
*Attorney, Agent, or Firm*—Oblon, Spivak, McClelland, Maier & Neustadt, P.C.

[57] ABSTRACT

Pipelines are lined by inserting a lining pipe R out of a long profile beltlike member to be supplied and wound involutely within the pipeline. A jointing mechanism and a guide roller block are arranged around a mounting frame. The lining pipe R is produced while it rotates on its axis in response to rotary drive by the jointing roller block. An additional lining pipe is formed out of a belt like member to be supplied anew and ahead of the already formed pipe, which is left behind. A rigid mounting frame enables lining pipes of a specific diameter to be formed. Also, a flexible mounting frame helps to cope with a pipeline which is rectangular in cross-section. In addition, the already formed lining pipe can be large in diameter by feeding the belt like member at a higher level than the jointing mechanism which is traveling and sliding the joints of adjoining portions of the already formed beltlike member.

20 Claims, 52 Drawing Sheets

1

METHOD OF AND AN APPARATUS FOR LINING A PIPELINE

BACKGROUND OF THE INVENTION

The present invention is generally related to a method and an apparatus to form a lining layer inside an existing pipe, such as sewerage, water and gas pipes, and more particularly, to the method of and the apparatus for lining by inserting in the existing pipeline a pipe or a so-called lining pipe formed out of a long, beltlike profile member being supplied involutely.

DISCUSSION OF THE BACKGROUND

There is a known art of lining an existing pipe as disclosed, for example, in the Tokkohei 2-12136 gazette. According to the conventional art, lining begins with a pipe making machine installed in a manhole of an existing pipeline and ends in providing by means of thrust force the existing pipe with a lining pipe formed out of an involute beltlike member being continuously supplied.

In the conventional art, however, the longer the lining pipe is, the heavier it will be, and the higher the friction resistance between the exterior of the lining pipe and the wall of the existing pipeline will be, requiring a bigger thrust force. Similarly, as the lining pipe is bigger in diameter, the weight per unit length will increase, needing a much bigger thrust force. This necessitates to provide a large-scale motive power equipment at a higher cost to get a required thrust force.

This suggests that there is something to be desired with the conventional art in coping with long and large-diameter lining pipes.

Another problem with the conventional art lies in that it is not possible to line the curved portions of a pipeline.

It is, therefore, an object of the present invention to provide a lining technique applicable to produce a longer and larger-diameter lining pipe and to a curved pipeline without modifying noticeably the composition of a beltlike member being used in the prior art, starting with a new idea to resolve the above problems with the conventional art.

The present invention was thus produced on such knowledge that a longer, larger-diameter involute lining pipe is available for the lining of a pipeline by leaving it behind.

SUMMARY OF THE INVENTION

The methods and apparatuses according to the present invention are as shown below by construction to attain the above-mentioned purposes.

The first invention is a method of lining a pipeline, and of the composition that a long, beltlike member having joints on both edges thereof is continuously supplied involutely, and the joints adjoining each other are engaged to produce a lining pipe within the pipeline. The lining pipe thus formed is left behind and another lining pipe is additionally formed, using a beltlike member supplied anew and ahead of the lining pipe already formed. There is arranged a jointing roller block consisting of 2 rollers, inner and outer, on the interior and exterior of the edge of the already formed pipe respectively, the outer roller so provided as to come into contact with the exterior of the beltlike member, and the inner roller so provided as to come into contact with the interior of the beltlike member. These two rollers engage with each other where the already formed pipe is closed with the newly supplied beltlike member, and at least the outer roller is driven by rotation.

Depending on the above composition, the joints adjoining each other are jointed together through pinching action of the rollers at the closure position of the beltlike member. The jointing roller block revolves on its axis and moves by means of its own driving force, and a lining pipe is formed while it rotates on its axis.

In addition, the jointing roller block is supported with a mounting frame being substantially rigid, but it is possible to provide an embodiment according to which the roller block is supported without such a mounting frame.

The second invention is a pipeline-lining apparatus to carry out the first invention. The invention is such that there is left behind a lining pipe formed out of a long beltlike member which is continuously supplied involutely and has joints formed on both edges thereof, the joints adjoining each other being engageable with each other, and another lining pipe is additionally formed, using a beltlike member being supplied anew and ahead of the lining pipe already formed.

The apparatus is provided in the axial center of the pipeline and comprised of a mounting frame with extensions radially protruding, a jointing mechanism provided at one of the extensions and composed of an outer roller with a flange to be inserted in a concave groove formed in the exterior of a beltlike member longitudinally and an inner roller to come into contact with the interior of the beltlike member, and a guide mechanism having a guide roller at the tip of another extension of the frame to come into contact with the interior of the beltlike member.

The above composition enables the mounting frame extensions to be the same in length, and the diameter of a formed lining pipe to be decided unconditionally. Produced lining pipes may be assured for degree of roundness by means of the jointing roller and the guide rollers fitted at the extensions being radially protruding.

The third invention is another apparatus for lining a pipeline to implement the first invention. The invention is of the composition that within a pipeline is there left behind a lining pipe formed of a long, beltlike member having joints formed on both edges thereof and continuously being supplied involutely, the adjoining joints being engageable with each other, and another pipe is additionally formed, using a beltlike member supplied anew and ahead of the lining pipe already formed.

The apparatus is provided with a mounting, ring-like frame having a specified width and rigidity and being arranged inside the lining pipe, a plurality of guide rollers being arranged on the outer circumference of the mounting frame with a fixed pitch in the direction of the circumference for contacting the interior of the lining pipe, and a jointing mechanism composed of an outer roller being mounted via the the mounting frame where the lining pipe already formed is closed with a beltlike member being supplied anew, and a jointing mechanism consisting of an outer roller and an inner roller to pinch the beltlike member for jointing. The mounting frame is thus ring-like and formed to have a certain rigidity while the guide rollers help produce lining pipes of a certain diameter in a steady manner. The mounting frame may be brought by segment into and assembled in a pipeline.

The fourth invention is another apparatus for lining a pipeline to implement the first invention, and the following is a description of the composition thereof.

Within a pipeline is there left behind a lining pipe formed out of a long, beltlike member being continuously supplied involutely with joints formed on both edges thereof, the joints adjoining each other being engageable with each other, and another lining pipe is additionally formed, using a beltlike member supplied anew and ahead of the lining pipe already formed.

The apparatus is provided with a mounting frame having a certain rigidity and being arranged inside the lining pipe, a plurality of guide rollers being fitted on the same circumference with a certain pitch via the mounting frame, the guide rollers coming into contact with the inside of the lining pipe, and a jointing mechanism being mounted via the mounting frame at the closure portion of the lining pipe already formed with a newly supplied beltlike member, and being composed of an outer roller and an inner roller, the rollers being used to pinch the beltlike member for jointing. There is also provided a feed roller rotating in the same direction of the apparatus, the exterior of the roller projecting utmost outward.

With the above-mentioned composition, the feed roller comes into contact with the wall of the pipeline. As the roller rotates, the wall reacts on the roller, enabling the roller to give rotary power to the apparatus for its smoother rotation.

If the apparatus is smaller than the inner diameter of the pipeline, the feed roller is supposed to come into contact only with the bottom of the pipeline, but it helps the apparatus rotate gently against the dead weight of the apparatus and the lining pipe.

The fifth invention is another method of lining a pipeline, in particular, a method of lining applicable to a pipeline of differing cross-section. What follows is a description of the method.

Within a pipeline of differing cross-section is there left behind a lining pipe to be made of a long, beltlike member continuously supplied involutely with joints formed on both edges thereof, the joints adjoining each other being engageable with each other, and another lining pipe is additionally formed, using a beltlike member supplied anew and ahead of the lining pipe already formed. The method needs a forming frame having a fixed width and lateral rigidity and being flexible with a link mechanism, the link members of the mechanism being prevented from denting inwardly, guide rollers being arranged around the forming frame to come into contact with the inside of the beltlike member, and a jointing mechanism being arranged at the forming frame and composed of two rollers, outer and inner, the outer roller being designed to come into contact with the exterior of the beltlike member and the inner roller being designed to come into contact with the interior of the beltlike member at the edge thereof respectively.

The rollers rotate and pinch the already formed lining pipe and the newly supplied beltlike member at the closure portion.

As known from the above, the forming frame is flexible and prevented from denting inwardly to form lining pipes in accordance with the inner circumference of the pipeline and suitable for a pipeline of differing cross-section.

The sixth invention is an apparatus for lining a pipeline to embody the method according to the fifth invention. The following is a description of the composition.

The apparatus is designed to additionally produce a lining pipe in a pipeline of differing cross-section, the pipe being formed of a long, beltlike member continuously supplied involutely, and having joints formed on both edges thereof, the adjoining joints being engageable with each other. The apparatus is composed of a forming frame having a fixed width and lateral rigidity and being flexible with a link mechanism, the link members of the mechanism being prevented from denting inwardly, guide rollers being mounted around the forming frame to come in contact with the inside of the lining pipe, and a jointing mechanism being fitted via the forming frame and composed of two rollers, outer and inner, being arranged where the already-formed lining pipe is closed with a newly supplied beltlike member, the outer and inner rollers being designed to pinch the beltlike member for jointing.

The composition as mentioned above allows the forming frame to come with a different section of a pipeline in terms of shape and peripheral length.

The seventh invention is another lining method of a pipeline of differing cross-section. A description of the method is given below.

According to the above-mentioned method, there is within a pipeline of differing cross-section left behind a lining pipe formed out of a long, beltlike member having joints on both edges thereof and being continuously supplied involutely, the joints adjoining each other being engageable with each other, and a new beltlike member is supplied ahead of the already-formed lining pipe to additionally form a lining pipe. There are fitted guide rollers being designed to come into contact with the interior of the beltlike member and arranged around a forming frame having a fixed width and lateral rigidity and being flexible with a link mechanism equipped, and a jointing mechanism being composed of two rollers, outer and inner, the outer roller being designed to come into contact with the exterior of the beltlike member and the inner roller with the interior thereof. The rollers pinch the beltlike member for jointing where the already-formed lining pipe is closed with a newly supplied beltlike member. The rollers are driven by rotation while inside the forming frame is there provided a restricting frame maintaining rigidity and being conform in shape to the pipeline of differing cross-section to have the forming frame turn on the axis of the restricting frame.

For the embodiment as mentioned above, beltlike members have plasticity themselves or plastic material contained beltlike members may be used.

With such a composition, the restricting frame may be selected for shape and peripheral length suitable for the different section of a pipeline. The forming frame is forced by the restricting frame for motion, deforming the beltlike member plastically to produce a lining pipe of differing cross-section suitable for the shape of the restricting frame.

The eighth invention is the apparatus to line a pipeline to implement the seventh invention. A description of the composition is given below.

There is within a pipeline of differing cross-section left behind a lining pipe formed out of a long, beltlike member having joints on both edges thereof and being continuously supplied involutely, the joints adjoining each other being engageable with each other, and a new beltlike member is supplied ahead of the already-formed lining pipe to produce additionally a lining pipe. The apparatus is comprised of a forming frame having a fixed width and lateral rigidity and being flexible with a link mechanism, the link members of the mechanism being prevented from denting inwardly, guide rollers being arranged around the forming frame to come into contact with the inside of the lining pipe, and a jointing mechanism being fitted by way of the forming frame and composed of two rollers, outer and inner, being arranged where the already-formed lining pipe is closed with a newly supplied beltlike member, the outer and inner rollers being designed to pinch the beltlike member for jointing, and a restricting frame being arranged inside the forming frame, maintaining rigidity and having a guide rail being different in section to restrict the forming frame against motion. With this composition, the restricting frame may select a shape and a peripheral length suitable for a pipeline of differing cross-section.

The ninth invention is another method of lining a pipeline, using larger-diameter pipes. A description of the method is given below.

Within a pipeline is there left behind a lining pipe of a long, beltlike member being continuously supplied involutely and having joints formed on both edge thereof, the joints adjoining each other being engageable with each other, and a new beltlike member is supplied ahead of the lining pipe already formed to additionally produce a lining pipe. Such lining pipes are produced with a pipe making machine having a jointing mechanism being fitted via a rigid mounting frame and composed of an outer and an inner roller and arranged where the already-formed lining pipe is closed with the newly supplied beltlike member to pinch the beltlike member for jointing. The pipe making machine enables the already-formed lining pipe to be bigger in diameter by feeding a newly supplied beltlike member at a higher level than the jointing mechanism travels, letting the joints of the beltlike member slide.

As seen from the above, according to the making processes of such lining pipes, beltlike members are fed more than the jointing mechanism travels, letting the joints of the beltlike member of the already-formed lining pipe so that the diameter thereof may be enlarged. The lining pipe is usually enlarged in diameter till it touches the inner wall of the pipeline, and in some cases enlarging in diameter stops before that.

According to this invention, an embodiment is such that a lining pipe is produced as restricted by the mounting frame and the frame is secured in the pipeline before feeding a newly supplied beltlike member to enlarge the diameter of the already-formed lining pipe.

Another embodiment is, in addition, such that a lining pipe is formed while feeding a newly supplied beltlike member to enlarge the diameter of the already-formed lining pipe.

The tenth invention is an in-pipeline lining apparatus to embody the above ninth invention. The apparatus is so constructed as to leave behind within a pipeline a lining pipe formed out of a beltlike member being continuously supplied involutely and having joints formed on both edges thereof, the joints adjoining each other engaged, and to additionally produce a lining pipe using a new beltlike member being supplied ahead of the already-formed lining pipe.

The apparatus is provided with a rigid mounting frame being arranged inside the lining pipe, a plurality of guide rollers being fitted on the same circumference with a fixed pitch via the mounting frame, a jointing mechanism being fitted via the mounting frame and composed of an outer and an inner roller mounted where the already-formed lining pipe is closed with a newly supplied beltlike member to pinch same for jointing, and a plurality of feed rollers being fitted via the mounting frame so as to come into contact with the inner wall of the pipeline and rotate along same, one of the feed rollers at least being the main drive.

BRIEF DESCRIPTION OF DRAWINGS
(The first embodiment)

(Fifth embodiment)

Figure 39:
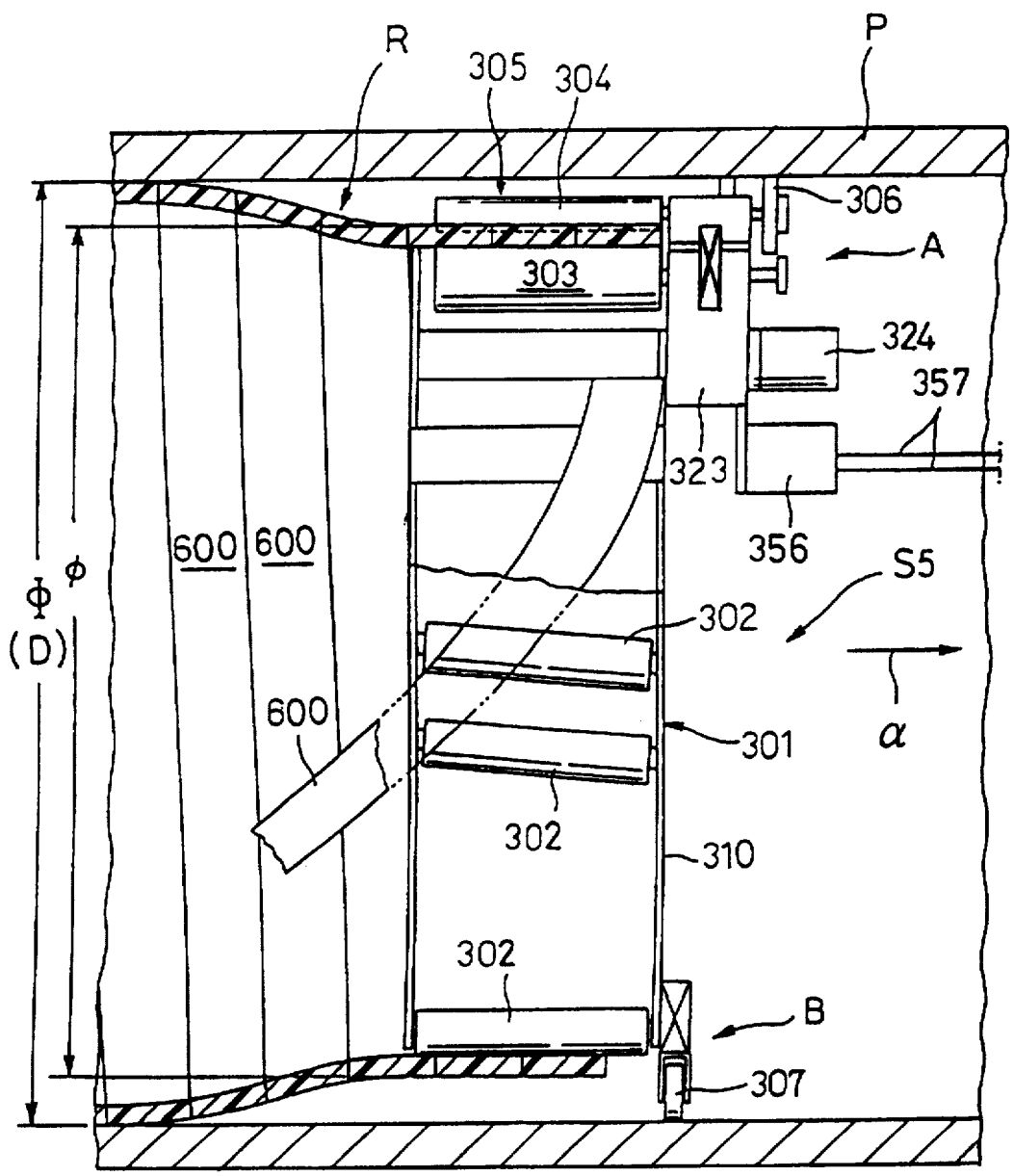

FIG. 39 is a vertical side sectional view of the lining apparatus S5 of still another (fifth) embodiment of the present invention.

Figure 40:
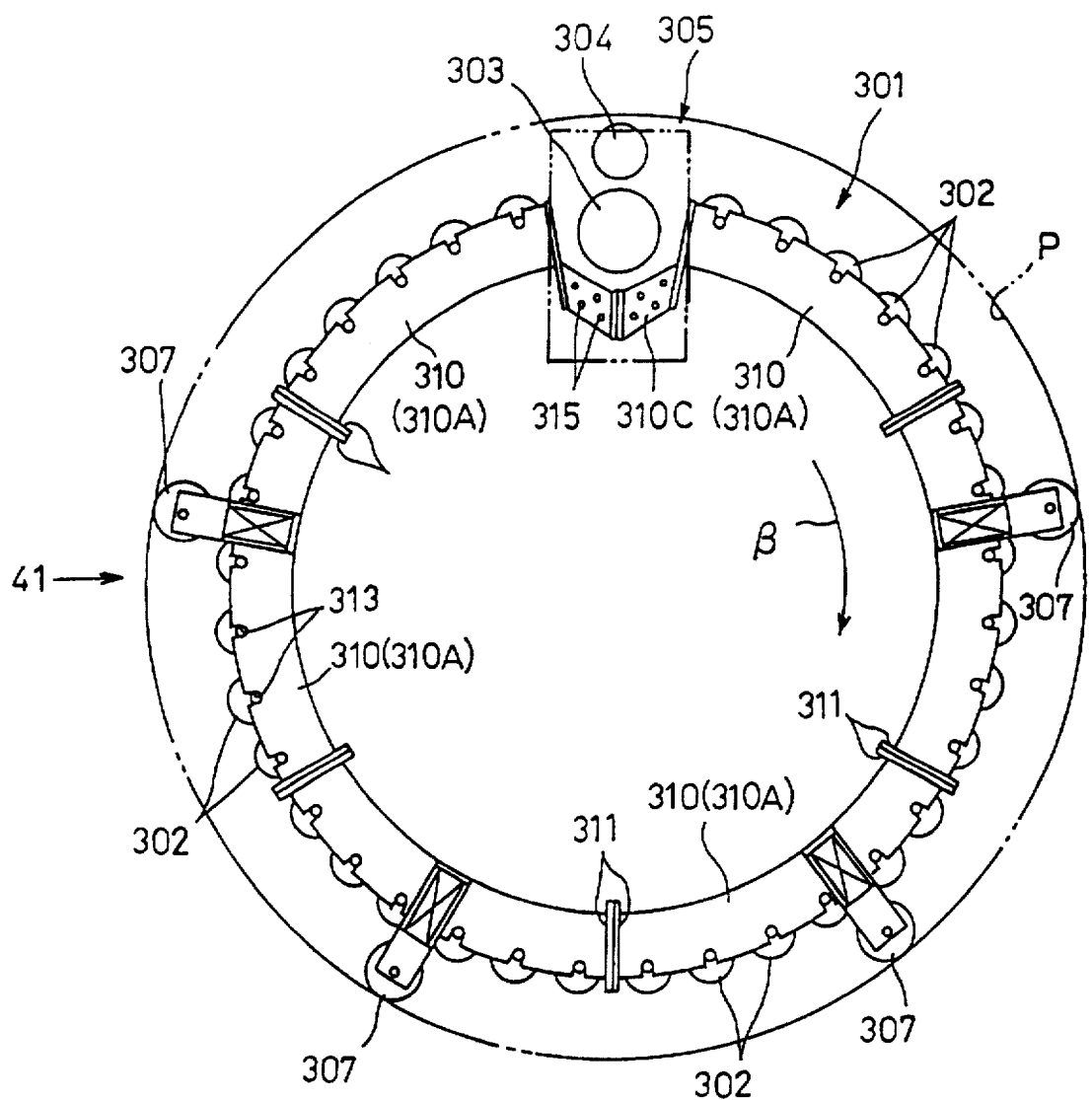

FIG. 40 is an elevation of a mounting frame thereof.

Figure 41:
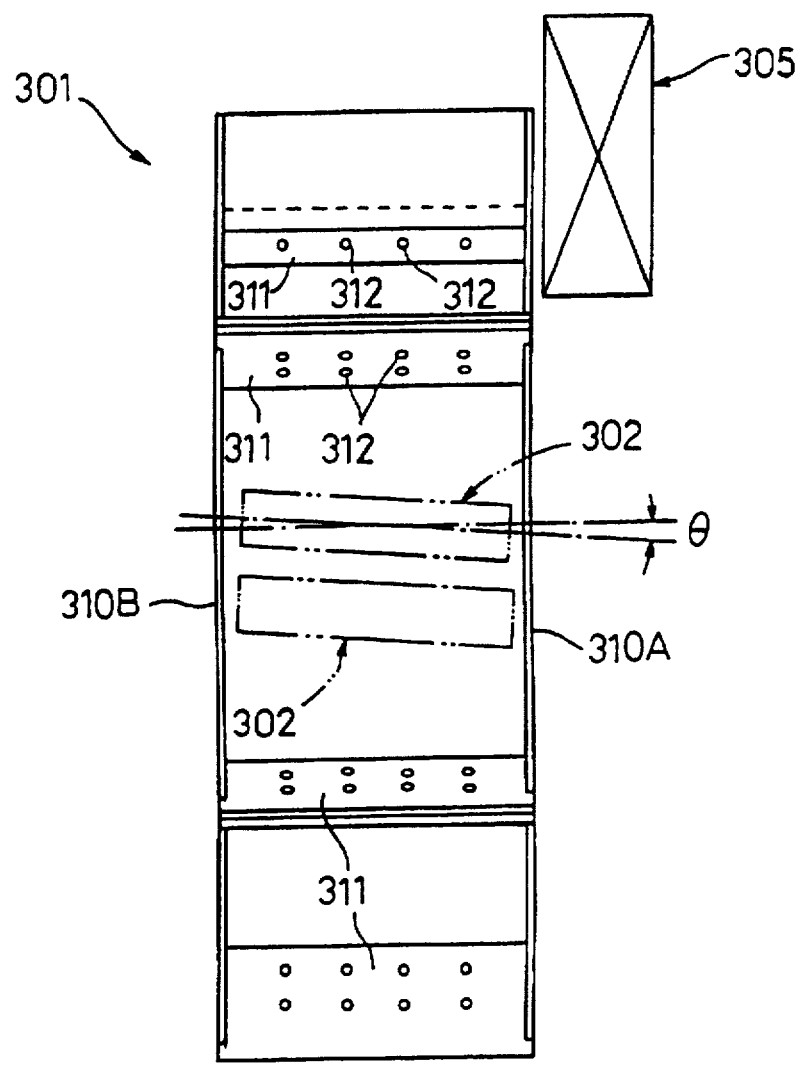

FIG. 41 is a side view of the mounting frame (view taken in the direction of 41 of FIG. 40).

Figure 42:
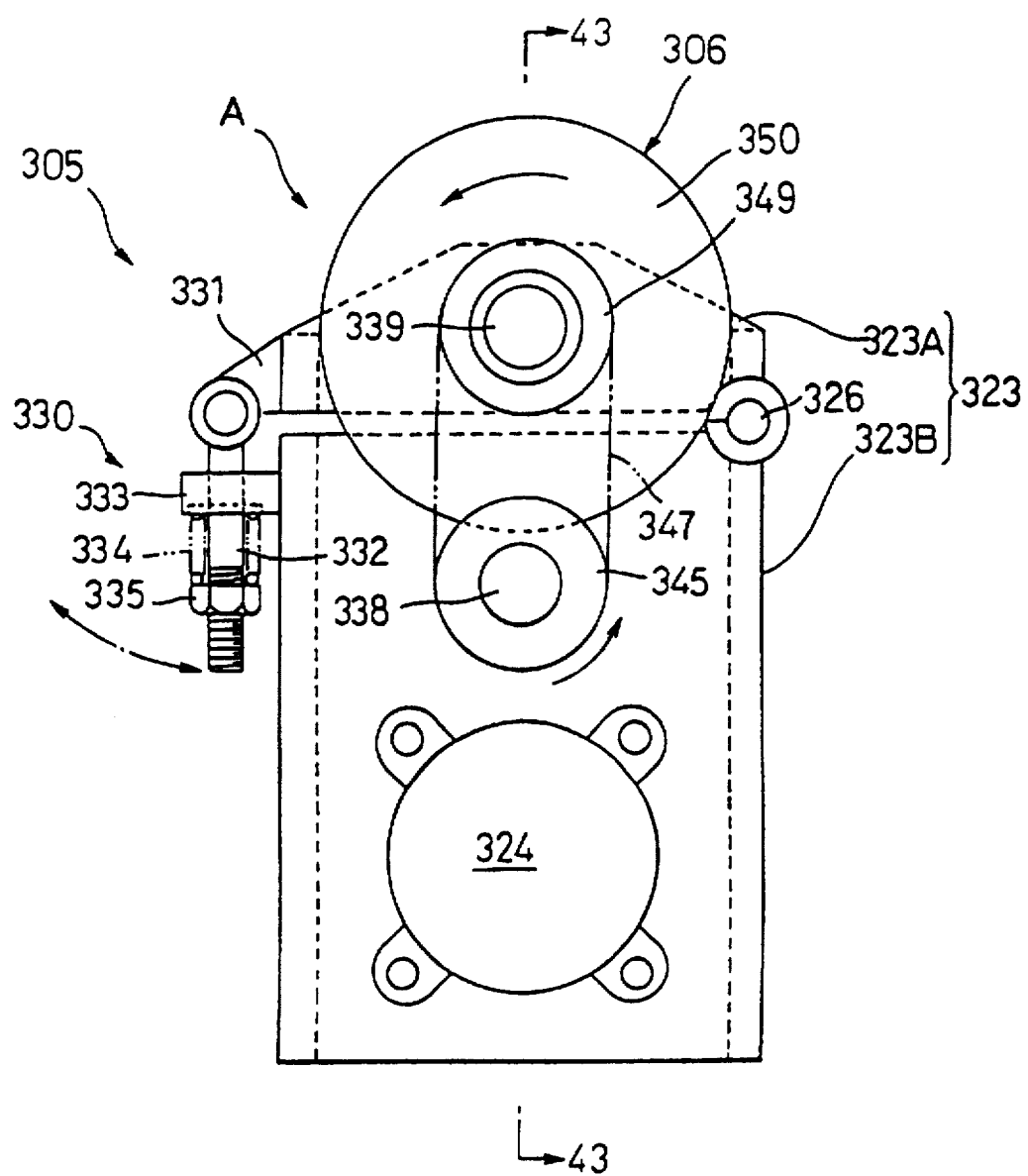
Figure 43:
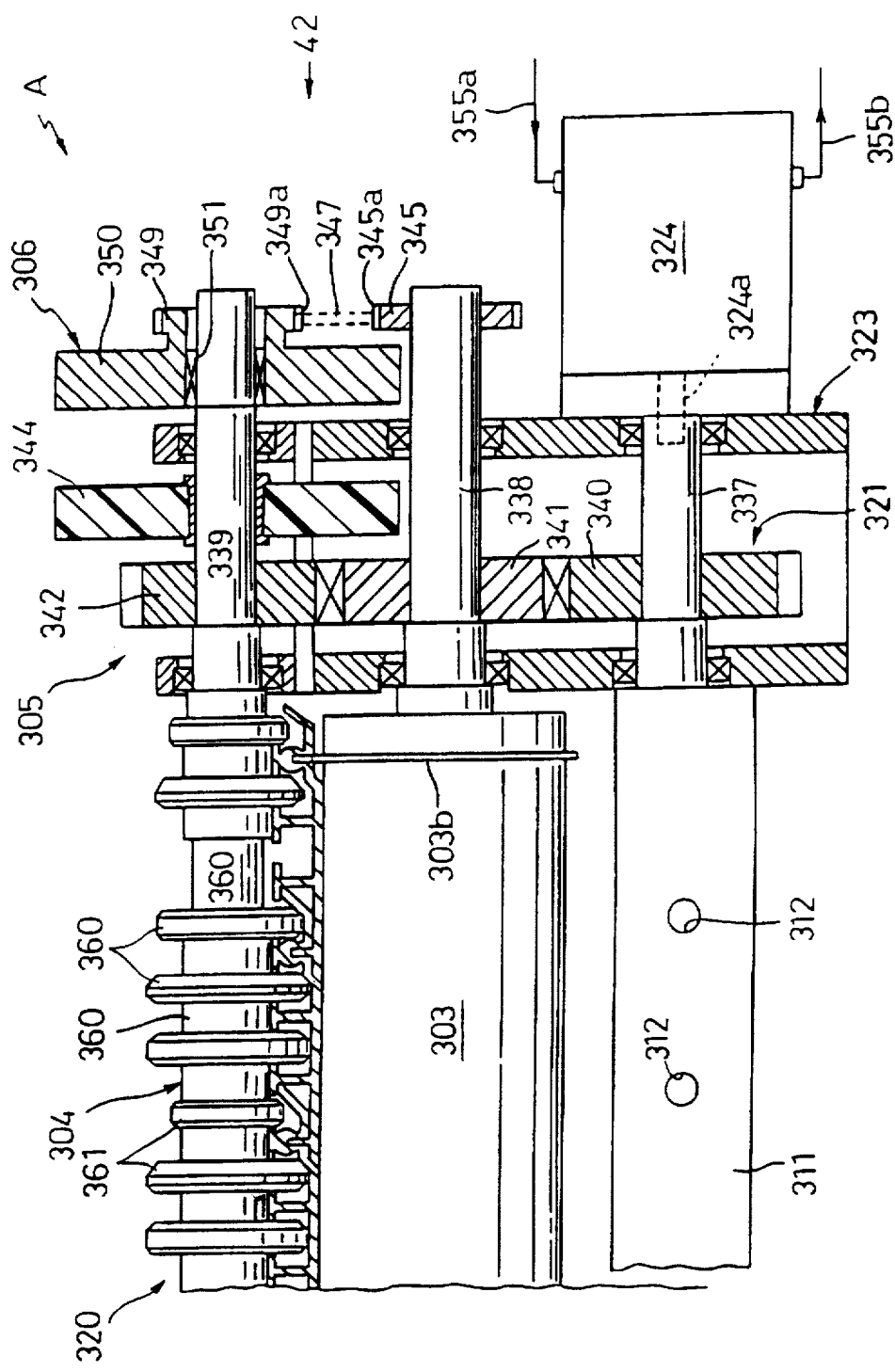

FIG. 42 is an enlarged elevation of a jointing mechanism (view taken in the direction of 42 of FIG. 43).

FIG. 43 is an inner composition view of the jointing mechanism (sectional view taken along the lines 43—43 of FIG. 42).

Figure 44:
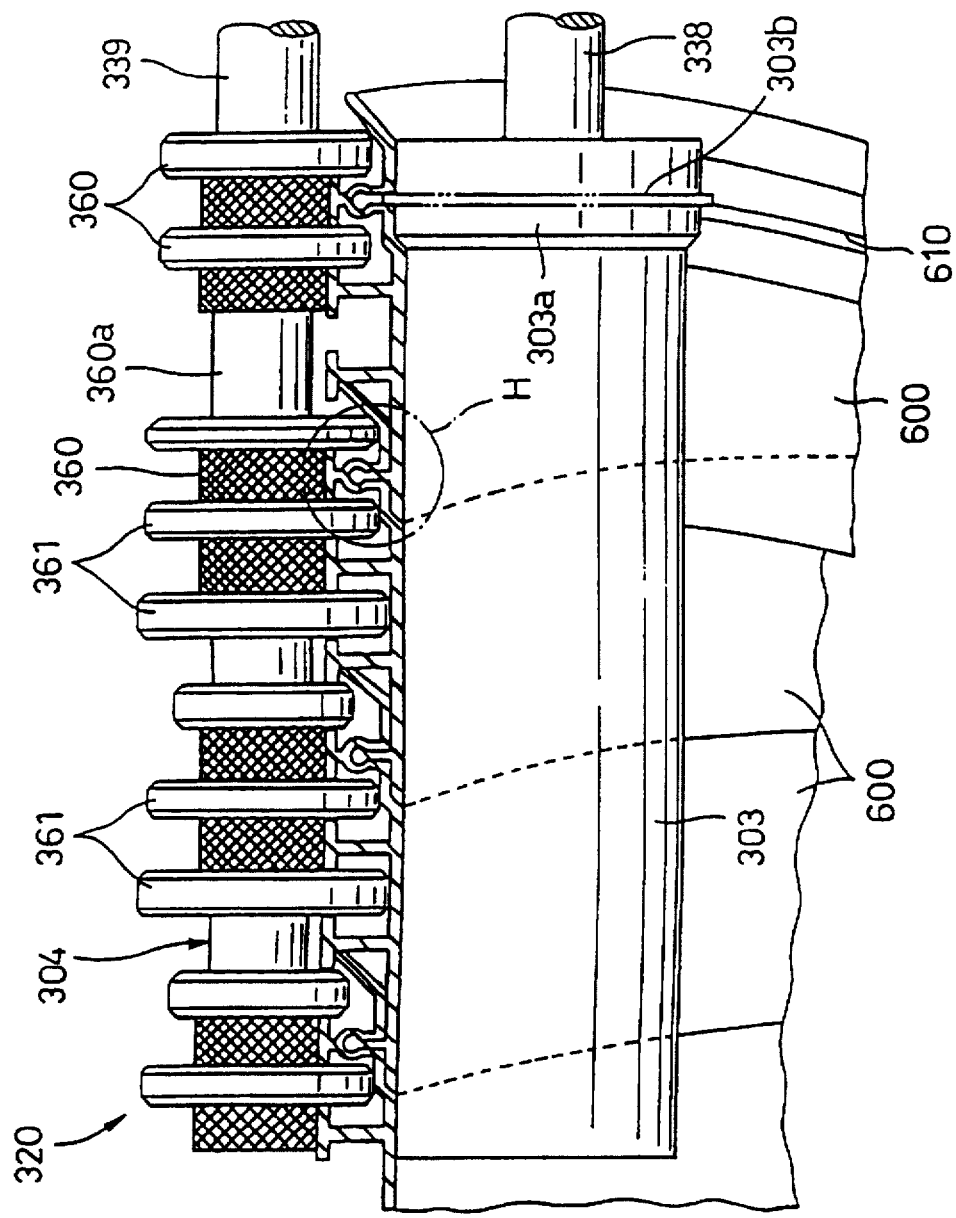

FIG. 44 is an enlarged sectional view of jointing roller block.

Figure 45:
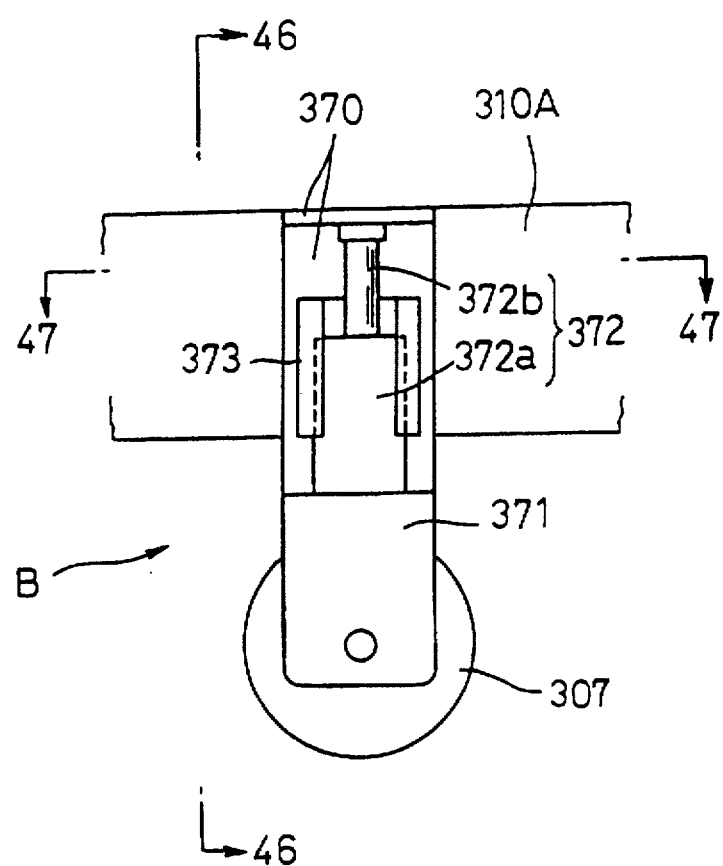

FIG. 45 is a side composition view of a follower feed mechanism.

Figure 46:
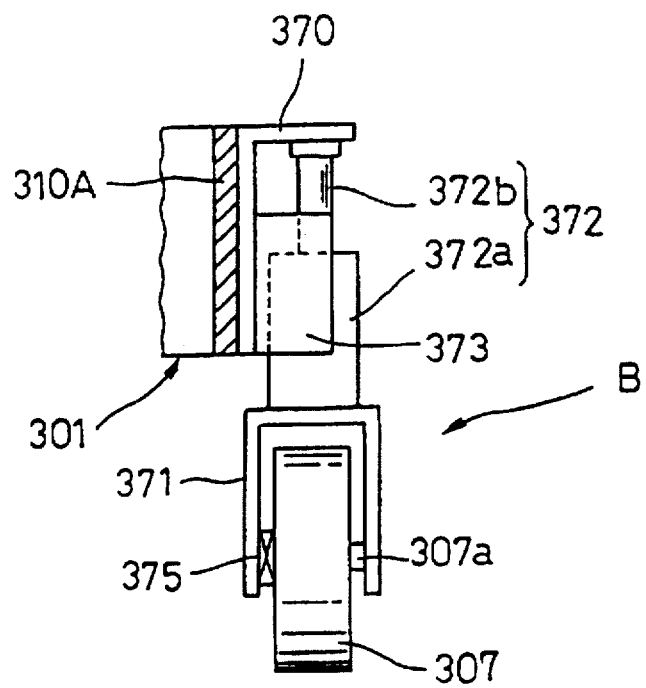

FIG. 46 is a elevation composition view of a follower feed mechanism (sectional view taken along the lines 46—46 of FIG. 45).

Figure 47:
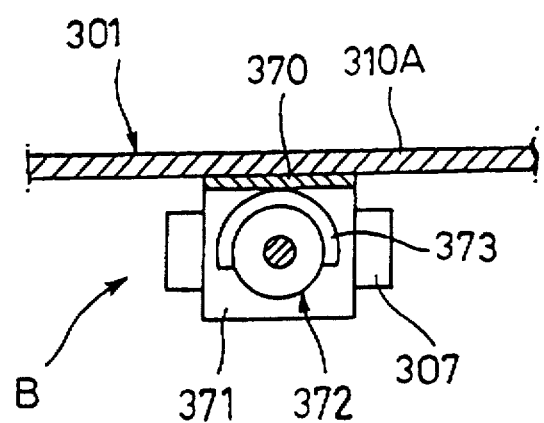

FIG. 47 is a sectional view taken along the lines 47—47 of FIG. 45.

Figure 48:
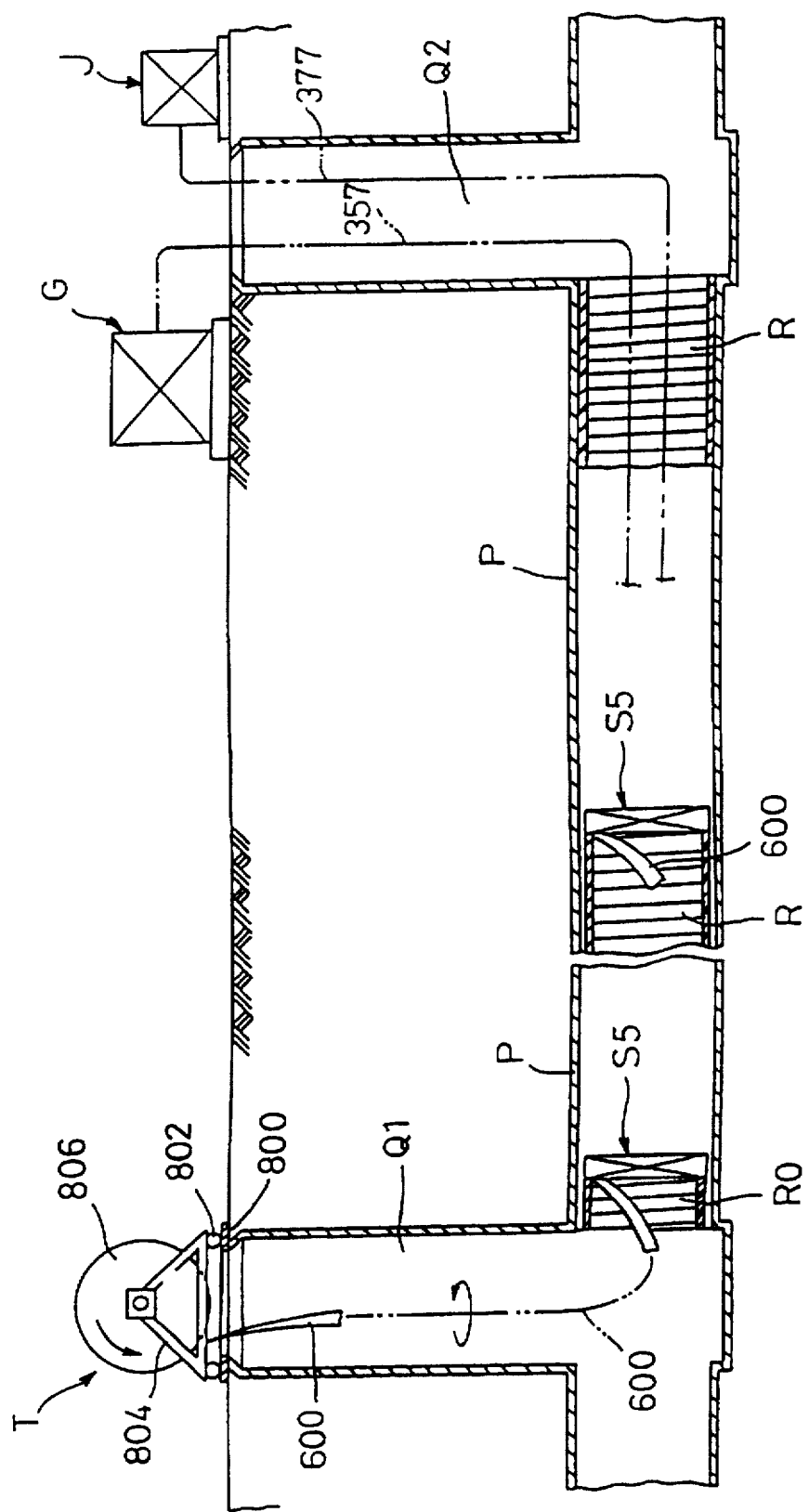

FIG. 48 is a view shown the execution procedures.

(Sixth embodiment)

Figure 49:
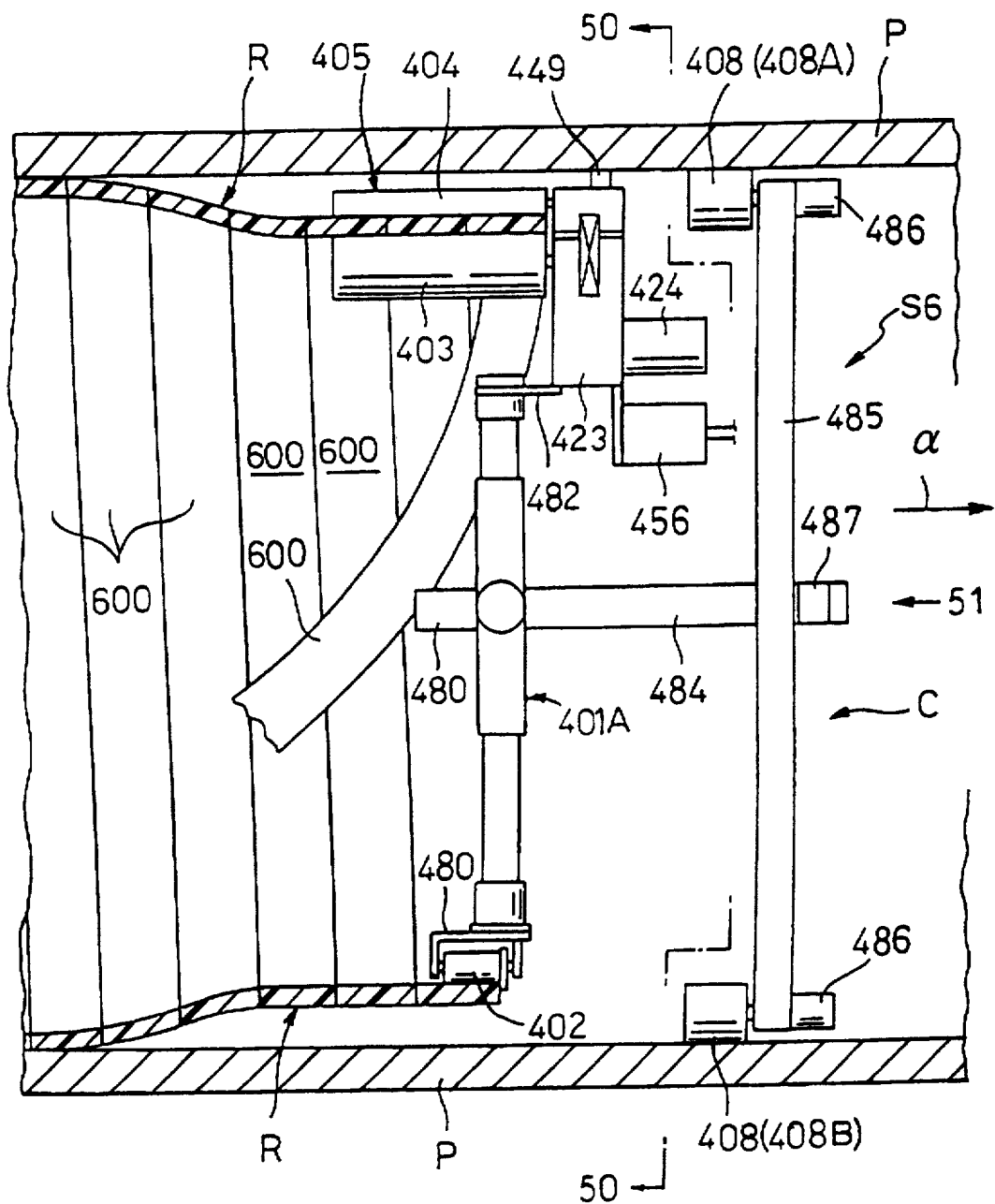

FIG. 49 is a whole, vertical side sectional view of the pipeline lining apparatus S6 of still another (sixth) embodiment of the present invention.

Figure 50:
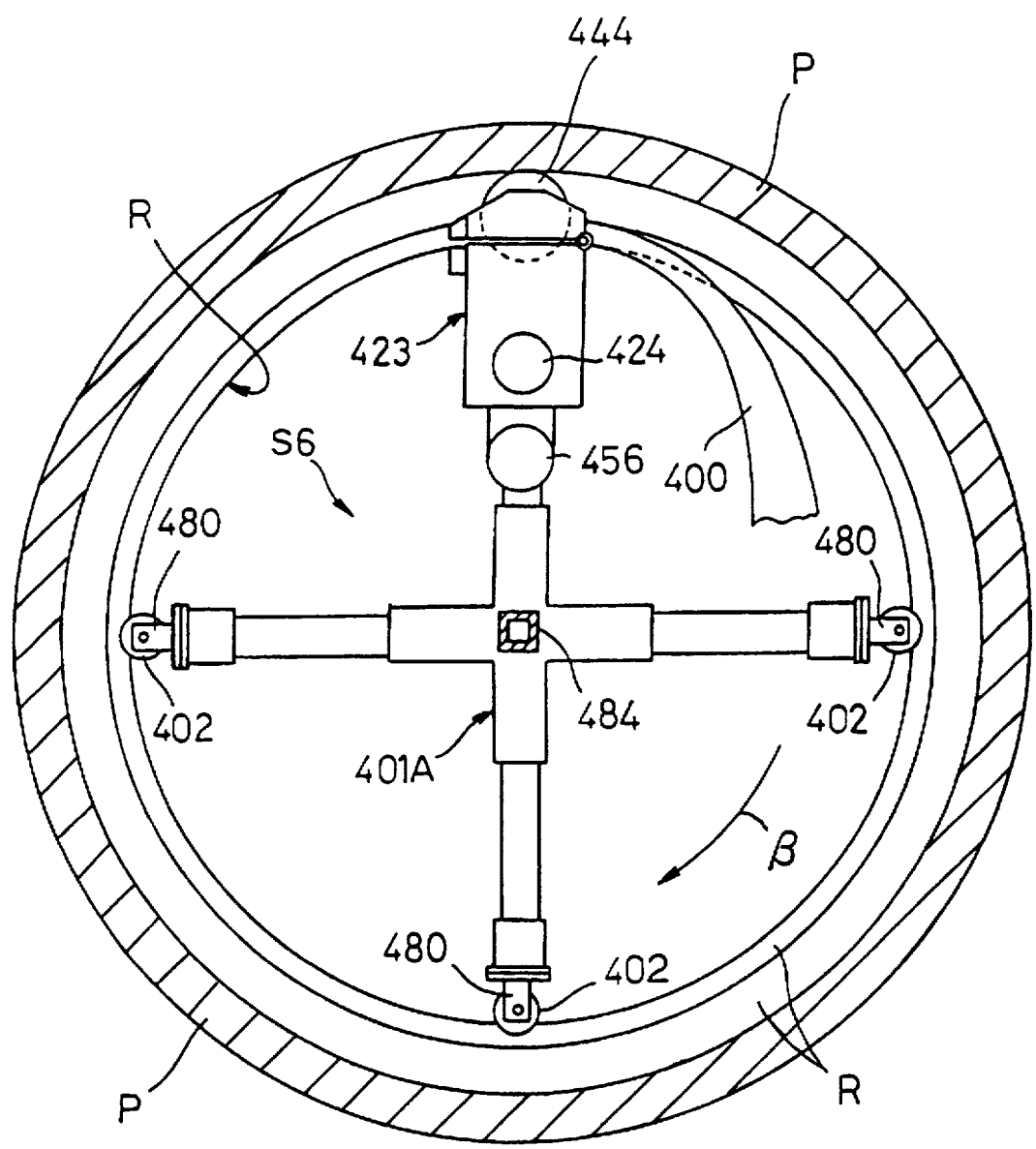

FIG. 50 is a sectional view taken along the lines 50—50 of FIG. 49.

Figure 51:
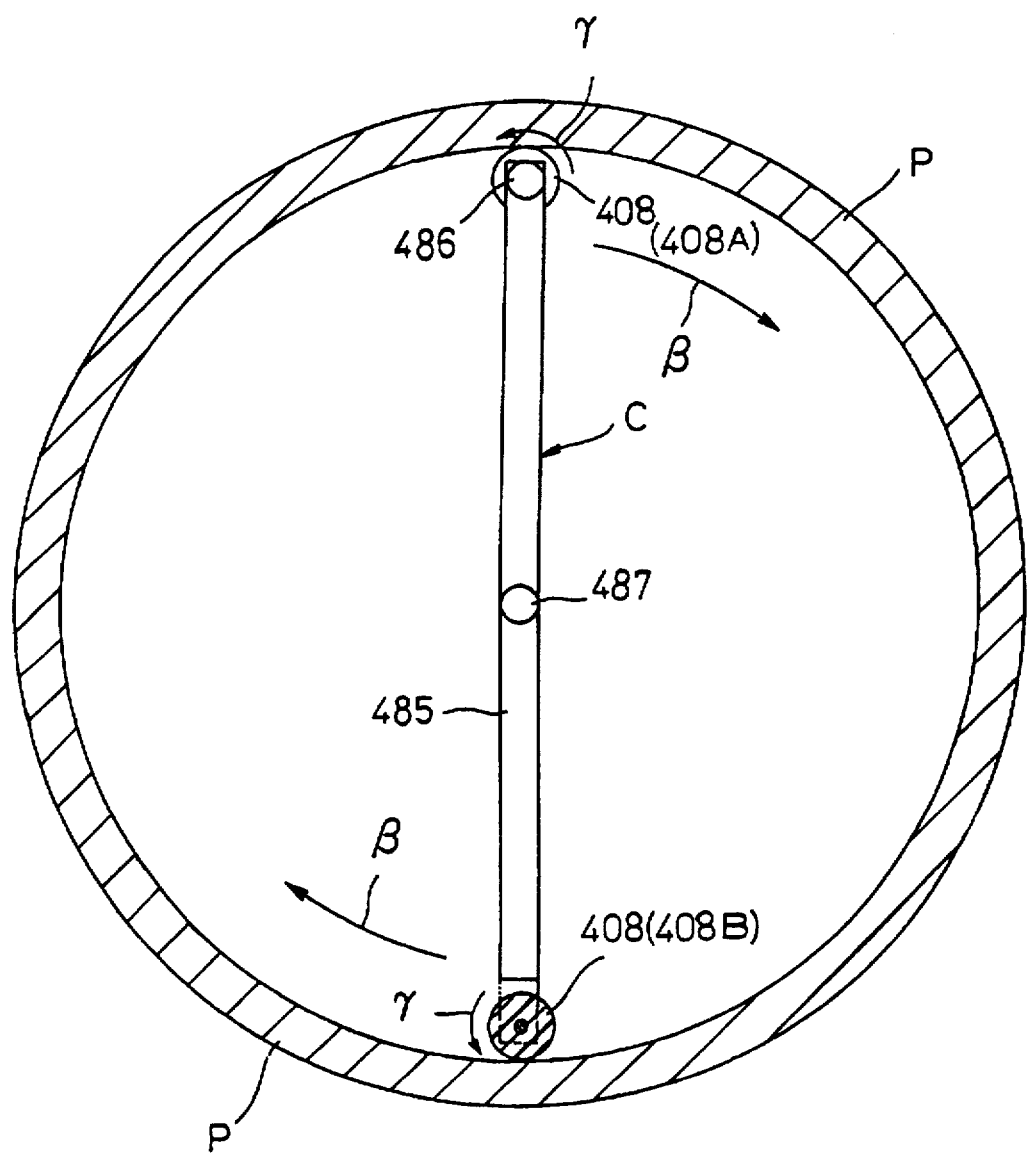

FIG. 51 is a view taken along the line 51 of FIG. 49.

(Seventh embodiment)

Figure 52:
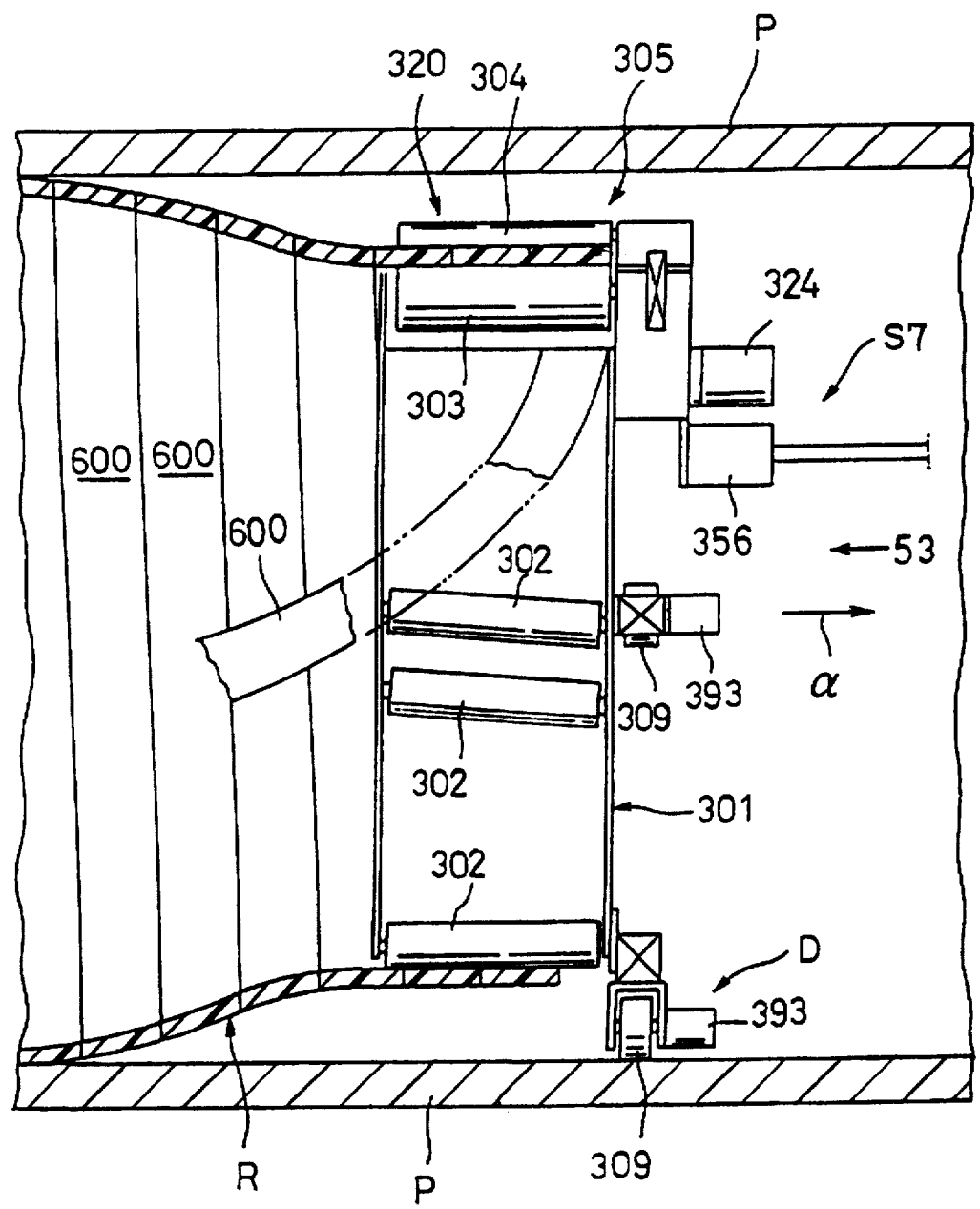

FIG. 52 is a whole, vertical side sectional view of the lining apparatus S7 of still another (seventh) embodiment of the present invention.

Figure 53:
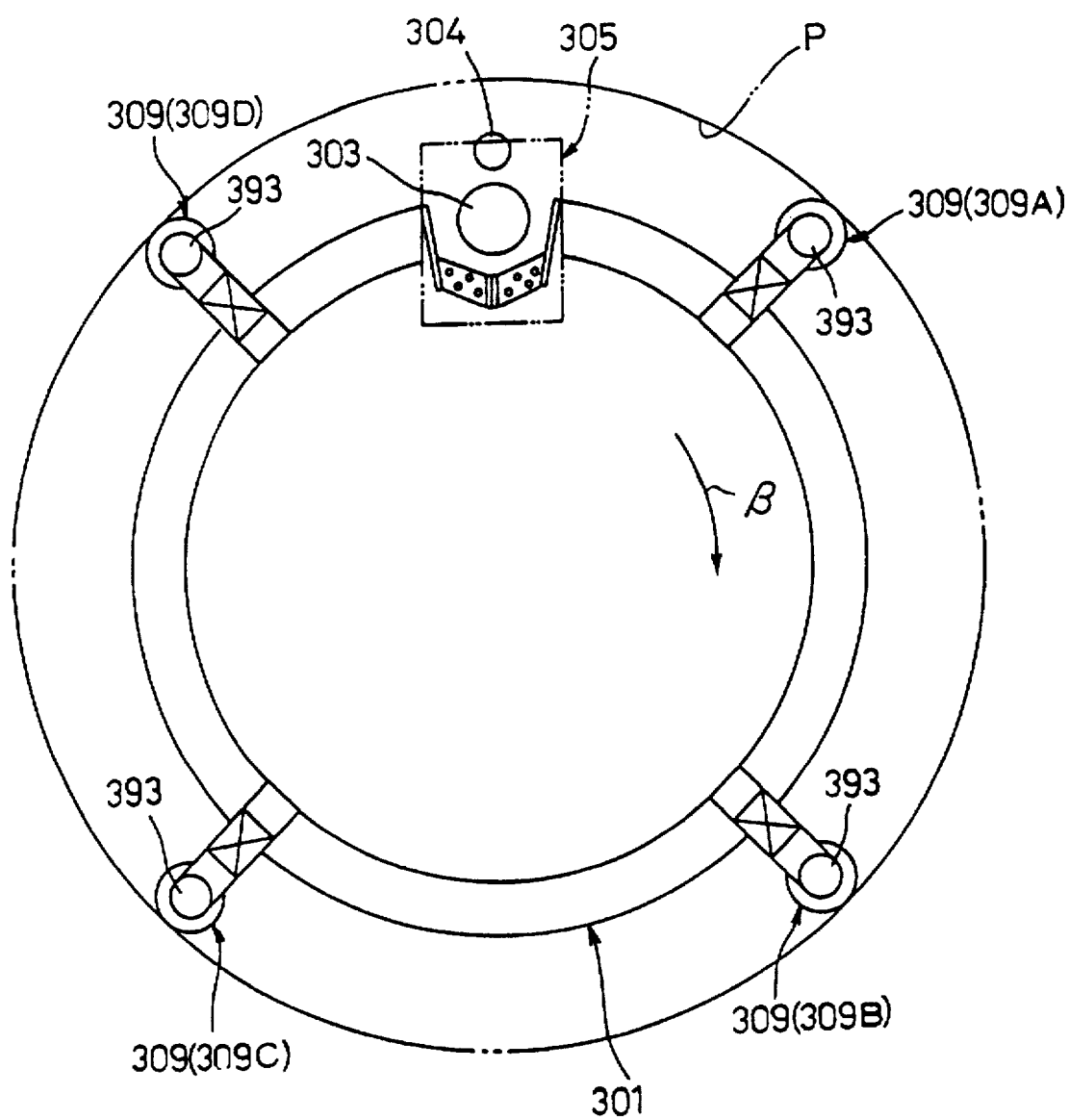

FIG. 53 is a view taken along the line 53 of FIG. 52.

Figure 54:
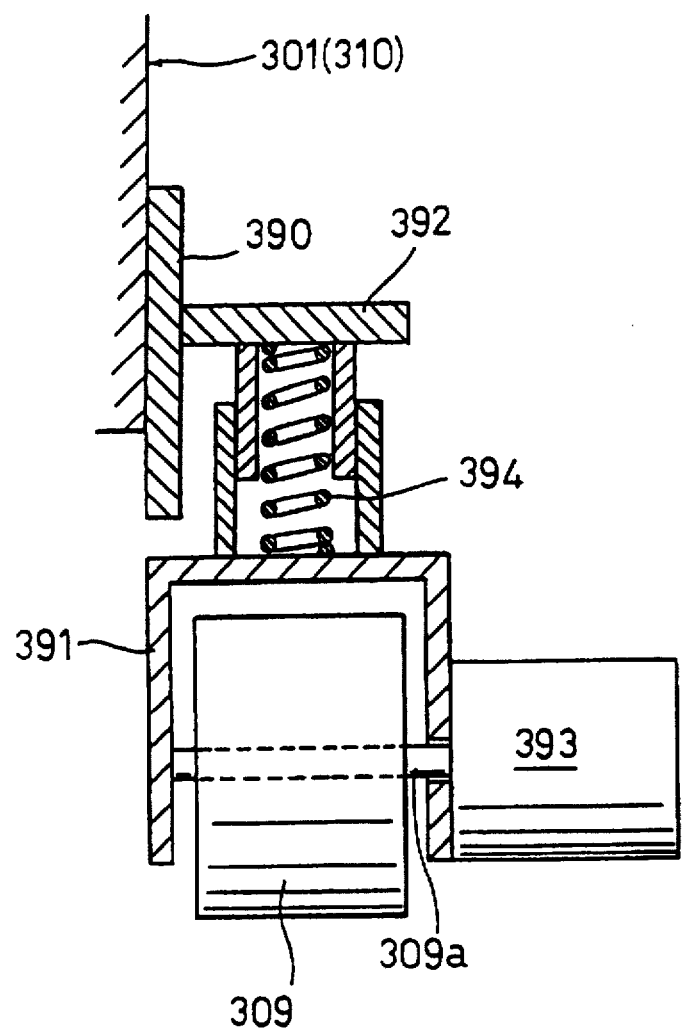

FIG. 54 is a detailed composition view of a feed mechanism.

(Beltlike member)

Figure 55A:
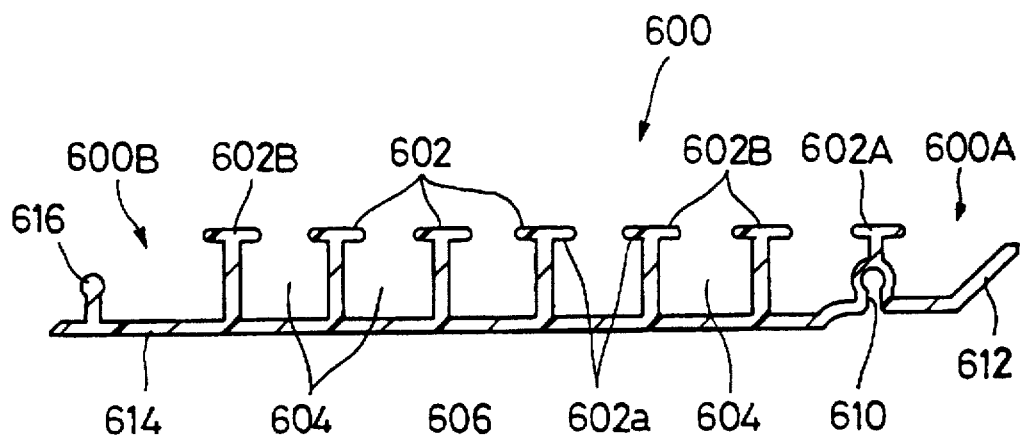
Figure 55B:
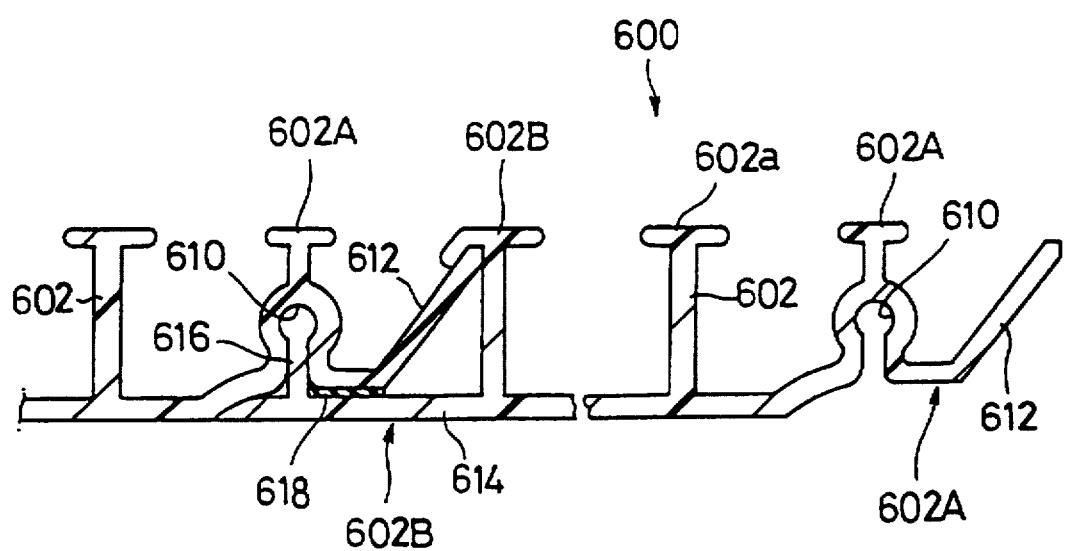

FIG. 55 is a view showing an embodiment of a (1-piece type) beltlike member for use with the present invention, wherein (a) is a lateral sectional view thereof and (b) a sectional view showing the mutual relation in jointing of beltlike members.

Figure 56A:
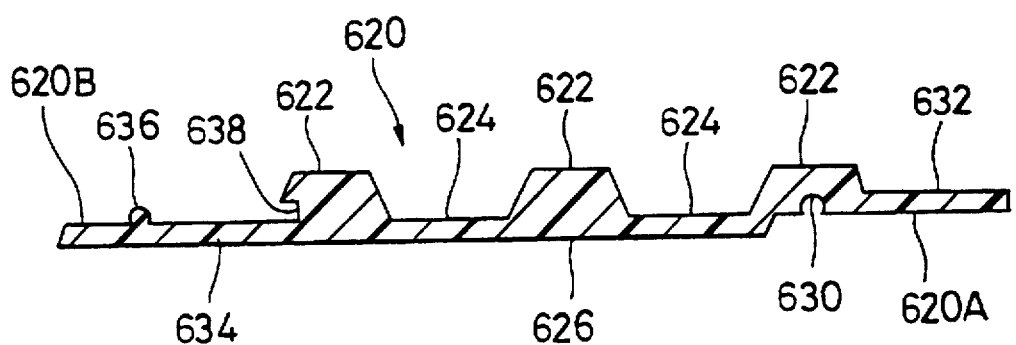
Figure 56B:
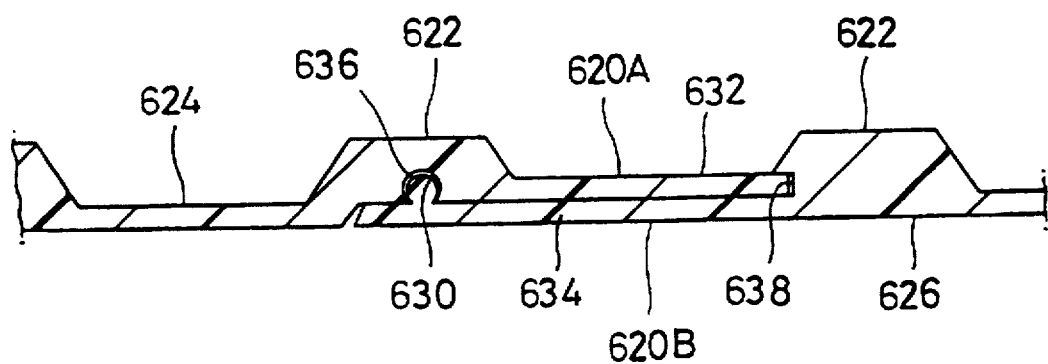

FIG. 56 is a view showing another embodiment of a (1-piece type) beltlike member, wherein (a) is a lateral sectional view thereof, and (b) a sectional view showing the mutual relation in jointing of beltlike members.

Figure 57A:
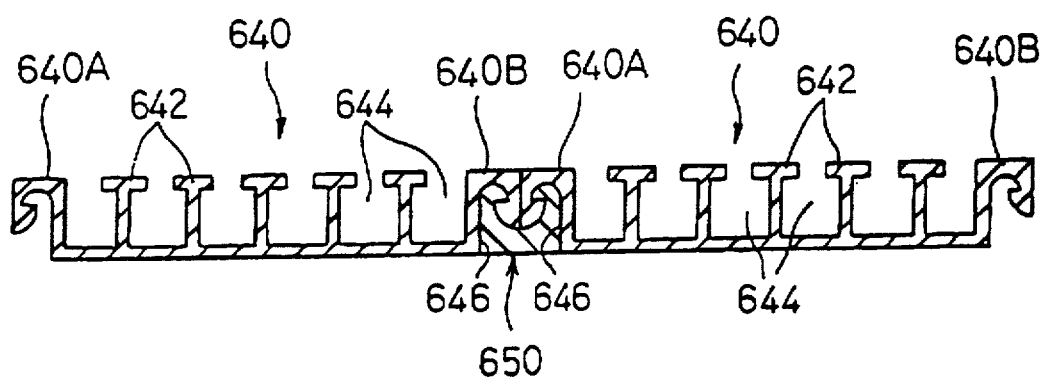
Figure 57B:
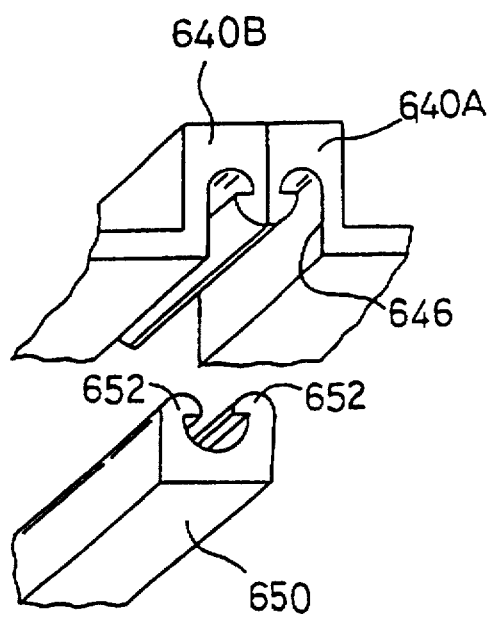

FIG. 57 is a view showing still another embodiment of a (2-piece type) beltlike member, wherein (a) is a lateral sectional view thereof, and (b) a disassembly plan of a joint.

Figure 58:
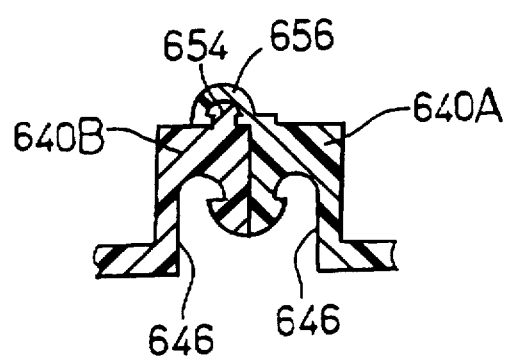

FIG. 58 is a sectional view showing the sub-jointing block of a beltlike member in FIG. 57.

Figure 59:
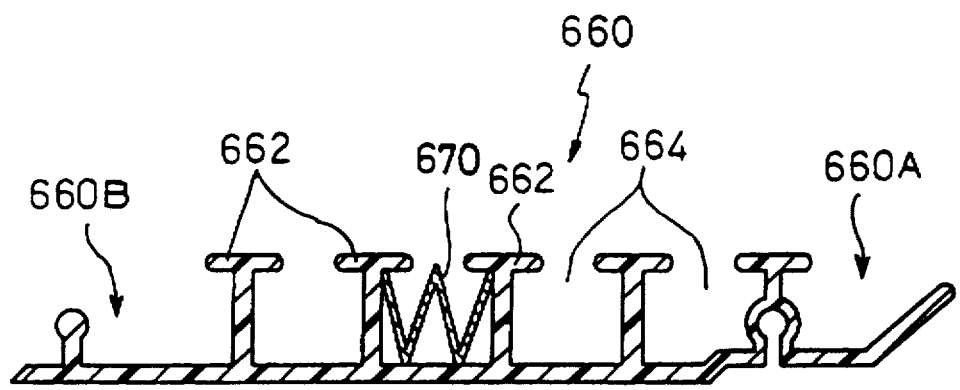

FIG. 59 is a view showing an embodiment of beltlike member (plastic) for use with the present invention.

Figure 60:
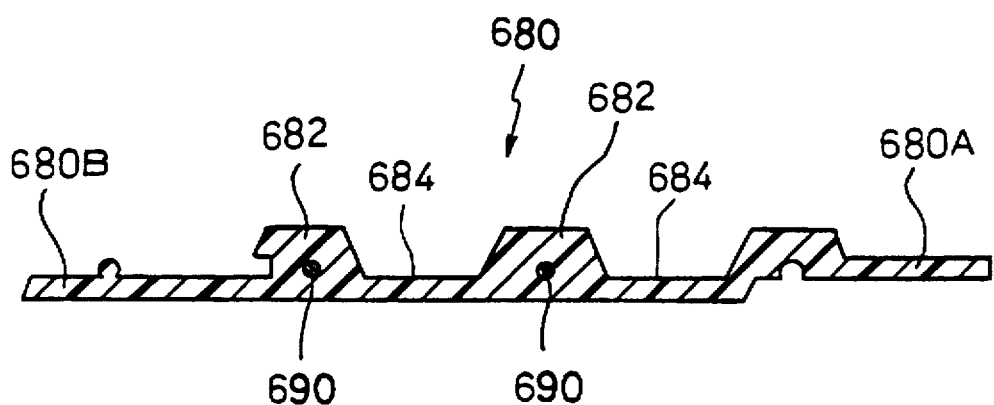

FIG. 60 is a view showing another embodiment of beltlike member (plastic) for use with the present invention.

DISCUSSION OF THE PREFERRED EMBODIMENTS

Preferred embodiments of method and apparatus of pipeline-lining in accordance with the present invention will be described in relation to Figures.

S denotes an apparatus and has 7 modifications S1 to S7. Beltlike members 600, 620, 640, 660, 680.

First, a description will be given to beltlike members for use with the present invention.

FIGS. 55 through 60 show embodiments of beltlike member for use for lining in accordance with the present invention.

(Beltlike member 600)

FIG. 55 shows an embodiment (1-piece type) of beltlike member. Beltlike member 600 is plate-like of a certain thickness, and has a certain number of projections 602 (7 in FIG. 55) being formed continuously as well as longitudinally on the exterior. There is formed a flange 602a on the tip of a projection 602. Also, there is formed a groove 604 or a groove space between projections 602. Interior 606 is substantially formed flat.

On both sides of beltlike member are there produced joints 600A and 600B which overlap and engage each other. That is, front-end joint 600A is enlarged at the base of projection 602A at the front edge thereof, and there is formed a concave groove 610 from inside of the base. In addition, there is provided an overhand 612 from the projection 602A. Rear-end joint 600B has an overhang 614 from projection 602B at the rear edge thereof. There is provided a convex 616 formed closer to the overhang 614 so as to engage with concave groove 610 of the front-end joint 600A.

At jointing, beltlike members adjoining each other overlap with each other at the front and rear ends thereof as front-end joint 600A and rear-end joint 600B are pinched by means of a jointing roller block, consisting of an outer and an inner roller, which will be described later, so that convex 616 comes into concave groove 610, and the edge of overhang 612 into flange 602a of projection 602B. In such an instance, main engagement is carried out by concave groove 610 and convex 616, and secondary engagement by overhang 612 and projection 602B. It depends, but such second engagement may be omitted.

Further, there is interposed sealing material 618 where overhang 612 comes into contact with overhand 614 to produce higher sealedness. If the engagement or fitting of joint 600A with joint 600B is sufficient, the sealing material 618 may be omitted.

Beltlike members are made of synthetic resin, and most preferably, of polyvinyl chloride (PVC), excellent in moldability, which is continuously formed by extrusion. This does not, however, exclude the use of metallic materials.

(Beltlike member 620)

FIG. 56 shows another embodiment of beltlike member. Beltlike member 620 has trapezoidal projections 622 in a proper quantity provided continuously and lengthwise along the exterior thereof with a valley 624 between projections 622. Projections 622 and valley 624 produce equal pitches widthwise. Inside projection 622 is there formed a hollow as case may be to make beltlike member more rigid and lighter. Interior 622 is formed to be substantially flat.

There are formed on both sides of beltlike member 620 joints 620A and 620B which overlap and engage with each other. That is, outer joint 620A projection is formed to be the same in shape as projection 622, and has a round, concave groove 630 formed inside. Overhand 632 is a slightly longer than the width of valley 624. Inner joint 632 has an overhang 634 almost longer than the width of valley 624. Overhang 634 is provided at its edge a round, convex projection 636 to engage with round, concave groove 630 of outer joint 620A. Also, there is formed a notched concave groove 638 in the projection 622 at the root of overhang 634.

When jointing, outer joint 620A and inner joint 620B are pressed by means of the outer and the inner roller of a jointing roller block, so that round, convex projection 636 comes into round, concave groove and the edge of overhang 632 into notched, concave groove 636 for engagement.
(Beltlike member 640)

FIG. 57 shows still another embodiment of beltlike member (2-piece type). The beltlike member is a combination of main material (main beltlike member) 640 and fitting material 650. Main material 640 is provided with projections 642 and grooves 644. It also has at both ends jointa 640A and 640B, the joints A and B having fitting grooves 646. In addition, fitting material 650 is provided with fitting projections 652 to fit elastically into fitting grooves 646 of main material 640.

When jointing, fitting material 652 connects joint 640A with 640B of main materials 640 being arranged side by side.

FIG. 58 is another embodiment of main beltlike member 640.

(Beltlike members 660, 680)

Beltlike member 660 as described in FIG. 59 is another beltlike member 600 as shown in FIG. 55 which is fitted with a plastic material 670, W (V or U) in section, made of metal (usually steel) between projections 620 provided in a proper quantity. Beltlike material 660 follows plastic material 670 to deform itself.

Beltlike material 680 as described in FIG. 60 is another beltlike member 620 as shown in FIG. 56 which is fitted with a plastic linear material 690 made of metal (usually steel). Beltlike material 680 follows plastic linear material 690 to deform itself.

FIRST EMBODIMENT

FIGS. 1 to 8 show an embodiment (first) of the apparatus S1 for lining a pipeline according to the present invention.

Figure 1:
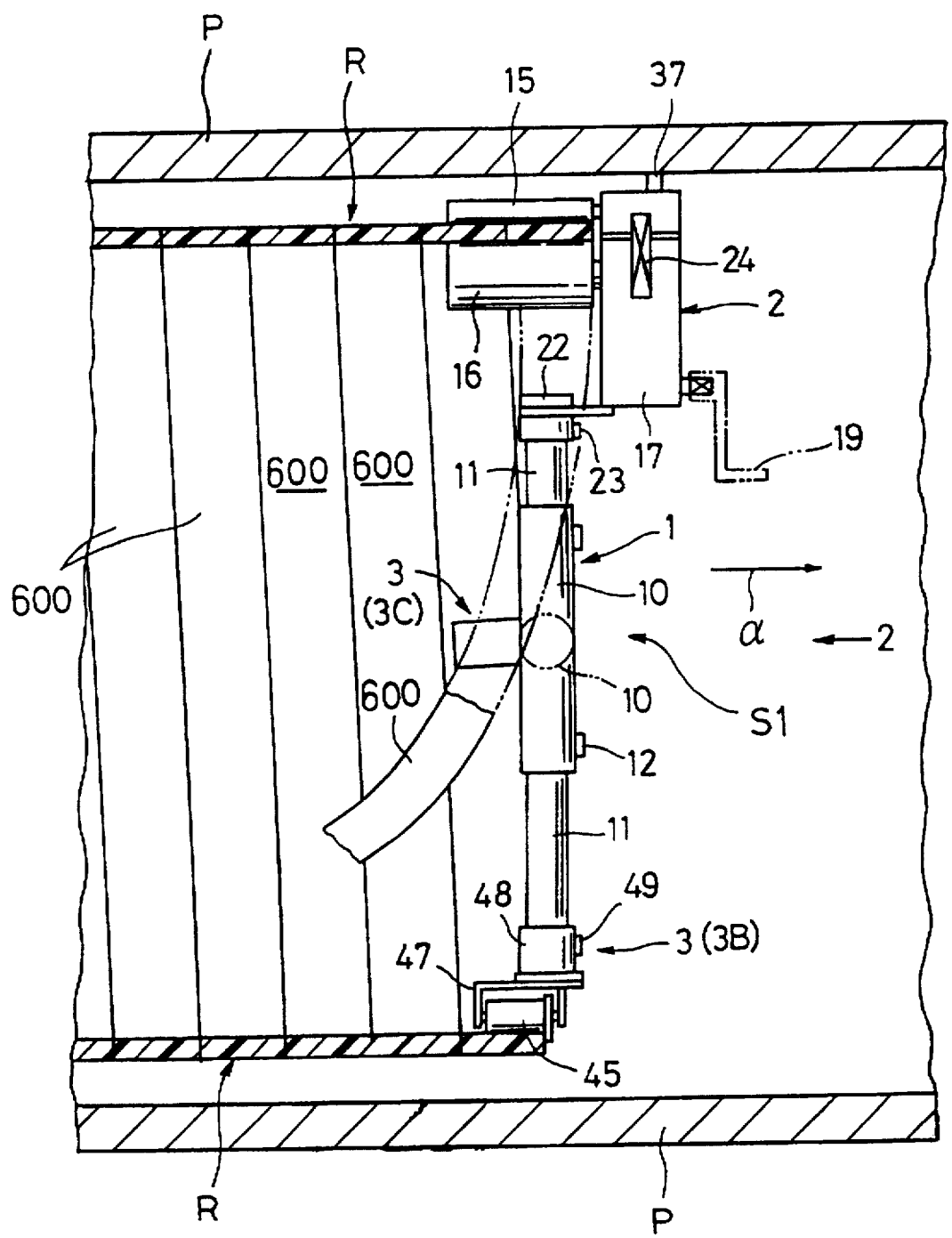
FIG. 1 is a vertical sectional, overall view of the apparatus S1 for lining a pipeline according to an embodiment (first embodiment) of the present invention (sectional view along the lines 1—1 of FIG. 2).
Figure 2:
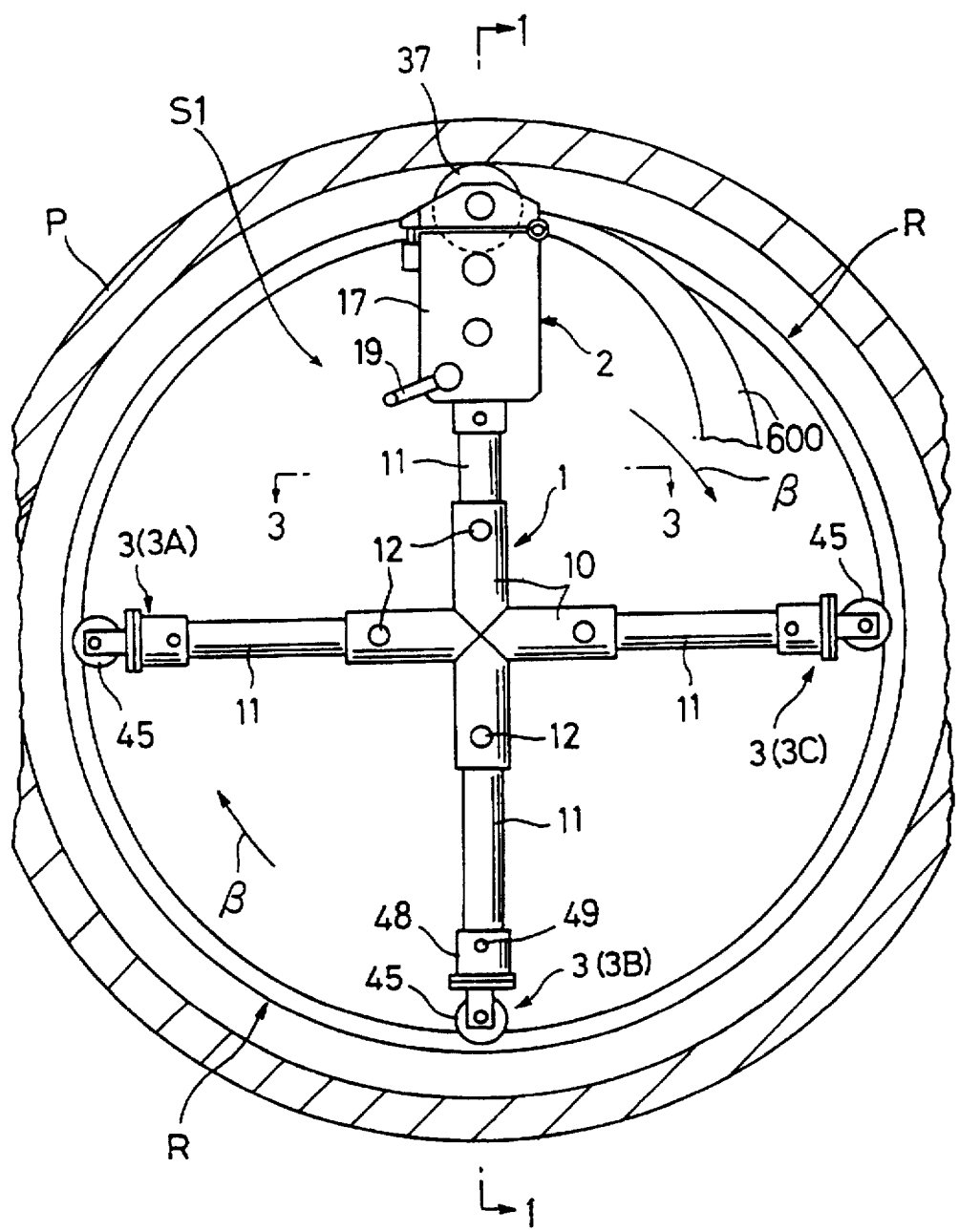
FIG. 2 is an elevation thereof (view as taken in the direction of 2 of FIG. 1).
Figure 3:
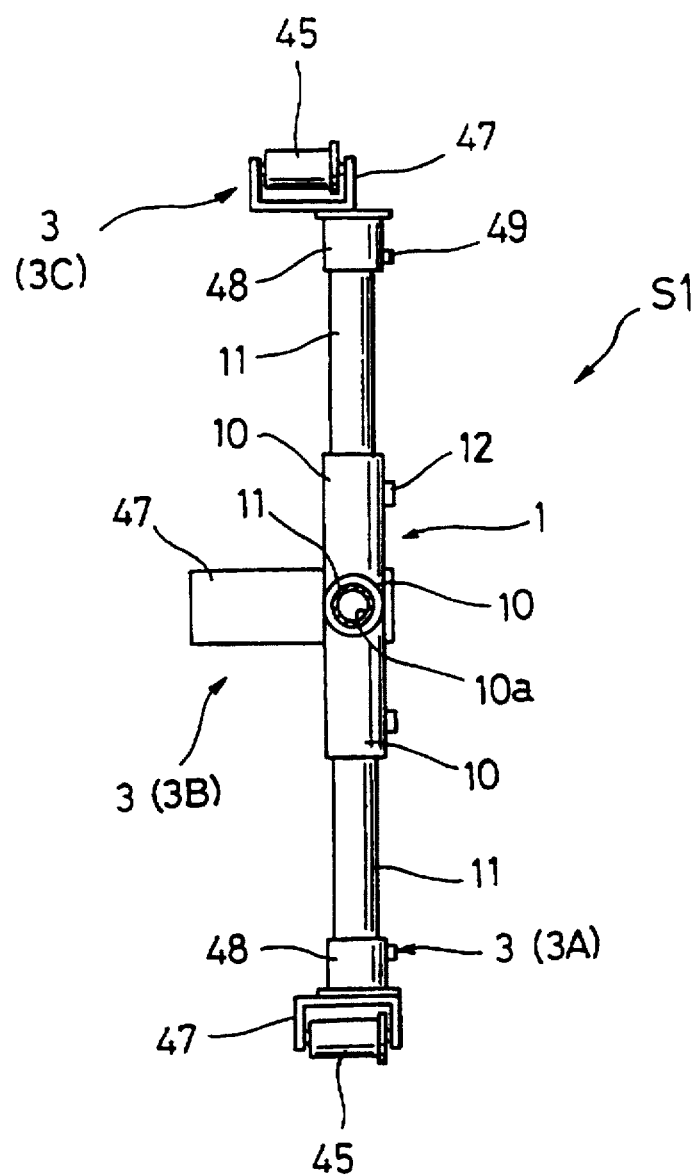
FIG. 3 is a view of FIG. 2 taken along the lines 3—3.
Figure 4:
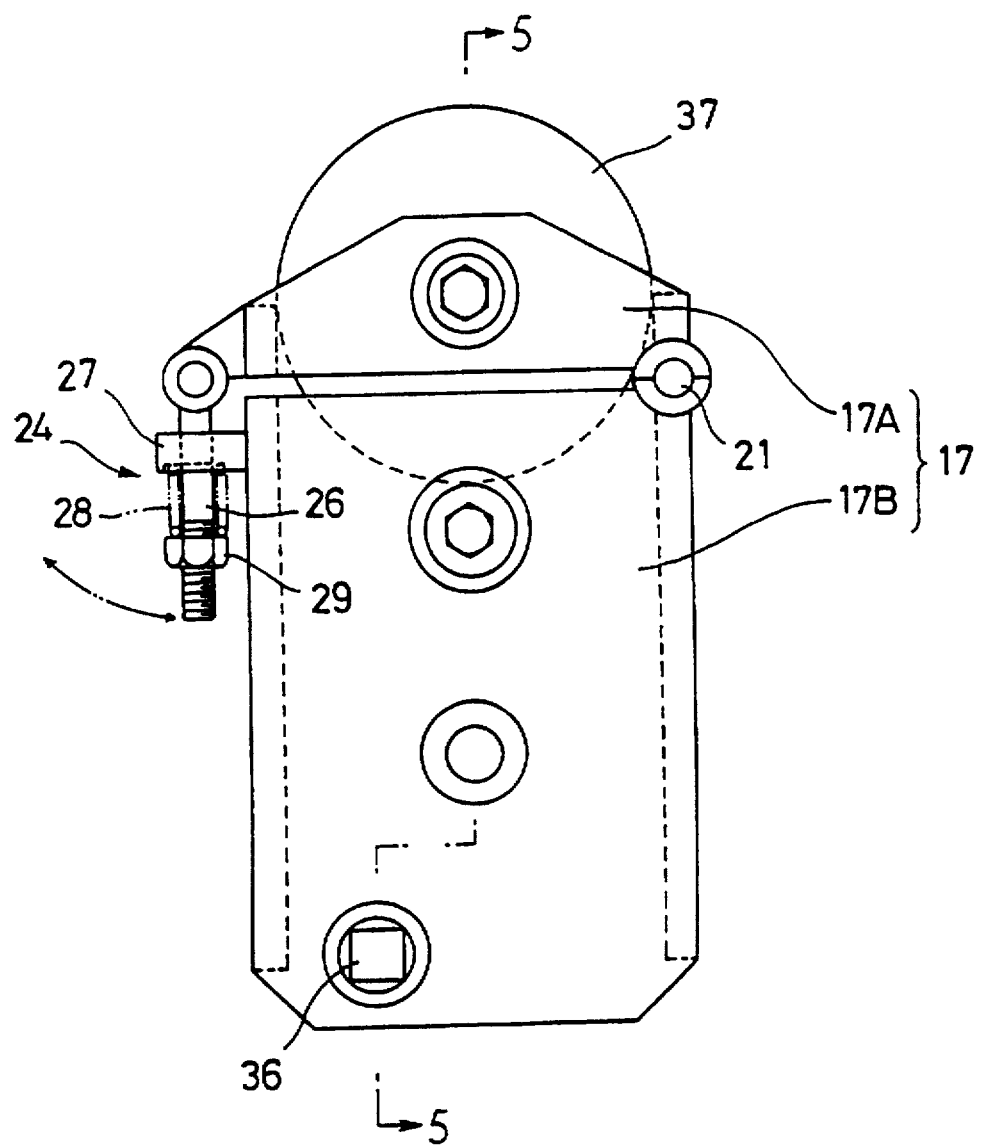
FIG. 4 is an elevation enlarged view of a jointing mechanism (view of FIG. 5 as taken in the direction of 4).
Figure 5:
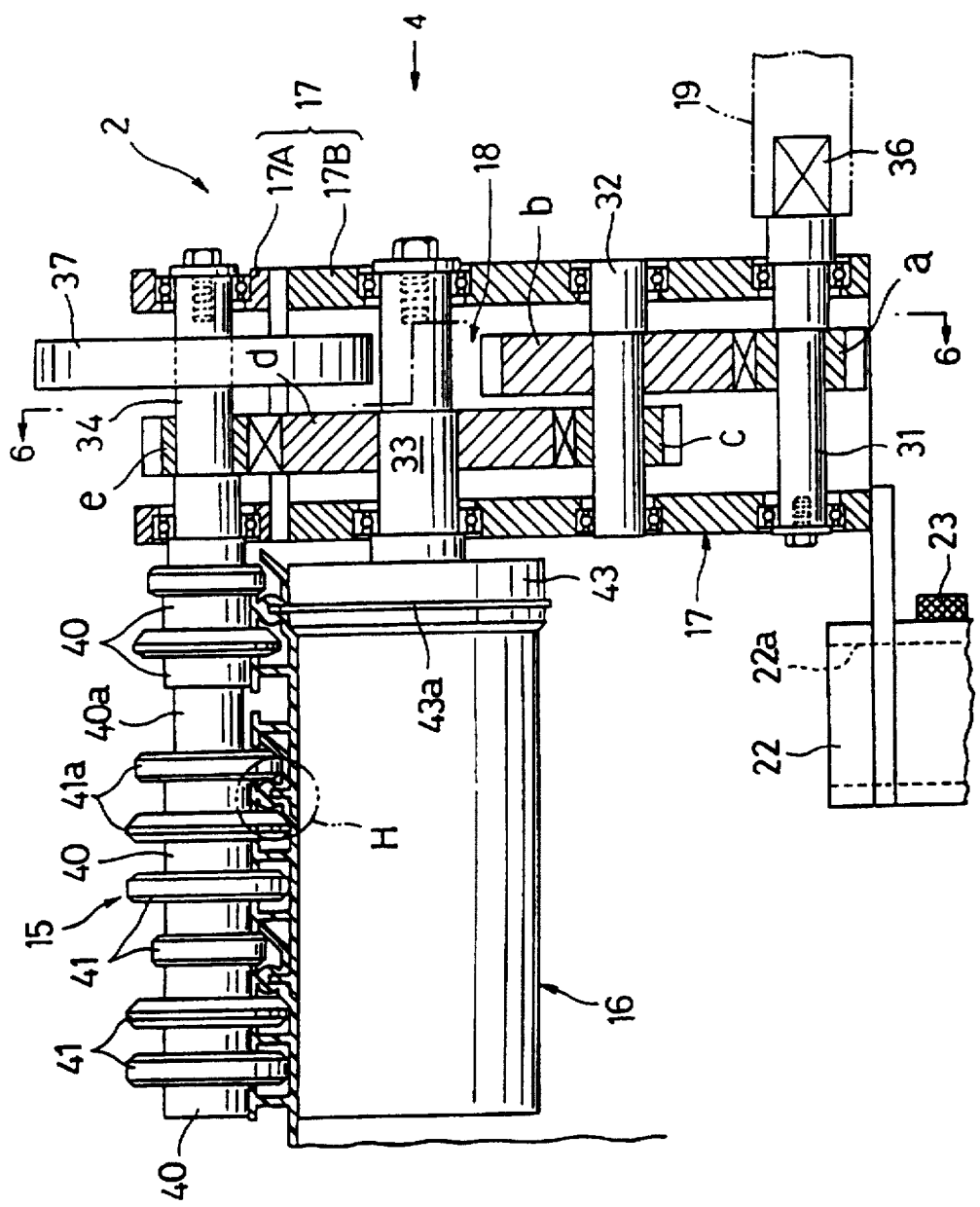
FIG. 5 is an inner composition view of the jointing mechanism (sectional view of FIG. 4 as taken along the lines 5—5).
Figure 6:
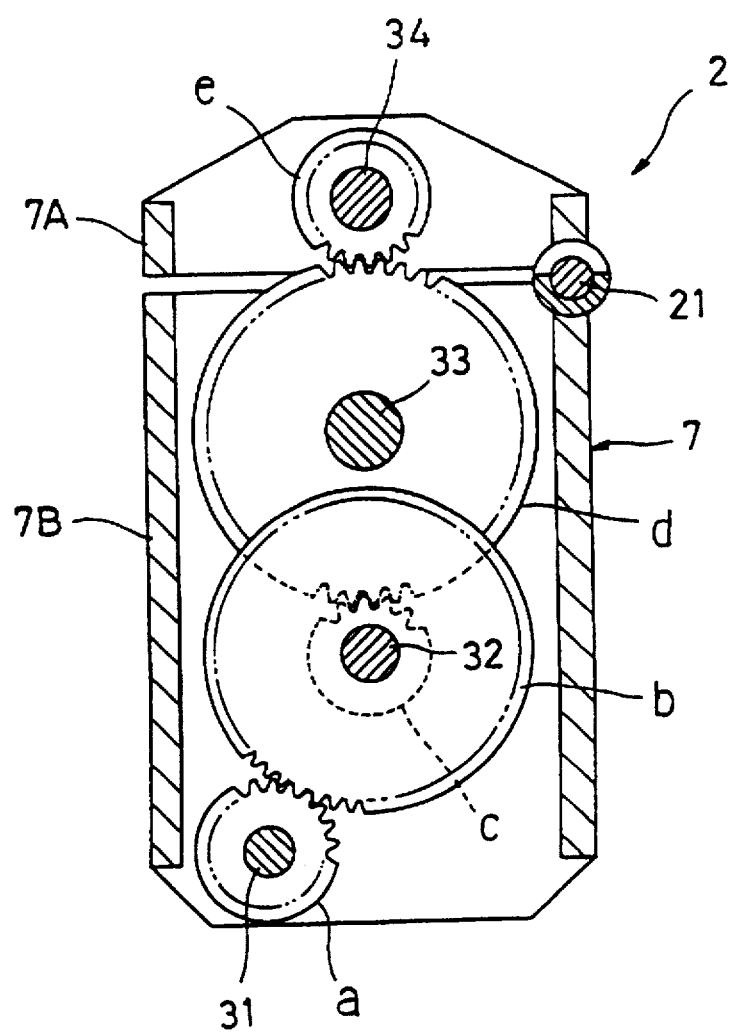
FIG. 6 is a sectional view of FIG. 5 taken along the lines 6—6.

That is, FIGS. 1 to 3 show the overall composition of the apparatus S while FIGS. 4 to 8 illustrate the composition of each part of the apparatus S1.

In FIGS. P is a pipeline, round in section, and R a lining pipe. An arrow α shows the direction the apparatus S1 follows when moving, and an arrow β shows the rotational direction thereof.

The moving direction (arrow α) of the apparatus S1 tells front from rear.

Beltlike members 600, 620 and 640 apply to this embodiment.

Lining apparatus S1

As shown in FIGS. 1 to 3, the lining apparatus S1 is comprised of a mounting frame 1 being fitted in the center, a jointing mechanism 2 being arranged at one of a plurality of extensions provided radially from mounting frame 1, and a guide mechanism 3 being provided at another of the extensions of mounting frame 1.

A description of the parts in detail will be given below.
Mounting frame 1 (see FIGS. 1 to 3)

Mounting frame 1 is provided in the center of the apparatus S1 and made of round pipes 10 being connected crosswise. Arms 11 are inserted rotatably as well as slidably in inner holes 10a of round pipes 10. With set bolts 12, the arms are restricted against motion and adjustable in expansion.

Four round pipes 10 are radially provided in the present embodiment, but they may be 3 or 5 in number. Instead of round pipes combined, prisms having a round hole 10a may be also used.

Arm 11 is a round, hollow pipe, but it can be of round, solid type. It also can be of prism type as the case may be.
Jointing mechanism 2 (See FIGS. 1, 2 and 4 through 7.)

Jointing mechanism 2 is provided as a main with a jointing roller block comprising a set of an outer roller 15 and an inner roller 16, and also a gear 18 being housed in a box 17, the mechanism for use to turn the rollers. The jointing mechanism 2 is arranged where involutely wound beltlike member 600 is jointed, namely, where the beltlike member 600 is closed for the first time. 19 is the manual handle to operate gear 18.

(Box 17)

Box 17 is rigid and divided into upper part 17A and lower part 17B. Upper part 17A is pivoted with 17B by means of a pin axis member 21. Upper part 17A is openable on the axis of pin member 21.

There is secured a mounting member 22 to the rear of box 17, and mounting frame arm 11 is inserted in the mounting hole 22a thereof. Set bolt 23 is passed through the side of arm 11 to secure same.

Closing device 24 is fitted on another side of box 17 to close upper part 17A onto lower part 17B. Shown is an example, in which link rod 26 is pivoted to a rib 25 projecting from the upper part 17A. There is projected a forked shelf 27 from the lower part 17B in the same phase as rib 25 to enable link rod 26 to come into the concave of forked shelf 27. Coil spring 28 and a nut 29 are fitted onto link rod, the nut being engageable with the bottom screw. As nut 29 is fastened, coil spring 28 is pressed down to the lower part of forked shelf 27. As a result, the tightening force of upper part 17A is adjusted as adequate with coil spring 28 elasticity.

(Gear 18)

Gear 18 is equipped with 4 gear shafts 31, 32, 33 and 34 rotatably bridged between front and rear walls of box 17. There is secured a small gearwheel a to the first gear shaft 31 (input shaft). There is secured a large gearwheel b to the second gear shaft 32 (intermediate shaft) to engage with gearwheel a. A small gearwheel c is also secured to the second gear shaft 32. There is secured a large gearwheel d to the third gear shaft 33 (intermediate shaft) to engage with gearwheel c. Also, there is secured a small gearwheel e to the fourth gear shaft 34 (output shaft) to engage with gearwheel d.

In the present embodiment, four gear shafts 31 through 34 are supported and secured by means of rotary bearings. Plain bearings are also available to this effect. The number of gear shafts is not limited to 4. It may be 3 or 5 or over. There is fitted removably a handle 19 as input part at the front end of 36 of the first gear shaft 31 according to gear 18. Outer roller 15 is coupled with the fourth gear shaft 34 so that final torque may be transmitted.

Inner roller 16 is fitted rotatably onto the third gear shaft 33. In addition, a spacer roller 37 is fitted rotatably onto the fourth gear shaft 34 to maintain space. The spacer roller 37 comes into contact with the inner wall of pipe P by the outer circumference thereof. The spacer roller 37 may be appropriate in diameter, but it can be omitted.

(Jointing roller block)

Outer roller 15 and inner roller 16 of jointing roller block are side by side arranged in the direction of the pipe shaft and with fixed intervals.

As mentioned above, outer roller 15 and inner roller 16 are respectively connected to gear shafts 34 and 33 of gear 18, that is, outer roller 15 is coupled with gear shaft 34 while inner roller 16 is free from gear shaft 33 in rotation.

Because of this, it is not always necessary for inner roller 16 to interlock with gear shaft 33, and the roller may be fitted separate from gear 18. It also may be fitted via box 17.

Figure 7:
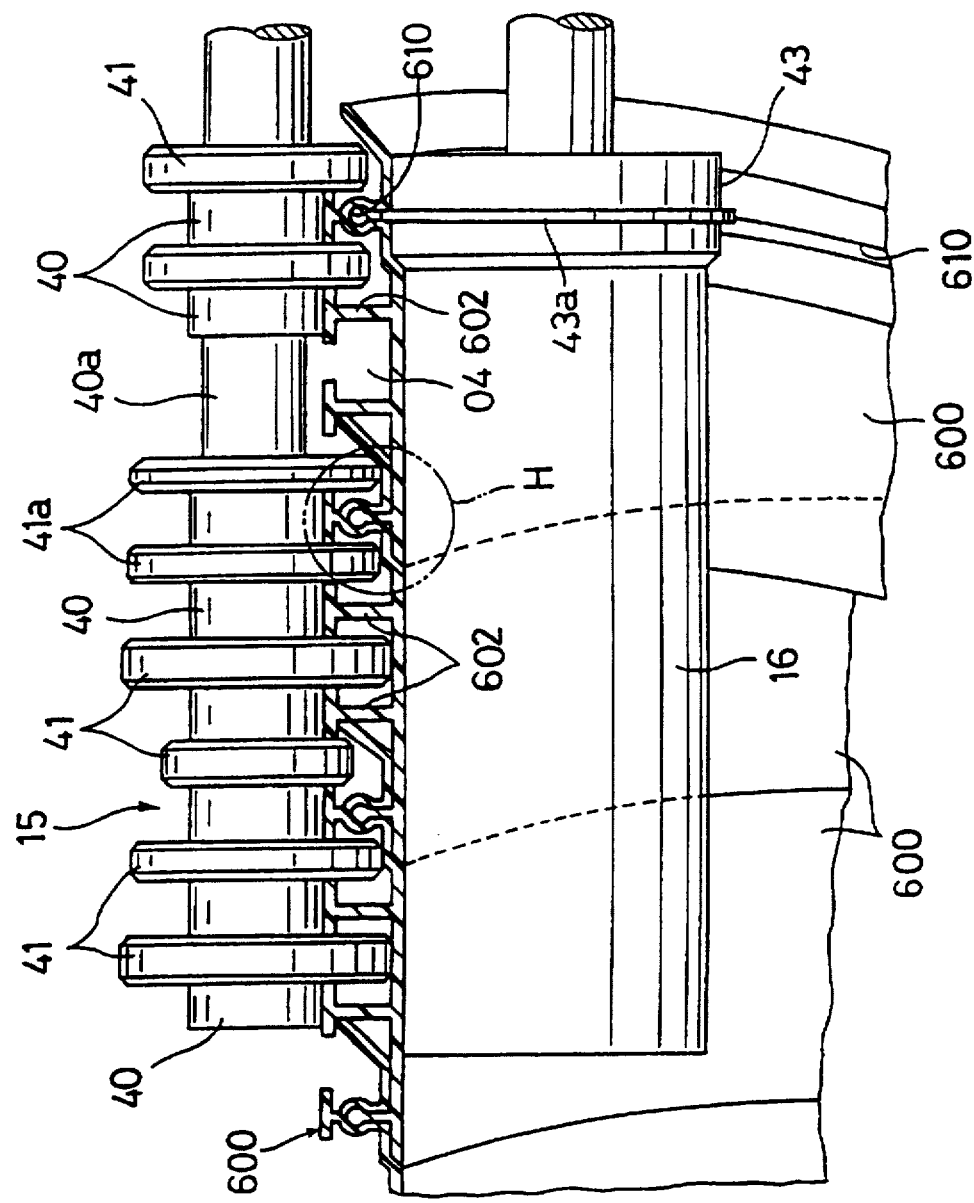
FIG. 7 is an enlarged sectional view of a jointing roller block.
Figure 8:
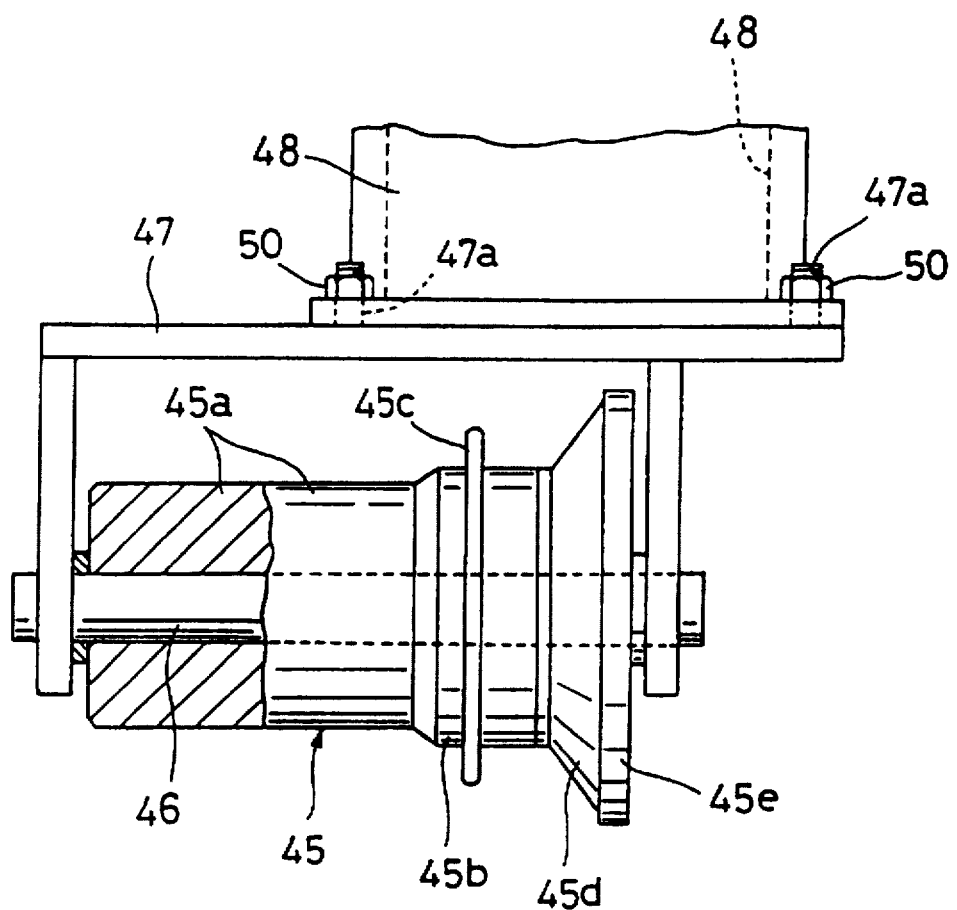
FIG. 8 is an enlarged view of a guide mechanism.

FIG. 7 is an enlarged view of such two rollers 15 and 16 of jointing roller block, and the correspondence of the rollers with beltlike member 600.

Outer roller 15 has a plurality of ring flanges 41 formed on a cylinder body 40 at fixed intervals, the flanges 41 being for coming into grooves 604 between projections 602 of beltlike member 600. In addition, the outer circumference of cylinder body 40 is pressed against the exterior of projection 602 of beltlike member 600. 40a, part thereof, is reduced in diameter to come out of projection 602. Of the ring flanges 41, two flanges 41a which correspond to closure H come into contact with beltlike member 600 by the circumference. It is not always necessary for the other ring flanges 41 to come into contact with beltlike member 600. Instead, they have to come into grooves 604 between projections 602. Inner roller 16 is, on the other hand, right cylindrical, and close to the interior of beltlike member 600 and supports the member when the latter is pressed from outside at the closure H. Besides, there is formed a portion 43 of enlarged diameter with a flange 43a at the edge of inner roller 16 to come into a concave groove 610 of beltlike member 600. The portion may be, however, omitted.

To mount jointing mechanism 2 onto lining pipe R is made by opening upper part 17A of box 17, matching outer roller 15 flanges 41 with the pitches of beltlike member 600 projections 602, positioning ring flange 41a to the closure H, closing upper part 17 onto lower part 17B, shutting closing device 24 and fastening nut 29.

Guide mechanisms 3 (see FIGS. 1 through 3, and 8.)

Guide mechanisms 3 (3A, 3B, 35) are fitted respectively onto the tips of the arms 11 of mounting frame 1. Guide rollers 45 are the main components, and are mounted inside of lining pipe R to keep the pipe round in cooperation with jointing mechanism 2.

More in detail, the rotary shaft 46 of a guide roller 45 is supported rotatably by means of a frame 47, there being secured a mounting member 48 to the frame 47 in the inner diameter direction. The tip of arm 11 of mounting frame his inserted in the mounting hole 48a of mounting member 48, which is secured to the arm 11 by means of a through set bolt 49. Mounting member 48 and frame 47 are relatively mobile, and the mounting member is adjusted for phase to be secured to frame 47 by tightening nut 50 onto a bolt 47a in the frame 47.

Guide rollers 45 are almost the same as inner roller 16, but they are longer. That is, roller body 45a is right cylindrical, and there is formed a diameter-enlarged portion 45b at the front thereof with a large-diameter flange 45c. In addition, there is formed at the front edge of roller body 45a a large-diameter flange 45e having a tapered portion 45d. Roller body 45a comes into contact with the interior of lining pipe R, ring flange 45c fits into concave groove 610 of beltlike member 600, and large-diameter flange 45e comes into contact with the front edge of lining pipe R. Roller body 45a, diameter-enlarged portion 45b and large-diameter flange 45e may be formed as three segments or one body. In addition, roller body 45a may be rotatable via bearings with rotary shaft 46 being stationary.

Guide mechanism 3 of the present embodiment is arranged at a phase of 90° and guide rollers 45 are shifted in phase in the pipe shaft direction, so that ring flange 45c fits into concave groove 610 of beltlike member 600.

Guide mechanism 3 is provided at three positions according to the present invention. They also may be provided at two or five positions.

Lining a pipeline P what follows is a description of lining an underground pipeline P using the lining apparatus S1 according to the present invention, and how S1 works.

Figure 9:
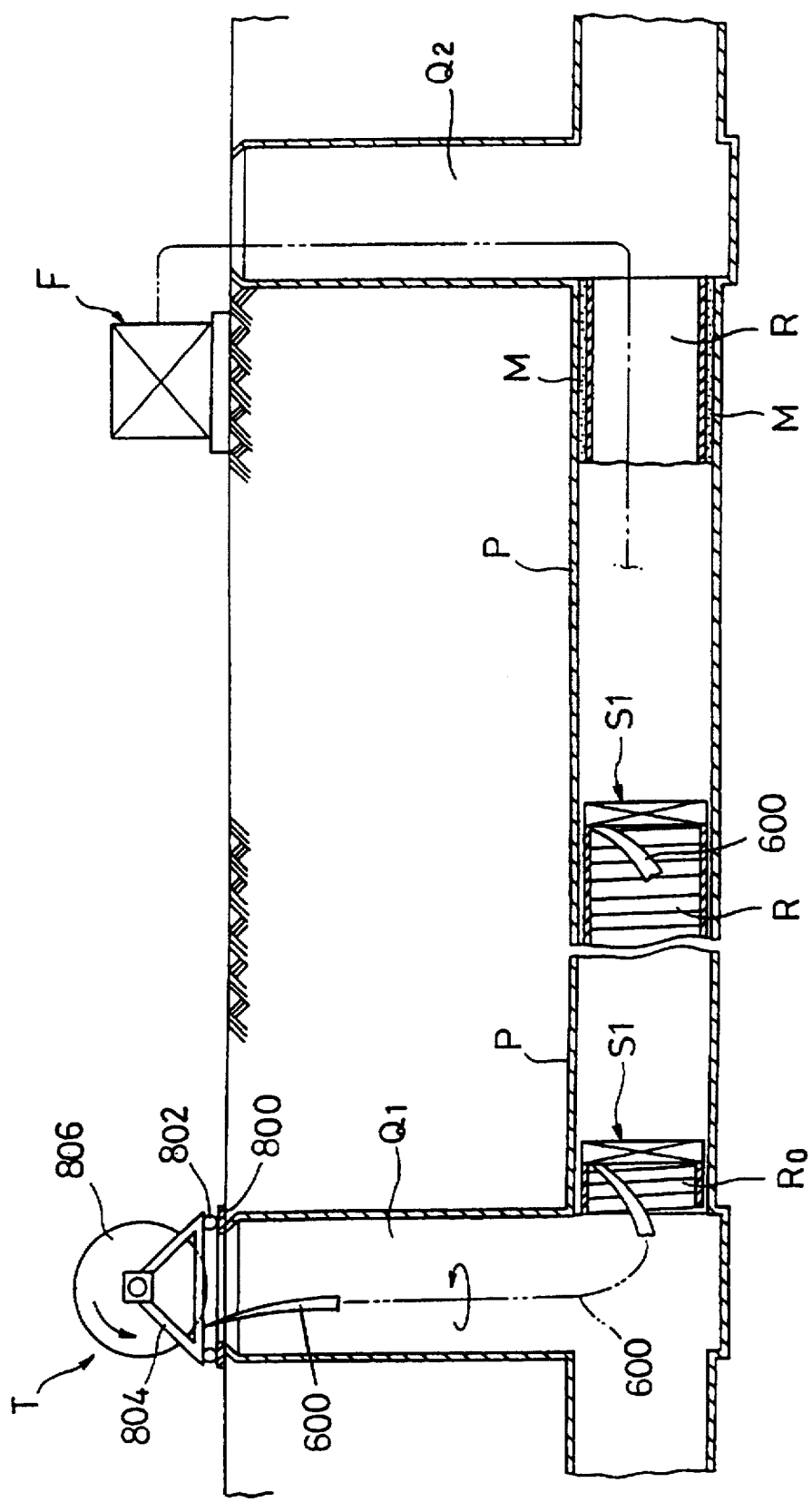
FIG. 9 is a view showing the execution procedures.
(Second embodiment)

FIG. 9 outlines lining work using the present embodiment. Lining work is applied to a sewerage, underground pipeline. In FIG. 9, Q1 is an upstream manhole, and Q2 is a downstream one.

As shown in FIG. 9, there is provided an unwinder T with a rotary table wound with beltlike member 600 on the upstream manhole on the ground. Lining work is performed from upstream to downstream.

The processes will be described one by one in the following.

(1) The lining apparatus S1 is brought by segments into target pipeline P via manhole Q1, and assembled in P. That is, mounting frame 1, jointing mechanism 2 and guide mechanism 3 of the apparatus S1 may be taken apart respectively, and the apparatus may be readily assembled at site.

(2) Beltlike member 600 pulled in from ground at the starting edge of manhole Q1 of pipeline P is manually wound a few times (once at least) to produce a lining pipe Ro (starting lining pipe).

(3) At the front edge of starting lining pipe Ro are installed in position jointing mechanism 2 and guide mechanisms 3 of the lining apparatus S1. Outer roller 15 and inner roller 16 of jointing roller block are arranged at the closure of lining pipe Ro before fitting ring flange 41 of outer roller 15 into groove 604 of beltlike member 600. In particular, ring flange 41a shall be correctly in contact with the closure H. Flange 43 of inner roller 16 is fitted into concave groove 610 of beltlike member 600, and flange 45c of a guide mechanism 3 with concave groove 610 of beltlike member 600.

(4) With the manual handle 19 of jointing mechanism 2 operated, outer roller 15 and inner roller 16 pinch and connect beltlike member 600, which is supplied, following starting lining pipe Ro, with starting lining pipe Ro at closure H thanks to the construction of joints of the member 600. At the same time, the jointing mechanism revolves in the pipe circumferential direction and advances in the pipe shaft direction upon engagement of ring flange 41 of outer roller 15 with groove 604 of beltlike member 600 and upon engagement of flange 43 of inner roller 16 with concave 610 of beltlike member 600.

The revolution of jointing mechanism 2 and engagement of guide roller 45 flange 45c of guide mechanism 3 with concave 619 of beltlike member 600 enables the apparatus S1 to advance with a fixed pitch.

As a result, beltlike member 600 is involutely supplied to form lining pipe R.

(4A) In this process, spacers are adequately installed in gaps between lining pipe R and pipeline P as lining pipe R advances.

(4B) In addition, beltlike member 600 is successively provided, according to the present process, from unwinder T installed on the ground. As typically illustrated in FIG. 9, unwinder T is such that a rotary table 804 is rotatably mounted via rollers 802 on a ring rail 800 provided around the opening of manhole Q1, the rotary table 804 being designed to rotatably support a drum 806 wound with beltlike member 600 ready to unreel. With this, horizontal rotation of rotary table 804 along ring rail 800 is synthesized with vertical rotation of drum 806.

Along with pipe making, beltlike member 600 twists, but unwinder T follows with the rotary table 804, synchronizing with such twisting.

(5) After lining pipe R covers the overall length of pipeline P, gaps between them will be filled with cement milk. Lining will be completed when cement milk sets.

(Effects of the first embodiment)

The method of in-pipeline lining according to the present embodiment is implemented in the above-mentioned mode, and it will show the following effects:

According to the lining apparatus of the present embodiment lining pipe R as formed is left behind within pipeline P as it is, with no restriction against the diameter and length of lining pipe. Accordingly, a long lining pipe will be available.

In addition, lining pipe R with a curve may be so produced as to cope with pipeline P with a curve.

Outer roller 15 is manually driven by way of gears without any special motive power.

The engagement of ring flange 14 of outer roller 14 with groove 604 of beltlike member 600 and engagement of flange 43 of inner roller 16 with flange 45c of a guide roller 45 help guide the apparatus S1 with a fixed pitch to produce lining pipe R securely.

The degree of roundness of lining pipe R is assured by means of jointing mechanism 2 and rollers 15, 16 and 45 of guide mechanism 3.

The present embodiment gives a manual mode, and it also can depend on motive power. That is, an electric motor is mounted in the vicinity of mounting frame 1 center and a small gearwheel is mounted to gear shaft 31 of gear 18 in the box 17, the small gearwheel being designed to interlock with the electric motor drive shaft with a chain. This makes it possible not only to automate in-pipeline lining work with an electric motor, but also produce economical lining depending on small motive power.

In FIG. 9, there is provided an electric supply unit F is on the ground of manhole Q1 on the downstream side. Electric power is supplied to the electric motor by way of the unit F.

Furthermore, a pneumatic motor may replace the electric motor. In such an instance, an electric supply unit F on the ground is, of course, replaced with a pneumatic unit.

In addition, hydraulic drive may be used as illustrated in the second embodiment.

The first embodiment may change in design as follows:

① The illustrated mounting frame 1 is crosswise, and it also can be circular or square. If this is the case, extensions will be provided radially from the frame and mechanisms will be mounted onto such extensions.

② Gear mechanism includes chain transmission by means of a chain engaging gears (sprockets) with each other.

③ It is not always necessary to fit inner roller 16 and/or guide rollers 45 with beltlike member using flanges and grooves. A roller may be inscribed in a beltlike member.

SECOND EMBODIMENT

Figure 10:
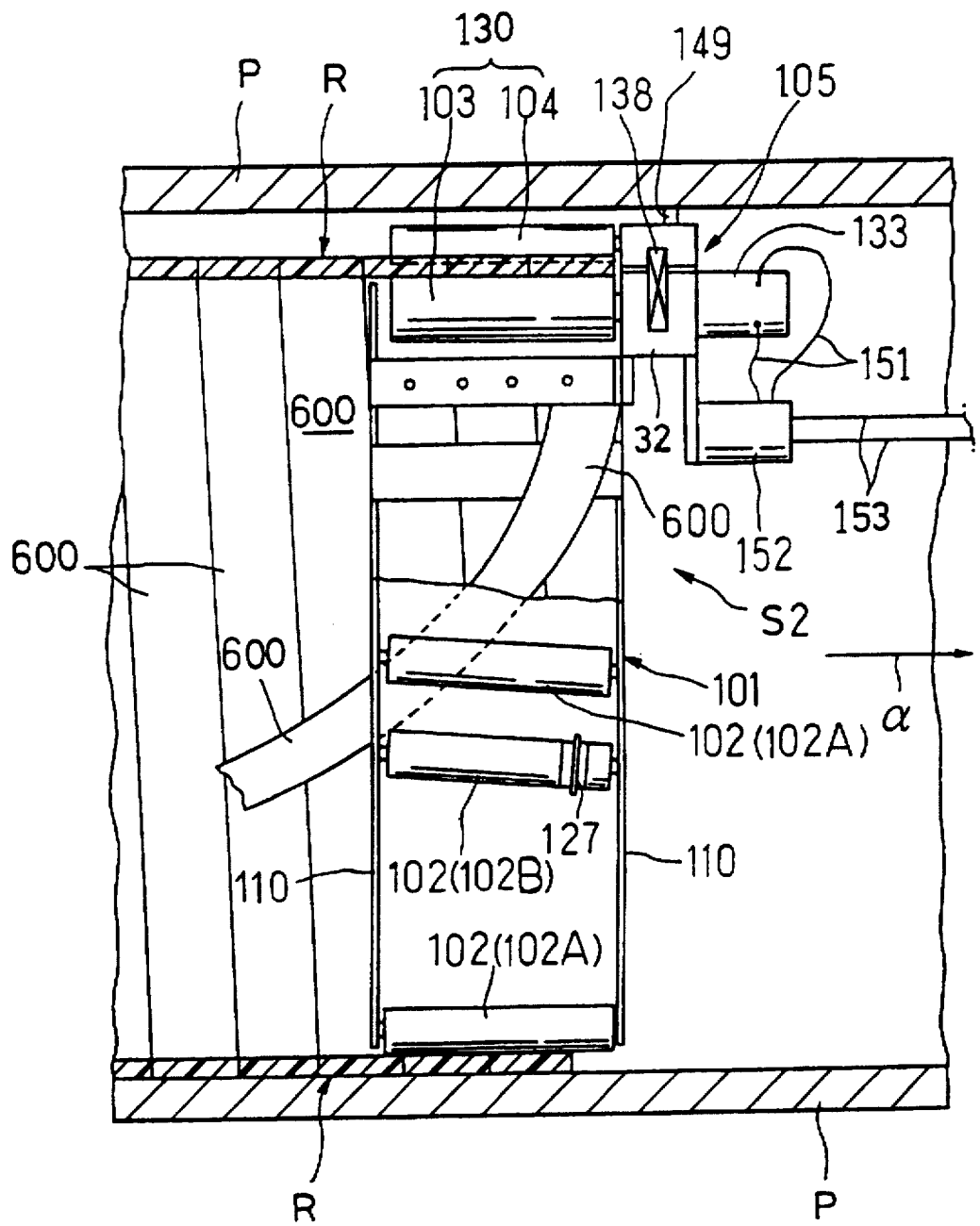
FIG. 10 is a partial vertical sectional view showing the whole of the pipeline lining apparatus S2 of another (second) embodiment of the present invention.

FIGS. 10 through 19 show another embodiment (second) of the apparatus S for lining a pipeline according to the present invention. That is, FIG. 10 shows the overall composition of the lining apparatus S2 while FIGS. 11 through 19 illustrate the composition of each part of the apparatus S2.

Beltlike members 600, 620 and 640 apply to the present embodiment.

Lining apparatus S2

Referring now to FIGS. 10 to 19, the composition of the lining apparatus S2 of the present embodiment will be described below.

Figure 11:
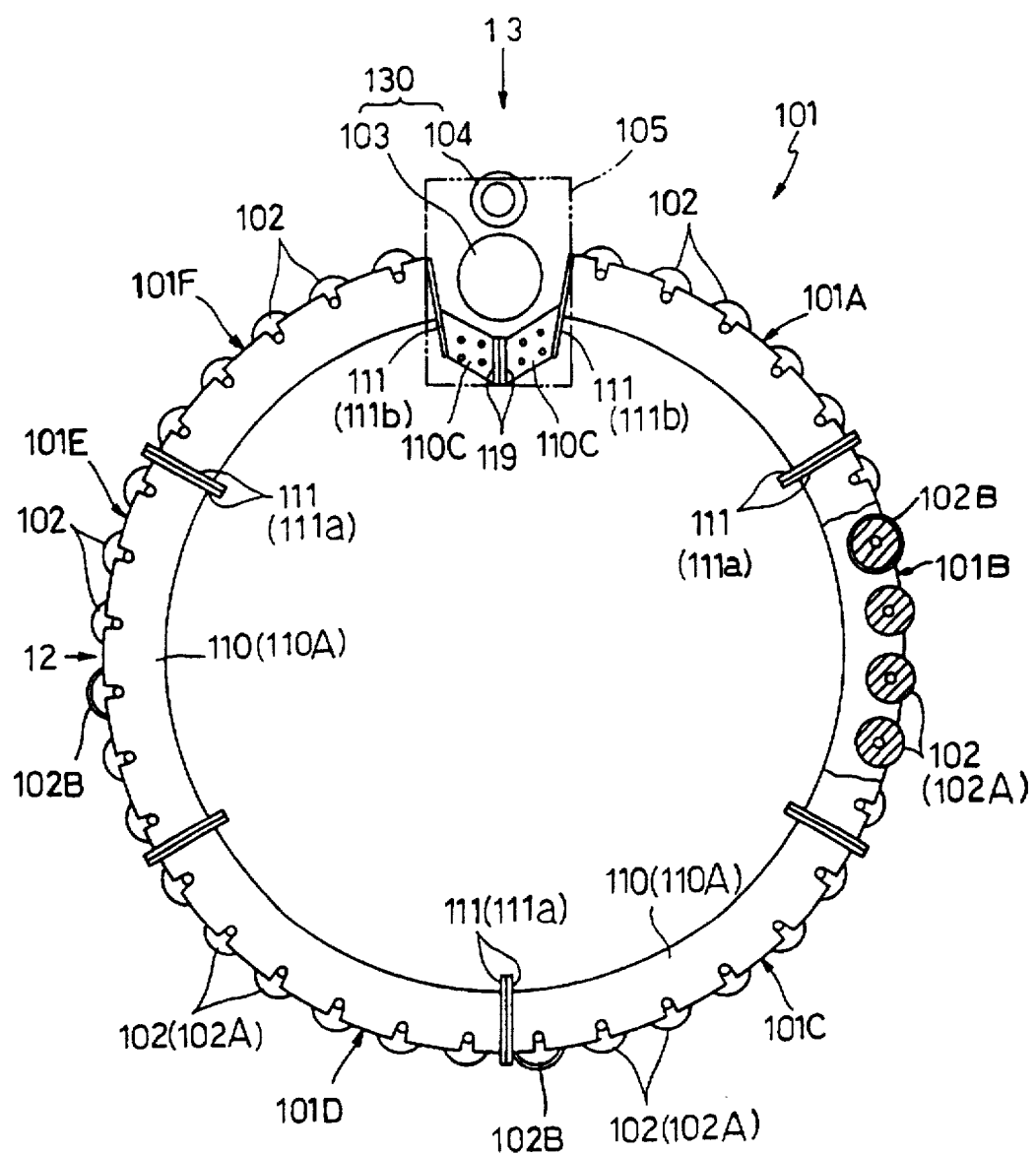
FIG. 11 is an elevation of a mounting frame, a main part of the lining apparatus of pipelines.
Figure 12:
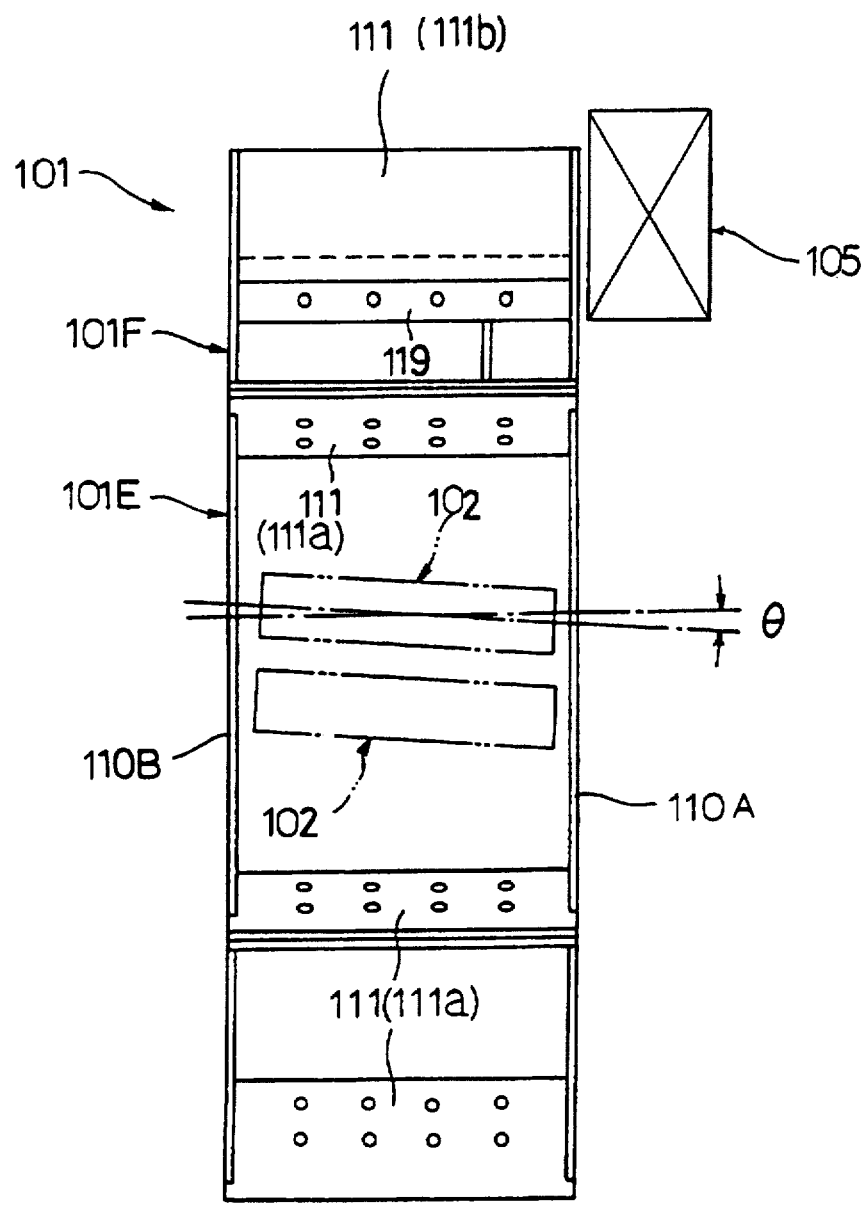
FIG. 12 is a side view thereof (view taken in the direction of 12 of FIG. 11).

As illustrated in FIGS. 10 to 12, the apparatus S2 is mainly composed of a ring-like mounting frame 101, a plurality of guide rollers being arranged with a fixed pitch on the outer circumference of the frame 101, and a jointing mechanism 105 being mounted via the frame 101 and having an inner roller 103 and an outer roller 104.

A description of the details will follow.

Mounting frame 101 (See FIGS. 10 to 13, and 14 to 16.) Mounting frame 101 is ring-like and of a fixed width and thickness to maintain a required rigidity. Mounting frame 101 is, according to the present embodiment, composed of six segments, 101A, 101B, 101C, 101D, 101E, and 101F, the segments 10A to 101F being a ⅙th circle respectively.

Segment 101A is, however, narrower in width, and the other segments 101B to 101F have the standard width. Segment 101A combined with segment 101F forms the mount of jointing mechanism 105.

Figure 14:
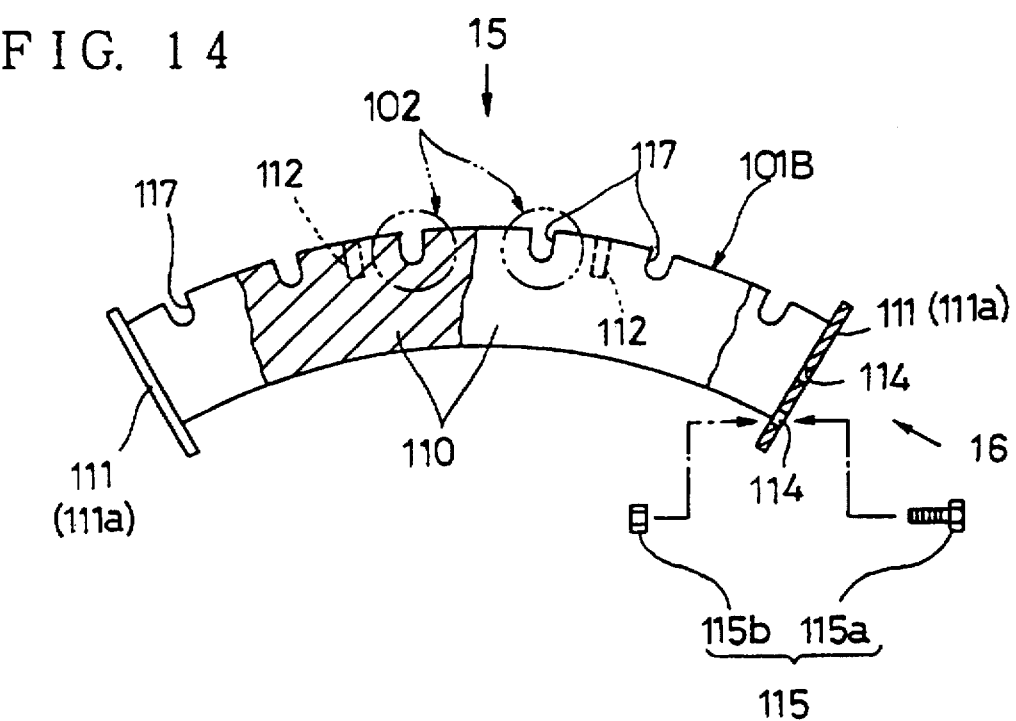
FIG. 14 is a side view of the mounting frame segments.
Figure 15:
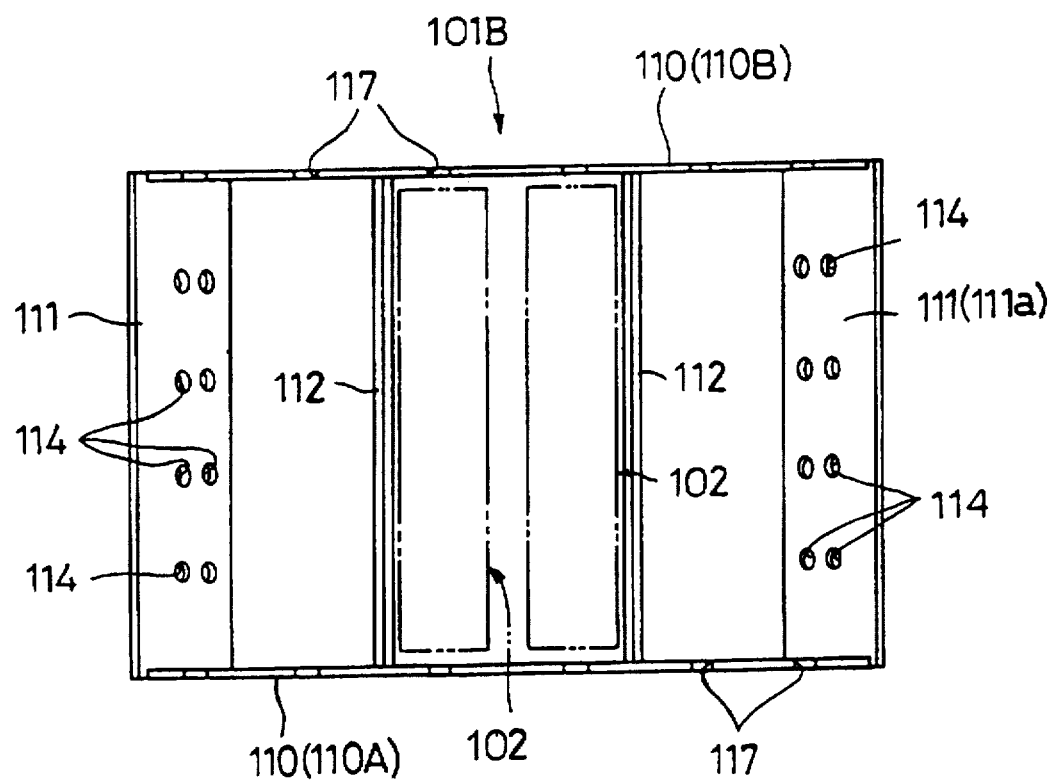
FIG. 15 is a view taken in the direction of 15 of FIG. 14.
Figure 16:
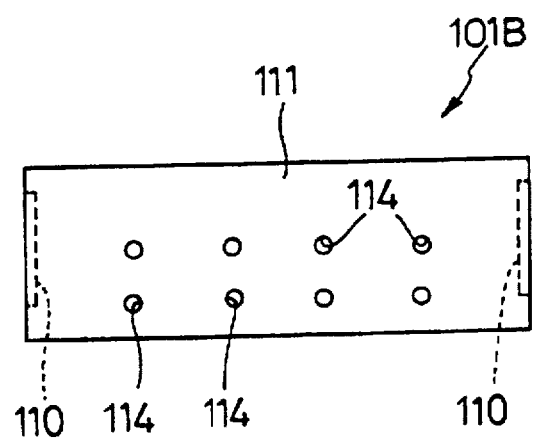
FIG. 16 is a view taken in the direction of 16 of FIG. 14.

The composition of segments 101A to 101F by standard specification is as illustrated in FIG. 14 to 16. That is, a frame is composed of side sheets 110 (front sheet 110A, rear sheet 110B) and flanges 111 at both edges. The frame has fixed rigidity as necessary, and it may be reinforced for rigidity using a reinforcing steel material 112.

According to the standard specifications, side sheets 110 are a ⅙th arc respectively while flanges 111 are so-called short ones 111a.

Flanges 111 have bolt holes 114, and one flange is connected with and secured to the other by means of a clamp consisting of bolt 115a and nut 115b.

On top edge of a side sheet 110 are there formed bearing concaves 117 at fixed intervals to receive guide rollers 102 shafts. Bearing concaves 117 are shifted for phase by rear and front side sheets 110A and 110B in correspondence to the inclination of guide rollers 102.

(Segments 101A, 101F)

Figure 13:
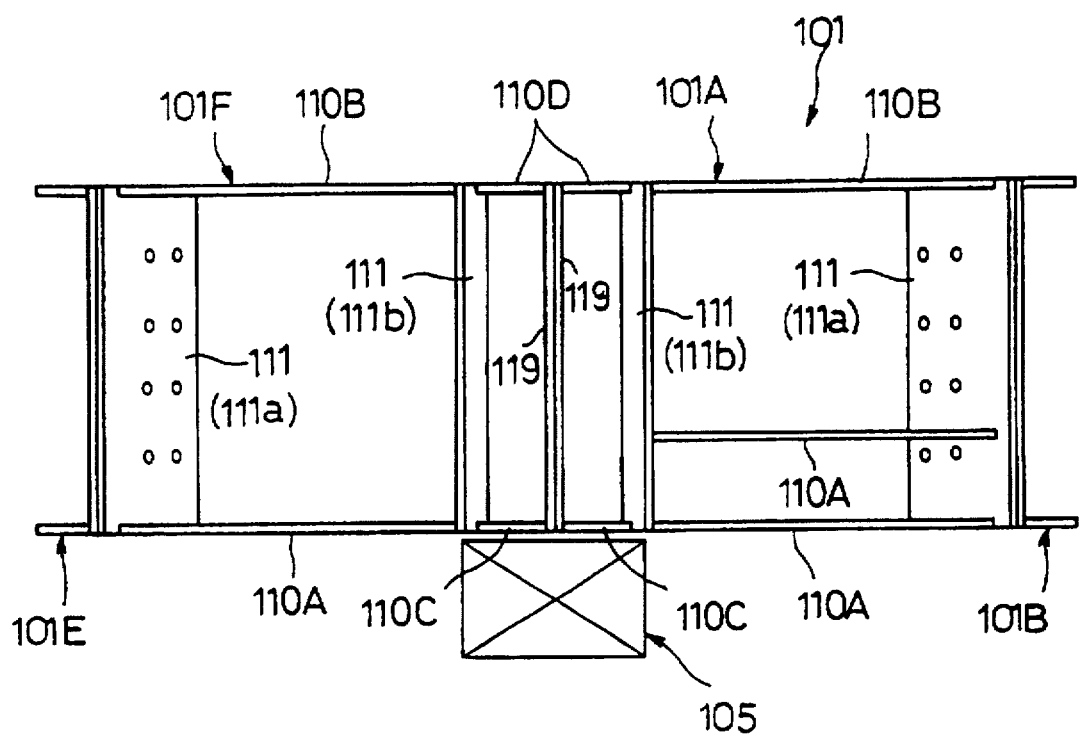
FIG. 13 is a flat view thereof (view taken in the direction of 13 of FIG. 12).

As shown in FIGS. 11 to 13, segment 101A is composed of a main frame body corresponding to 50° and an overhang frame body corresponding to 10°.

The front side sheet 110A of the main frame body is arranged more backward than front sheets 110A of the other segments and is narrower so that it may receive beltlike member 600. One end of the main frame body receives a short flange 111a while the other end a long flange 111b.

The overhang frame is provided with short front and rear sheets 110C and 110D extending from long flange 111b. In addition, there are provided flanges 119 at the other edge of short side sheets 110G and 110D. Flanges 119 have bolt holes 114 as in the other segments, and fitted with clamp 115. Front short side sheet 110C of overhang body is used for connection with jointing mechanism 105. 120 are bolt holes thereof.

Segment 101F is symmetric with segment 101A, but it is the same in width as the standard segments.

Segment 101A and segment 101F are arranged in opposition to each other, and flanges 119 face each other and assembled to be a body using clamps 115 inserted in bolt holes 114.

Guide rollers 102

Guide rollers 102 are arranged on the outer circumference of mounting frame 1 at fixed intervals and angles. According to the present embodiment, there are provided six rollers for the standard segments 101B, 101C, 101D and 101E, and five for segments 101A and 101F.

The mounting angle θ of a guide roller 102 is perpendicular to beltlike member 600 being designed to produce lining pipe R.

In addition, the number of guide rollers 102 depends on the diameter of lining pipe R or guide frame 101. There is no limit to the number so long as it is in a range where the degree of roundness is assured.

Guide rollers 102 are provided in the form of a flat guide roller 102A which comes into contact with the interior of beltlike member 600, and a flanged guide roller 102B which contacts the interior of beltlike member 600 with the flange 127 being designed to engage with concave groove 110 of beltlike member 600. The present embodiment has three flanged guide rollers 102B provided at 90°—intervals starting from inner roller 104 of jointing mechanism 105. The arrangement and number of such flanged guide rollers are not limited to the above-mentioned.

Figure 17:
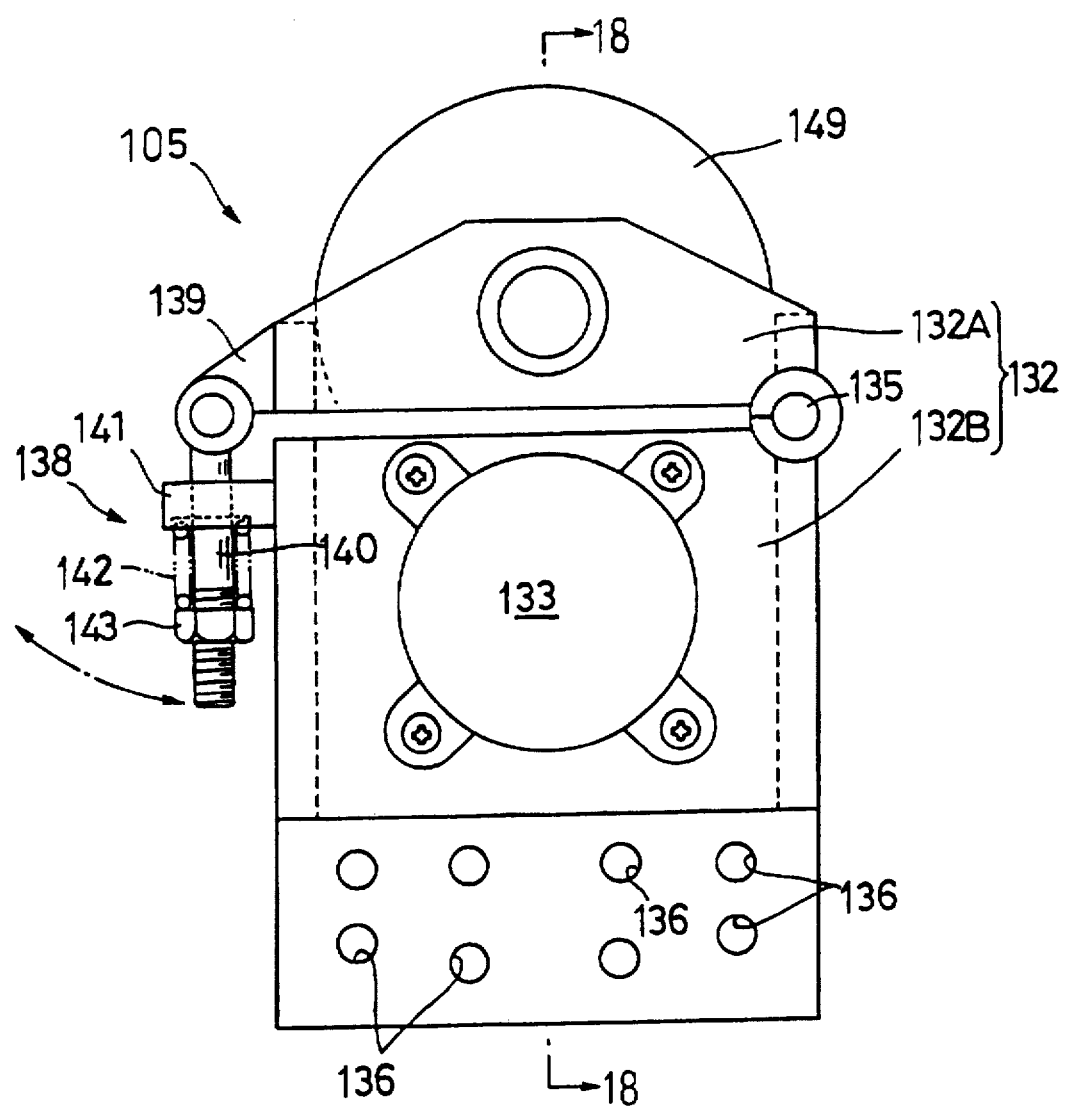
FIG. 17 is an enlarged elevation of a jointing mechanism.
Figure 18:
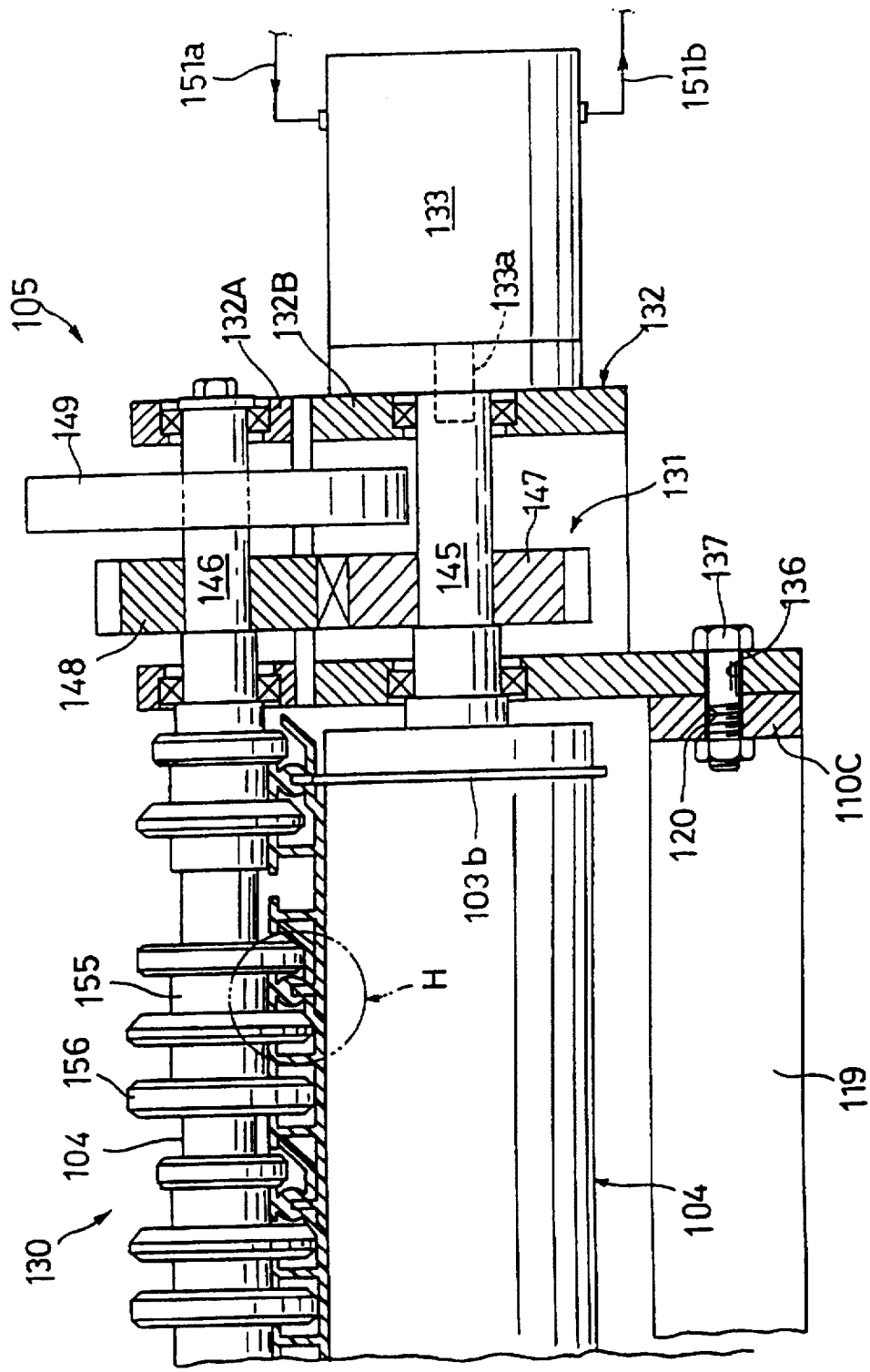
FIG. 18 is a inner composition view of the jointing mechanism (sectional view taken along the lines 18—18 of FIG. 17).
Figure 19:
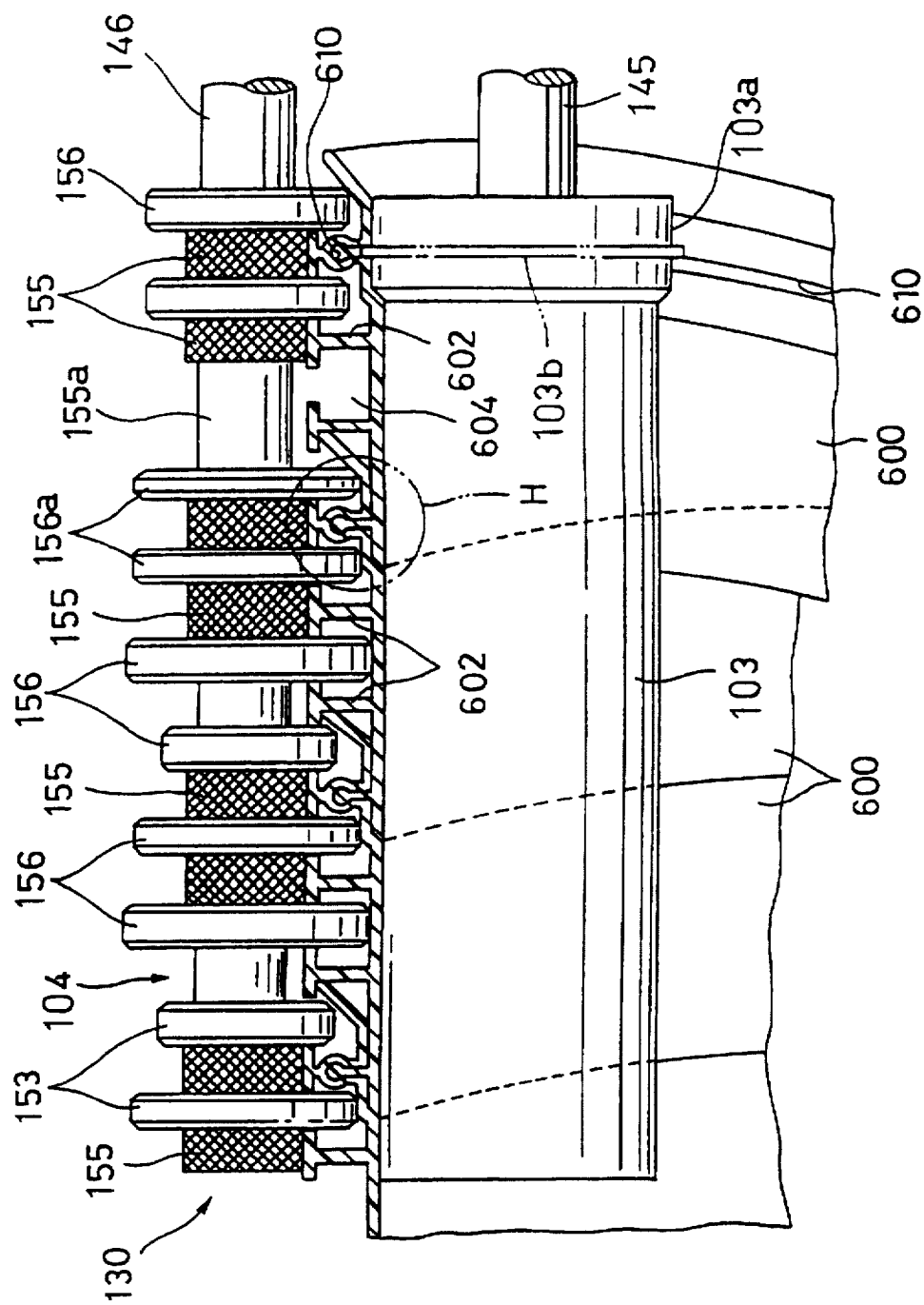
FIG. 19 is an enlarged sectional view of a jointing roller block.

Jointing mechanism 105 (See FIGS. 17 to 19.)

Jointing mechanism 105 is fitted onto mounting frame 101 via side sheet 110C thereof, and its main component is a jointing roller block 130 comprising a combination of an inner roller 103 with an outer roller 104, a box 132 housing a gear 131 to synchronize inner roller 103 with outer roller 104, and a hydraulic motor 133 being mounted onto the box 132 and rotational drive source for the rollers 103 and 104. The block 130 is arranged in correspondence to the jointing position of involutely supplied beltlike member 600, that is, the position where the beltlike member 600 is first closed.

(Box 132) (See FIGS. 17 and 18)

Box 132 is rigid, and divided into upper part 132A and lower part 132B. Upper part 132A and lower part 132B are pivoted by means of a side pin shaft member 135, which makes upper part 132A open on the axis of pin shaft member 135.

Box 132 is supposed to support overall the shafts of gear 131 with upper part 132A and lower part 132B. The front of the lower part 132B of box 132 is used for the mounting of hydraulic motor 133 while the rear thereof extends more downward to come in contact with side sheet 110C of mounting frame 101. Extended rear portion of the lower part 132B is secured to side sheet 110C by matching a bolt hole drilled in the sheet with a bolt hole 136 in the extended rear portion and fastening a set bolt 137.

Onto another side of box 132 is there mounted a closure device 138 to close upper part 132A to lower part 132B. An example is given in FIG. 17, according to which a link rod 140 is pivoted to a rib 139 projecting from upper part 132A. There is a projection from lower part 132B, that is, a forked shelf 141 in the same phase as rib 139, the concave of the shelf 141 being designed to receive link rod 140. Link rod 140 is fitted successively with a coil spring 142 and a nut 143 to engage with a screw provided below. Coil spring 142 is designed to be pressed against the lower part of shelf 141 by fastening nut 143. With this, fastening force of upper part 132A is adjusted adequately with coil spring 142 elasticity.

(Gear 131 and hydraulic motor 133)(See FIG. 18.)

Gear 131 is provided with two shafts 145 and 146 crossing rotatably the front and rear walls of box 132, the first shaft 145 having a gearwheel 147, and the second shaft 146 having a gearwheel 148 to engage with gearwheel 147. The revolutional frequency of shafts 145 and 146 may be adjusted by giving adjustments to the gearwheels 147 and 148.

According to the present embodiment, shafts 145 and 146 are supported by means of rotary bearings. Instead, plain bearings may be used.

In addition, a spacer roller 149 is rotatably mounted onto the second shaft 146 to maintain gaps. Spacer roller 149 contacts the inner wall of pipeline P with the outer circumference thereof. The diameter of spacer roller 149 maybe as adequate or it may be omitted.

A hydraulic motor 133 is mounted onto the front of box 132 with the drive shaft 133a coupled with the first shaft 145. Hydraulic motor 133 is connected with an in-pipe 151a to supply motor 133 with oil, and an out-pipe 151b to exhaust oil from the motor. In addition, the pipes 151 are connected to a rotary joint 152 being mounted onto the box 132 or mounting frame 101 as adequate, the rotary joint 152 being connected to a pipe 153 which is linked with an external pressure source.

With the rotary joint 152, operating fluid is supplied from external pipe 153 without rotation to hydraulic motor 133 pipe 151 with rotation.

Drive force of hydraulic motor 133 is transferred to first shaft 145 by means of gear 131 and hydraulic motor 133, and to second shaft 146 via gear 131. Shaft 145 and shaft 146 are reverse in rotation to each other.

(Jointing mechanism 130) (See FIG. 19.)

Jointing mechanism 130 is such that inner roller 103 and outer roller are mounted side by side in the pipe shaft direction with a certain gap therebetween so that beltlike member 600 is pinched by the rollers.

As seen earlier, in addition, inner roller 103 is directly coupled with first shaft 145 while outer roller 104 is directly coupled with second shaft 104.

Referring now to FIG. 19, the composition of jointing mechanism 130 will be detailed below.

FIG. 19 is an enlarged view of outer and inner rollers 103 and 104 of jointing roller block 130, and the correspondence of the rollers with beltlike member 600. As illustrated, the rollers 103 and 104 according to the present embodiment are so arranged to cover a plurality of spans (3 with the present embodiment) of beltlike member 600. In addition, H shows the closure where beltlike member is first closed. Outer roller 104 is provided with a plurality of ring flanges 156 being formed onto the cylindrical body 155 at fixed intervals, the ring flanges 156 being for fitting into grooves 604 between projections 602 of beltlike member 600. The outer circumstance of cylindrical body 155 is pressed against the exterior of beltlike member 600 projections 602. The exterior of cylindrical body 155 has been knurled in order to prevent slippage from beltlike member 600. Part 155 of the cylindrical body 155 is reduced in diameter to come out of the projections 602.

Ring flanges 156 contact beltlike member 600 with a pair of ring flanges 156a by their circumferences, the pair being correspondent to the closure H.

It is not necessary, however, for the other ring flanges 156 to contact beltlike members 600 although it is of importance for the flanges to fit into grooves 604 between projections 602.

Inner roller 103 is, on the other hand, cylindrical and so close to the interior of beltlike members 600 as to support them, including the closure H, when they are pressed from outside by means of outer roller 104. In addition, there is formed a larger-diameter portion 103a at the front edge of inner roller 103, the portion 103a having a projecting flange 103b to engage with groove 610 of belt-like member 600. The flange 103 may be, however, omitted as adequate. The mounting lining pipe R with jointing mechanism 105 is performed by opening upper part 132A of box 132, matching ring flanges of outer roller 104 with the pitches of beltlike member 600 projections 602, positioning ring flanges 156a to the closure H, closing upper part 132A to lower part 132B, closing closure unit 138 and fastening nut 143.

Lining a pipeline P

A description will be given below to lining work for an underground pipe, using the lining apparatus S2 of the present embodiment.

Figure 20:
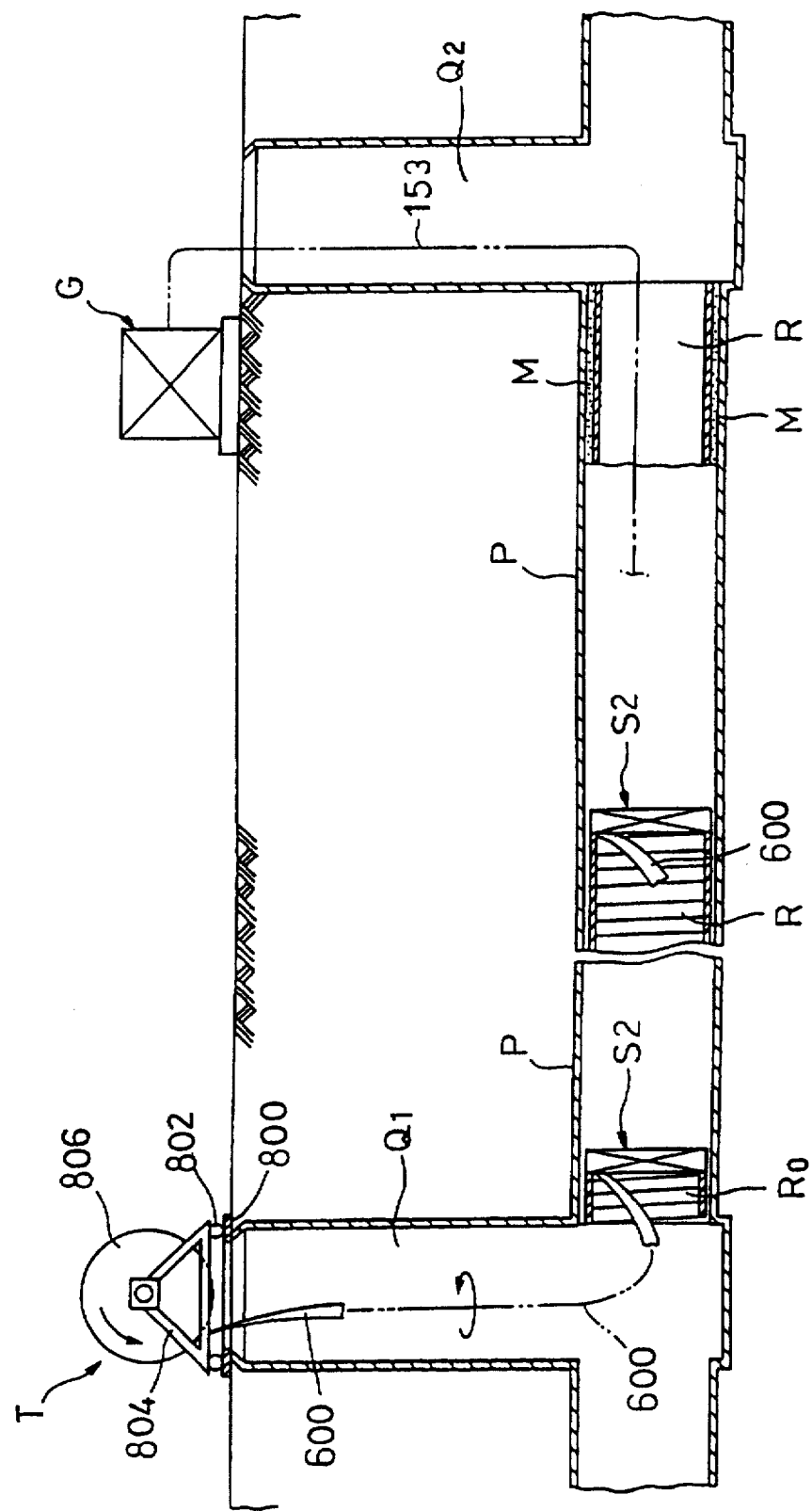
FIG. 20 shows the execution procedures.
(Third embodiment)

FIG. 20 shows an outline of lining work. In FIG. 20, Q1 denotes an upstream manhole, Q2 a downstream manhole, T an unwinder with a rotary table and G a hydraulic drive source. The lining work will be described below in the order of processes.

(1) The lining apparatus S2 is brought by segments into the target pipeline P via manhole Q1, and assembled therein. That is, mounting frame 101 of the present apparatus S2 is composed of segments 101A to 101F, readily to assemble, while jointing mechanism 105 may be mounted onto the frame 101 and assembled with ease at site. Segments 101A to 101F of mounting frame 101 are assembled togetherinto a body by means of clamps 115 fitted onto their flanges 111. Jointing mechanism 105 is mounted to mounting frame 101 with the box 132 rear being bolted to side sheet 110C of the frame 101 using a set bolt 137.

(2) Beltlike member 600 pulled in from ground at the starting point of manhole Q1 of pipeline P is manually wound a few times (three times or so) to produce a lining pipe Ro (starting lining pipe).

(3) At the front edge of starting lining pipe Ro is there installed in position jointing mechanism 105 of the lining apparatus S2. That is, outer roller 103 and inner roller 104 of jointing roller block 130 are arranged at the closure of lining pipe Ro before fitting ring flange 156 of outer roller 103 into groove 604 of beltlike member 600. In particular, ring flange 156a shall be correctly in contact with the closure H. Flange 104b of inner roller 104 is fitted into concave groove 610 of beltlike member 600, and flange 127 of a flanged guide mechanism 102B is engaged with concave groove 610 of beltlike member 600.

(4) With jointing mechanism 105 rotated, outer roller 103 and inner roller 104 pinch and connect beltlike member 600, which is supplied, following starting lining pipe Ro, with starting lining pipe Ro at the closure H thanks to the construction of joints of the member 600. At the same time, jointing mechanism 130 revolves in the pipe circumferential direction and advances in the pipe shaft direction on engagement of ring flange 156 of outer roller 103 with groove 604 of beltlike member 600.

The revolution of jointing mechanism 105 and engagement of flanged guide roller 102B flange 127 with concave 604 of beltlike member 600 enables the apparatus S2 to advance with a fixed pitch.

As a result, beltlike member 600 is involutely supplied to produce lining pipe R.

(4A) In the process, guide rollers 102 as arranged on the outer circumstance of mounting frame 101 contact the inside of lining pipe R continuously, so that lining pipe R of a certain diameter may be formed in a steady manner.

(4B) In addition, beltlike member 600 is successively provided, according to the present process, from unwinder T installed on the ground.

Along with pipe making, beltlike member 600 twists, but unwinder T synchronizes with and rotary table 804 follows beltlike member 600.

(5) After lining pipe R covers the overall length of pipeline P, gaps between them will be filled with cement milk. Lining will be completed when cement milk sets.

(Effects of the second embodiment)

The method of in-pipeline lining according to the present embodiment is implemented in the above-mentioned mode, and it will show the following effects:

According to the lining apparatus of the present embodiment lining pipe R as produced is left behind within pipeline P as it is, with no restriction against the diameter and length of lining pipe. Accordingly, a long lining pipe will be available.

In addition, lining pipe R with a curve may be so produced as to cope with pipeline P with a curve.

The engagement of ring flange 156 of outer roller 103 with groove 604 of beltlike member 600 helps guide the apparatus S2 with a fixed pitch to produce lining pipe R in a steady manner.

As the lining apparatus S2 of the present embodiment is equipped with a rigid, ring-like mounting frame 101 with guide rollers 102 being arranged on the outer circumstance of the frame, lining pipes R with a high degree of roundness may be produced.

The present embodiment may be changed in design as follows:

① The mounting frame may be segmental or one-piece type, and the number of segments may not be limited.

② The guide rollers 102 may be smooth guide rollers 102A or flanged ones 102B.

③ The jointing mechanism 105 may be hydraulically, pneumatically or electrically motor driven. When a pneumatic motor is used, rotary joints 152 may be available.

When an electric motor is used, the rotary joints will be replaced with rotary brushes.

A manual mechanism is also available. Rollers 103 and 104 may be driven through handle operations via gear 131.

THIRD EMBEDMENT

FIGS. 21 to 32 illustrate another embodiment of the present invention, that is, a lining apparatus (third embodiment) S3 to line a pipeline of differing cross-section.

Figure 21:
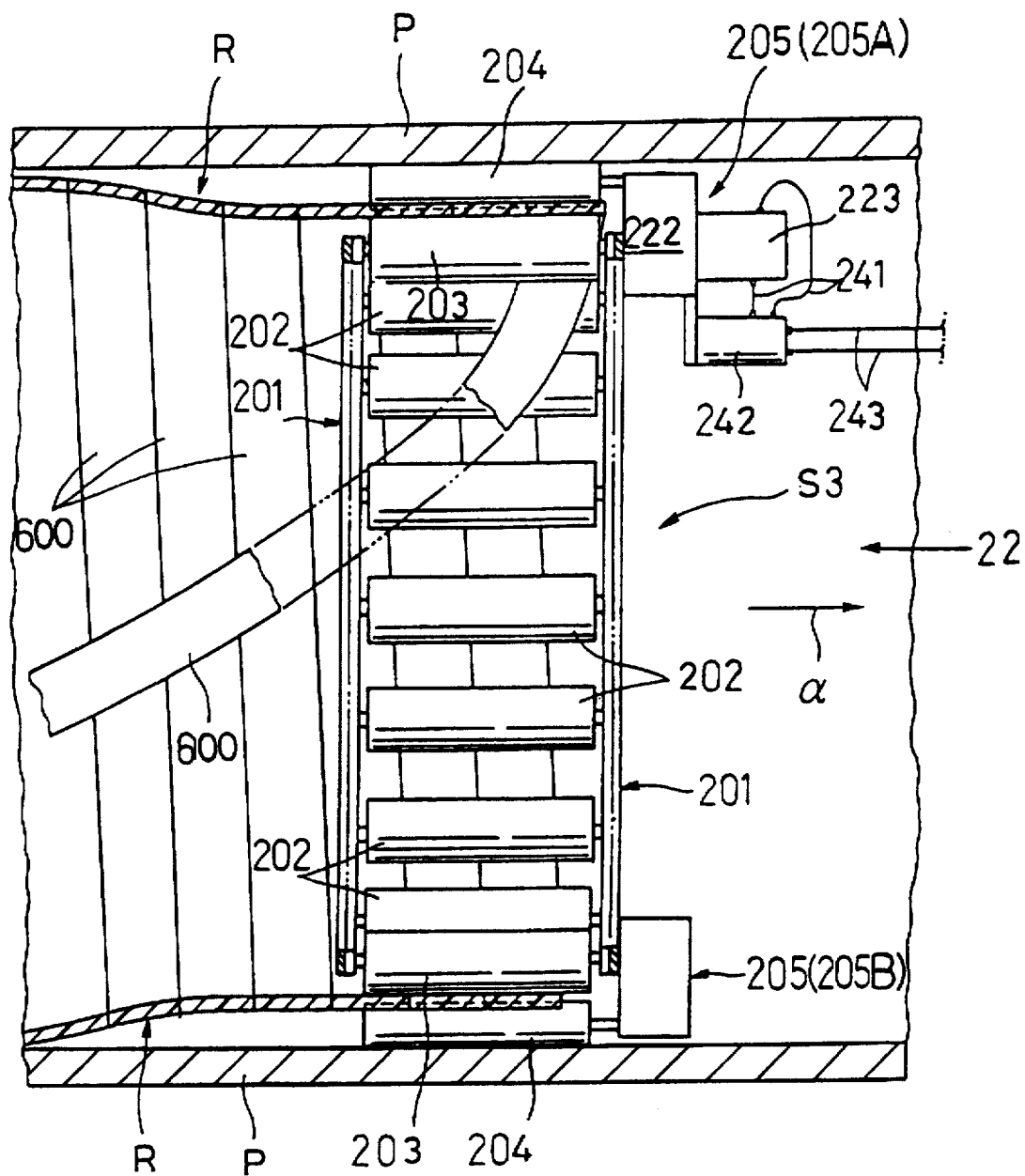
FIG. 21 is a vertical sectional view showing the whole of the lining apparatus S3 of another (third) embodiment of the present invention (sectional view taken along the lines 21—21 of FIG. 22).
Figure 22:
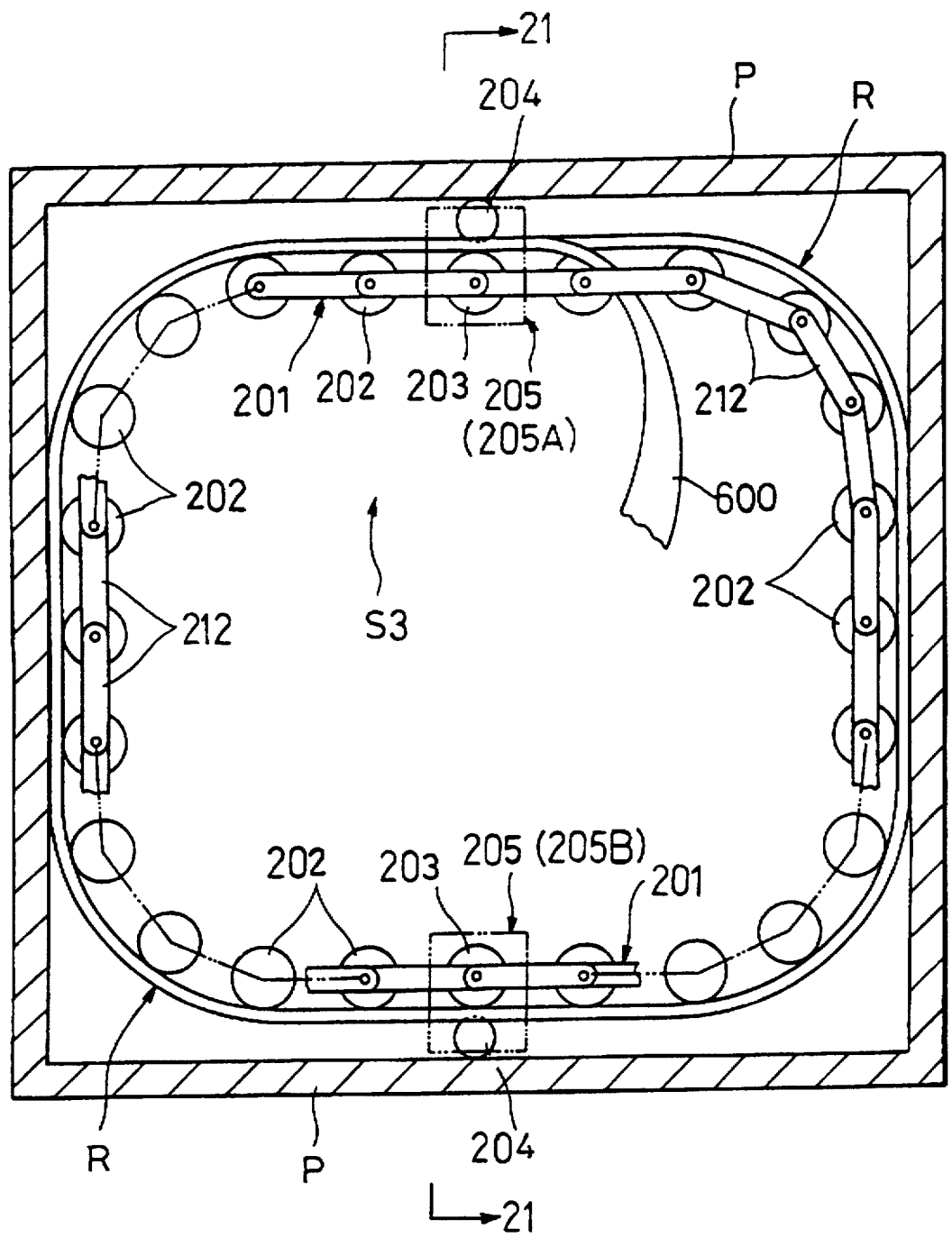
FIG. 22 is an elevation thereof (view taken in the direction of 22 of FIG. 21).
Figure 23:
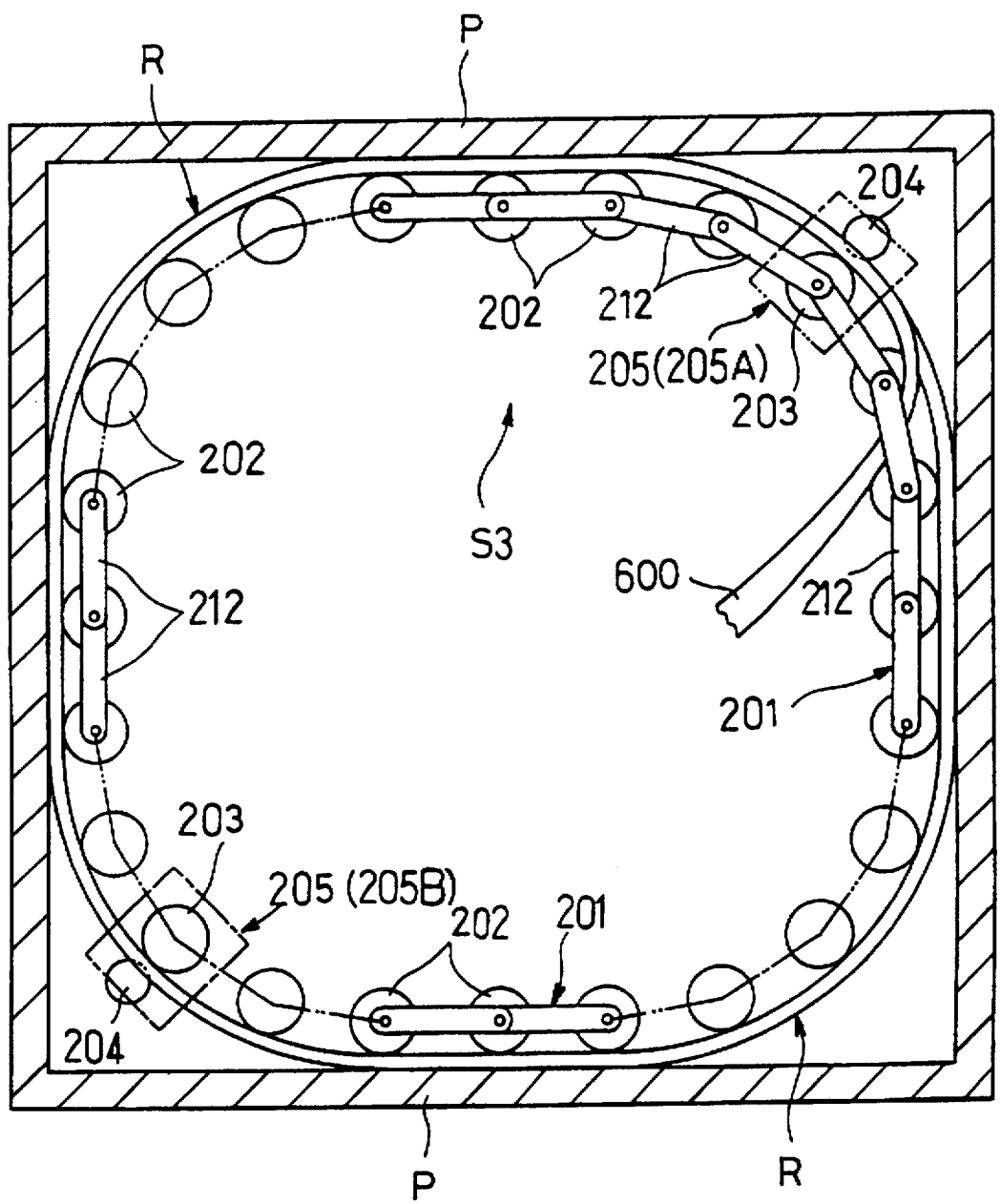
FIG. 23 is another elevation thereof.

In the following, the present embodiment applies to a pipeline which is rectangular in section. That is, FIGS. 21 to 23 show the overallcomposition of the apparatus S3 while FIGS. 24 to 32 the composition of each part thereof. Beltlike members 600, 620 and 640 apply to the present embodiment.

Lining apparatus S3 (See FIG. 21 to 32.)

As shown in FIGS. 21 to 23, the lining apparatus S3 is comprised of ① a ring-like, flexible forming frame 201 having a fixed width and being provided with a link mechanism consisting of a plurality of link bodies, ② a plurality of guide rollers 202 arranged respectively onto the link mechanism shafts of forming frame 201, and ③ main and sub jointing mechanisms 205 including an outer roller 203 and an inner roller 204 (main jointing mechanism 205A, sub jointing mechanism 205B), the mechanisms being mounted onto two positions of the frame 201 which are in opposition to each other.

In addition, FIGS. 21 and 22 show Position 1 and FIG. 23 Position 2 of the apparatus S2 in the course of pipe making. The following is a description of the details.

Forming frame 201 (See FIG. 21 to 27.)

Figure 24:
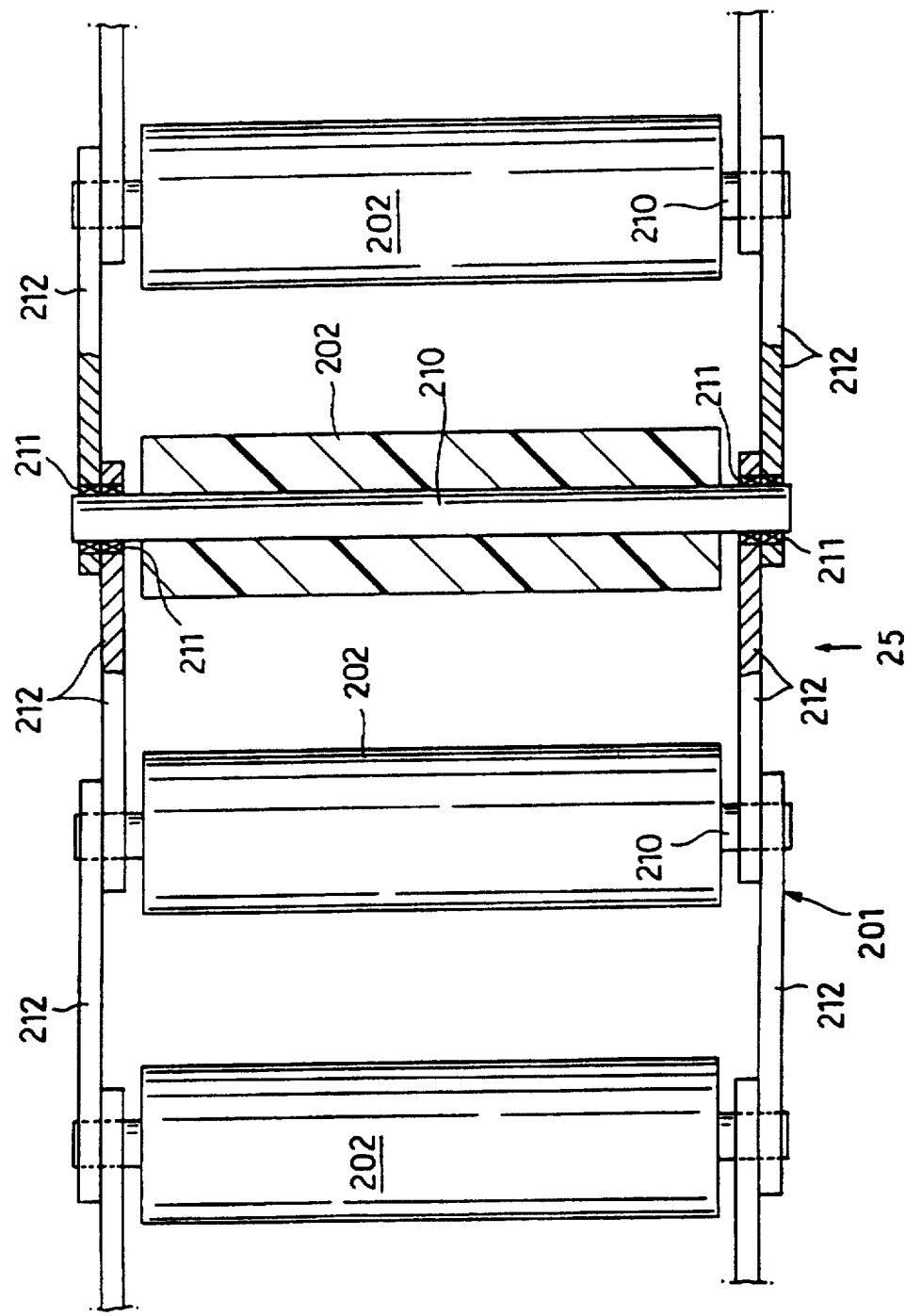
FIG. 24 is a partial sectional top view of a forming frame.
Figure 25:
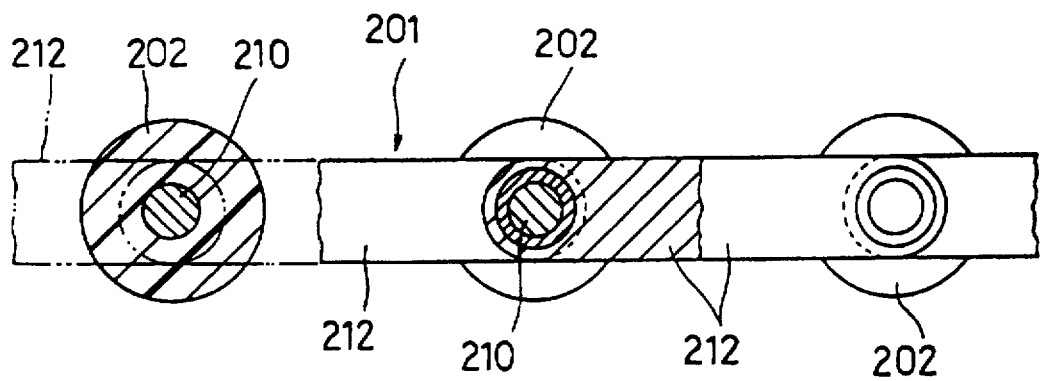
FIG. 25 is a view taken in the direction of 25 of FIG. 24.

Forming frame 201 has a fixed width, and is ring-like and flexible in the outer circumferential direction with a link mechanism. It also has lateral rigidity. Thus the ring-like frame is equipped with a chain of links made of ranging a plurality of link bodies. According to the present embodiment, the ring-like frame has a chain of links consisting of 24 link bodies. However, it is not to be understood that the number of link bodies is limited. More particularly, each link body is, as shown in FIGS. 24 and 25, composed of a rod-like shaft having a specific length and a leaf-like link arm 212 rotatably coupled at both ends of the shafts 210 between shafts 210 adjoining each other via bearings 211.

Figure 26A:
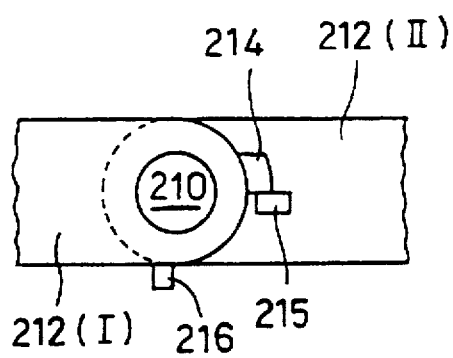
FIG. 26 is a composition view of a forming frame link body.
Figure 26B:
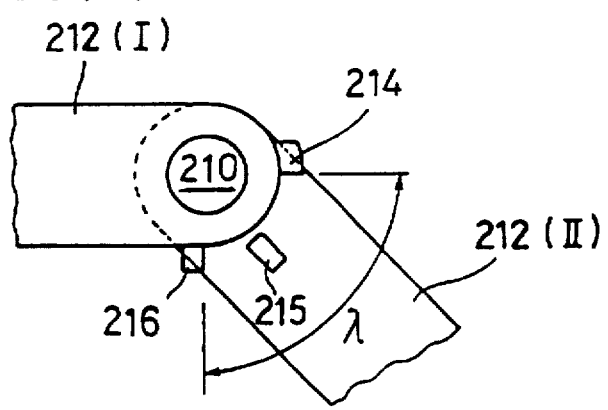
Figure 27:
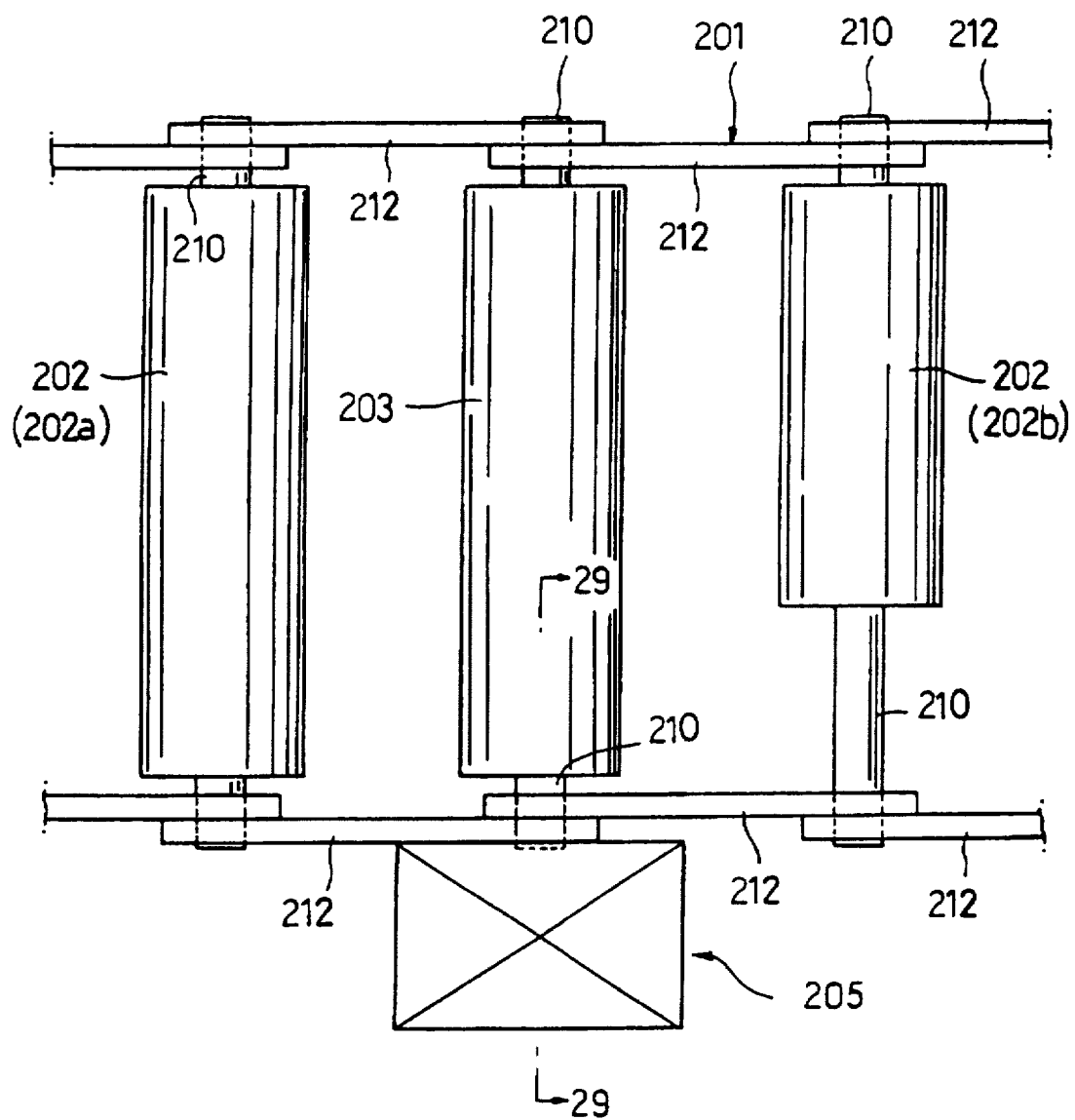
FIG. 27 is a top view of a jointing mechanism.

Link arms 212 may be expanded outwardly on a 180° basis but they are prevented from being dented inwardly because of a prevention mechanism provided to this effect. FIG. 26 shows an example of such a mechanism. That is, a main stopper 214 is projected at the edge of one link arm 212 (I), and there is provided at the edge of another link arm 212

(II) a stopper receiver 215 projecting toward link arm 212 (I). Link arms are prevented from being folded inwardly when main stopper 214 makes contact with stopper receiver 215. 216 is a sub stopper to restrain the angle (λ) of outward expanding.

Guide rollers 202 (See FIGS. 21 to 25, and 27.)

Guide rollers 202 are provided rotatably on the shafts 202 of forming frame 201. Guide rollers according to the present embodiment are mounted onto the shaft 201 en bloc, but they can be mounted via bearings. The roller body is made of hard synthetic resin and comes into contact with the interior of beltlike member 600. The standard guide roller 202 (202a) is long enough to cover the internal width of a link body, but the guide roller 202 (202b) provided in a required number (usually 1) at the front of jointing mechanism 205 which appears later is shorter by the width of beltlike member 600 (see FIG. 7).

Jointing mechanism 205 (See FIGS. 21 to 23, 27 to 32.)

Jointing mechanism 205 is composed of a pair of main and sub jointing mechanisms 205A, and 205B, and fitted diagonally to the forming frame 201. Jointing mechanism 205's main component is a jointing roller block 202 consisting of a pair of inner and outer rollers 203 and 204, and the mechanism comprises a box 222 housing a gear 221 for synchronizing the rollers with each other in rotation, and a hydraulic motor being mounted onto the box 222 as a rotary drive source for the rollers 203 and 204. The main roller mechanism 205 is mounted corresponding to the position where involutely wound beltlike member 600 is jointed, that is, where the beltlike member 600 is first closed.

Inner roller 203 is fitted onto the shaft 210 of forming frame 201 like guide rollers 202.

Figure 28:
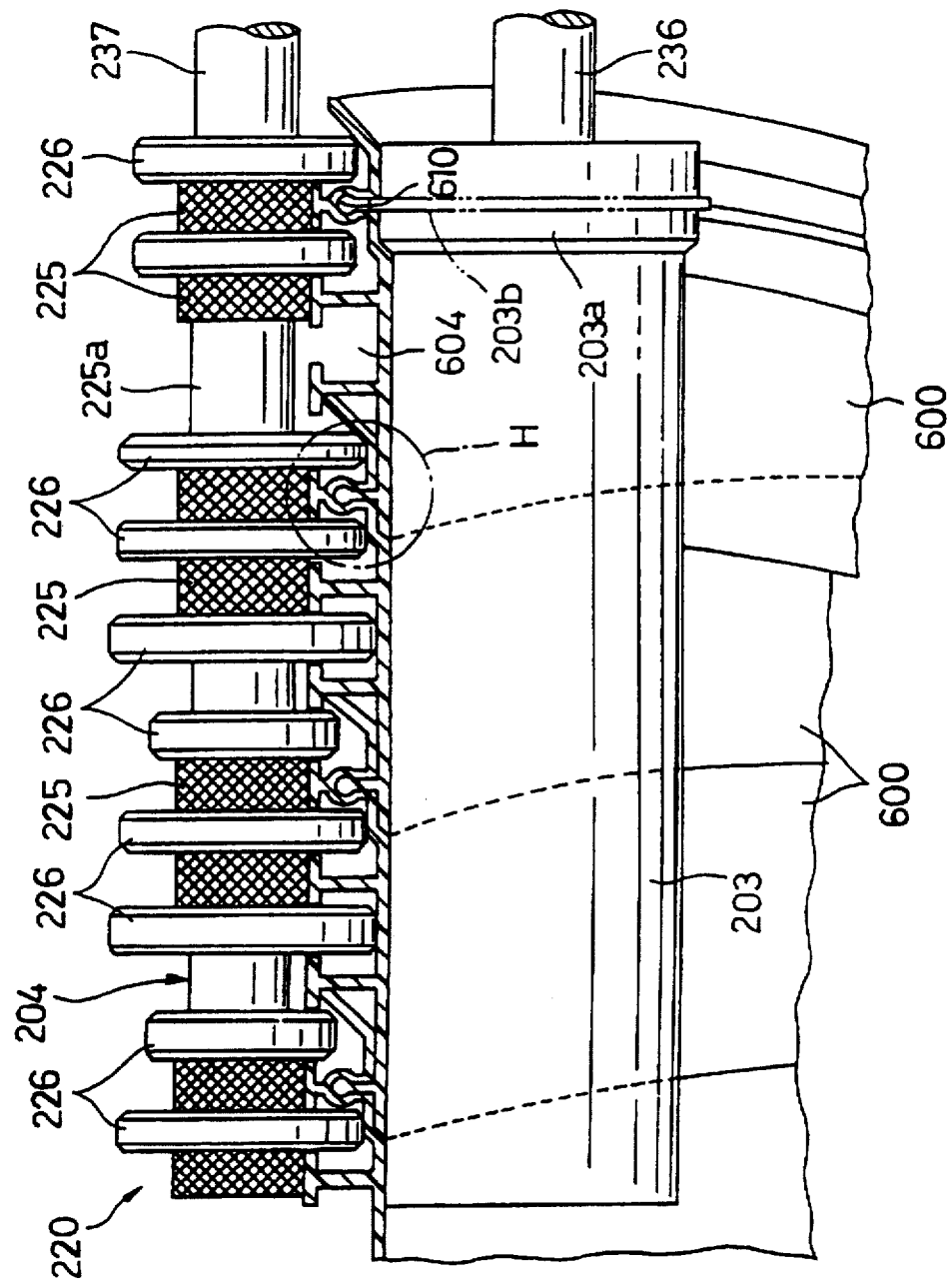
FIG. 28 is a composition view of the jointing roller block of the jointing mechanism.

(Jointing roller block 220) (See FIG. 28.)

Jointing roller block 220 is such that inner roller 203 and outer roller 204 are arranged side by side in the pipe shaft direction with a certain space between them so that they pinch beltlike member 600.

The rollers 203 and 204 rotate, interlocking with the drive shaft of gear.

Referring now to FIG. 28, the construction of jointing roller block 220 will be described in detail below.

FIG. 28 is an enlarged view of inner and outer rollers 203 and 204 of jointing roller block 220, together with the correspondence of the rollers with beltlike member 600. As shown, the rollers 203 and 204 are so arranged as to cover the spans of a plurality of beltlike members 600 (3 according to the present embodiment). H shows the closure where portions of beltlike member 600 are first closed. Main jointing mechanism 205A is arranged in relation to the closure H. Accordingly, the front guide roll 202 (202b) ahead of main jointing mechanism 205A is made shorter by a span of beltlike member 600 to enable the beltlike member to be pulled in.

Inner roller 202 is cylindrical and designed to be close to the interior of beltlike member 600 to support the member when it is pressed from outside by outer roller 204, including the closure H. In addition, there is produced a diameter enlarged portion at the front edge of inner roller 203. In addition, a flange 203 is provided at the diameter enlarged portion 203a to meet with an internal groove 610 of belt-member 600. The flange may be, however, omitted. Outer roller 204 is provided with a plurality of ring-like flanges 226 at fixed intervals on the cylindrical body 225, the flanges 226 being designed to come into grooves 604 between beltlike member 600 projections 602. The outer circumference of the cylindrical body 225 is pressed against the exterior of beltlike member 600 projections. Cylindrical body 225 has been knurled at the exterior to prevent slippage with beltlike member 600. Part 225 of the cylindrical body 225 is reduced in diameter to come out of projections 602.

As to ring flanges 226, a pair of ring flanges 226a in relation to the closure H come into contact with beltlike member 600 with their circumference. It is not always necessary for the other ring flanges 226 to make contact with beltlike member 600. Important is for the flanges to fit into grooves 604 between projections 602.

What was described in relation to FIG. 28 goes for beltlike members 620 and 640, too.

As to beltlike member 640, fitting material 650 is arranged at the closure H.

Figure 29:
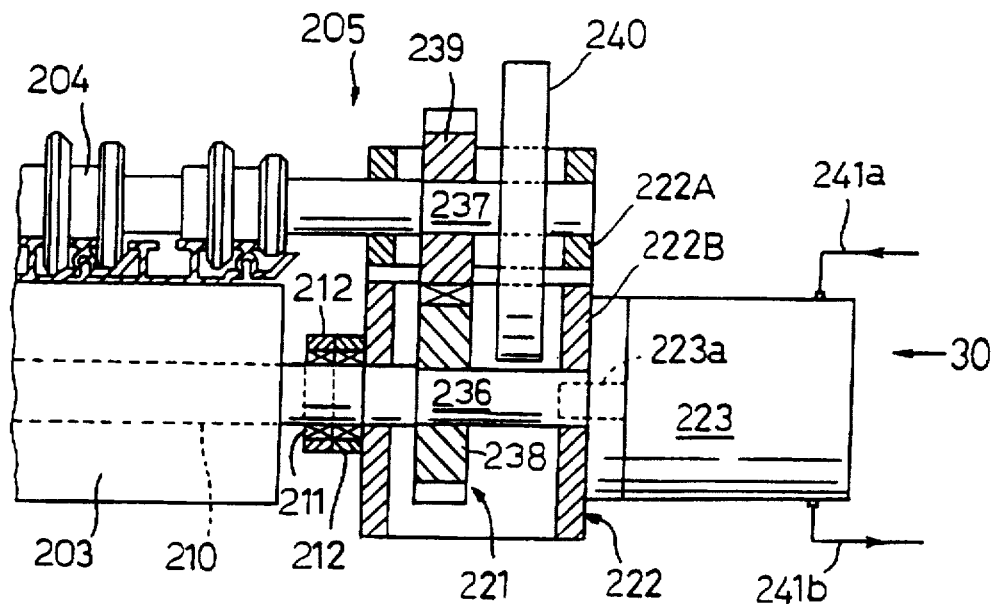
FIG. 29 is a sectional view taken along the lines 29—29 of FIG. 27.
Figure 30:
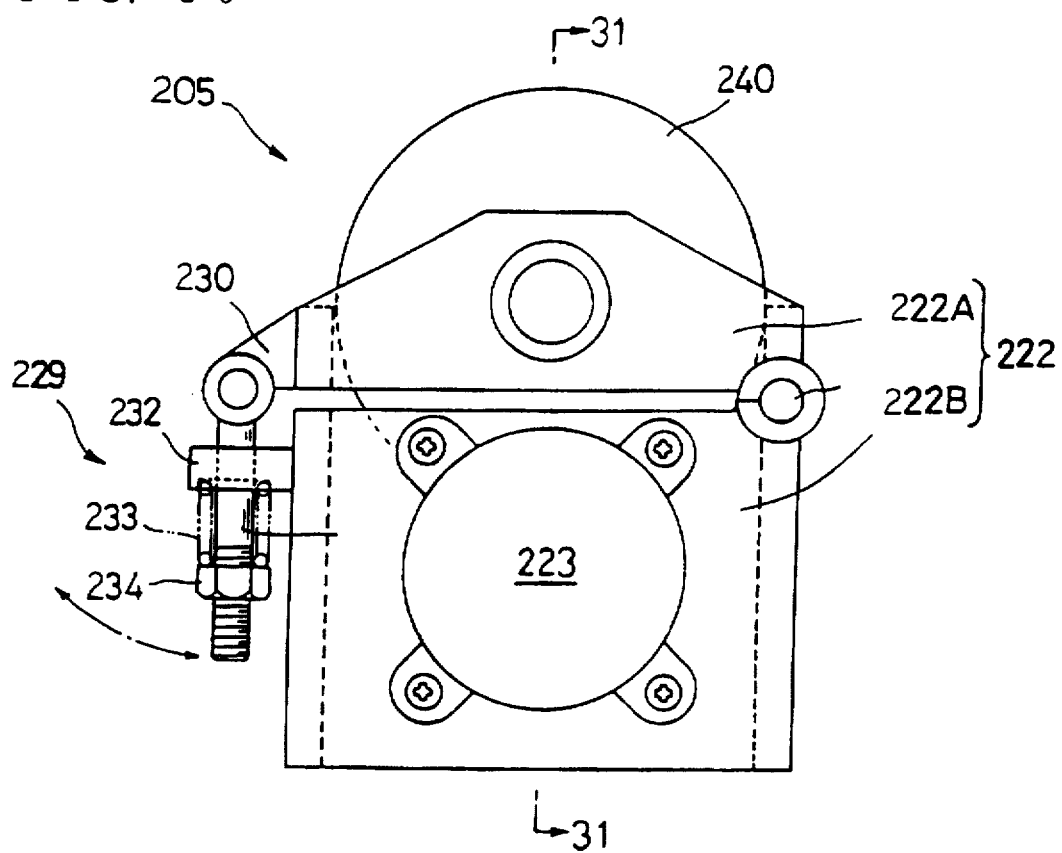
FIG. 30 is a view taken in the direction of 30 of FIG. 29.

(Box 222) (See FIGS. 29 and 30.)

Box 222 is rigid, and divided into upper part 222A and lower part 222B. With a pin shaft member 228 at the side, upper part and lower part 222A and 222B are pivoted. The upper part 222A is openable on the axis of pin member 228.

Box 222 supports the shaft of a gear 221 with front and rear side from upper part 222A to lower part 222B. Lower 222B is secured to link arm 212 of forming frame 202 by way of box rear while the front is used as mount for a hydraulic motor 223.

A closure device 229 is mounted onto another side of the box 222 which is intended to close upper part 222A to lower part 222B. Shown is an example, according to which a link rod 231 is pivoted to a rib 230 projecting from upper part 222A, and a forked shelf 232 is provided in the same phase as rib 230, projecting from lower part 222B so that link rod 231 comes into the concave of the table 232.

Link rod is fitted successively with a coil spring 233 and a nut 234 to engage with a screw below. By fastening nut 234, coil spring 233 is pressed against the lower part of the shelf 232, thereby the tightening force of upper part 222A is adjusted as adequate with coil spring 233 elasticity.

(Gear 221 and hydraulic motor 223) (See FIG. 29.)

Gear 221 is provided with shafts 236 and 237 crossing rotatably the front and rear walls of the box 222, the first shaft 236 having a gearwheel 238 secured, and the second shaft 237 having a gearwheel 239 to engage with gearwheel 238. The first gearwheel 236 is connected to inner roller 203, and the second gearwheel 237 to outer roller 204.

By adjusting the number of teeth, the revolutional frequency of each of the shafts 236 and 237 may be adjusted. The shafts 236 and 237 in the present embodiment are supported by means of rotary bearings, but plain bearings may be used, instead.

Furthermore, a spacer roller 240 is mounted rotatably onto the second shaft 237, the spacer roller 240 being intended to come into contact with the inner wall of pipeline P by its outer circumstances. The spacer roller 240 may be adequate in diameter or it may be omitted.

Hydraulic motor 223 is mounted to the front of the box 222 with the drive shaft 223a coupled with the first shaft 233. There are connected to the hydraulic motor an in-piping 241a to feed oil to the motor 233 and an out-piping 241b to discharge oil from the motor 233. In addition, the piping 241 is connected to a rotary joint 242 (see FIG. 21) being mounting to the box 222, the joint 242 being connected to a piping 243 which is connected with an external pressure source.

Operating fluid is supplied to the piping 242 on the hydraulic motor 223 side with rotation from the external piping 243 without rotation.

With the gear 221 and hydraulic motor 223, the drive force of the motor 223 is transmitted to the first shaft 236, and then to the second shaft 237 by way of gear 221. The shafts 236 and 237 are reverse to each other in rotation. Jointing mechanism 205 is mounted to lining pipe P is performed by opening upper part 222A of the box 222, matching the ring flanges 226 of outer roller 204 with the projections 202 pitches of beltlike member 600, positioning the ring flanges 226a to the closure H, closing upper part 222A to lower part 222B, closing the closure device 229 and fastening the nut 234.

As seen from above, the jointing mechanism 205 is secured to the link arm 212 of the forming frame 201 via box 222. There is a measure to be taken to always keep the box 222 of the mechanism 205 perpendicular to the shaft 210.

Figure 31:
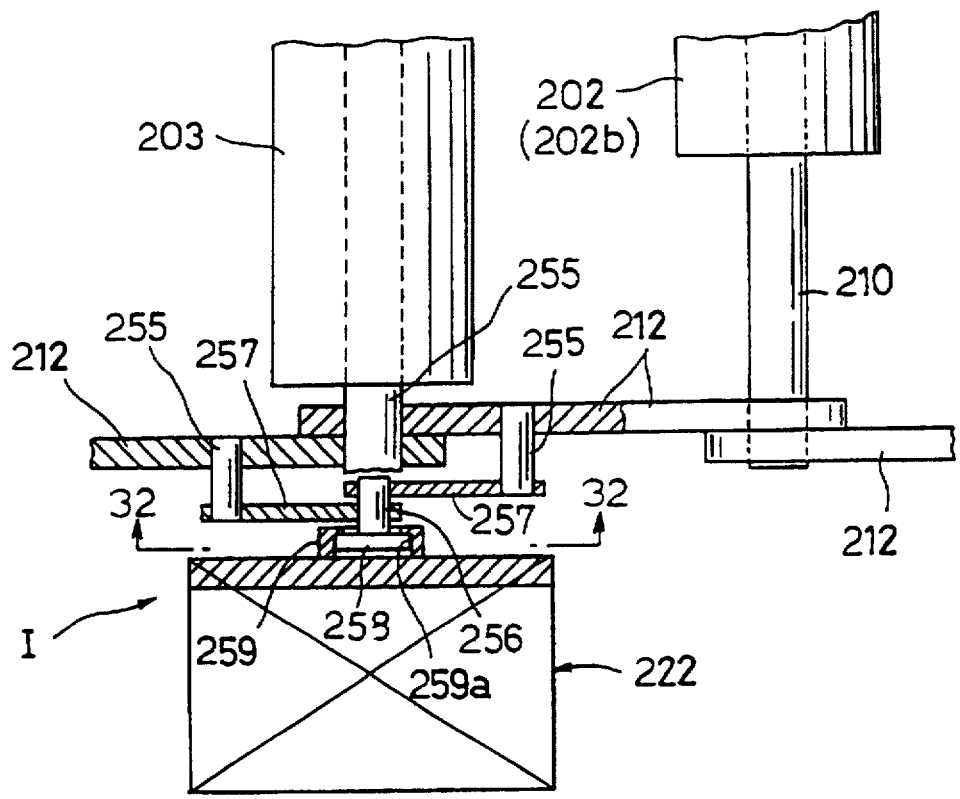
FIG. 31 is a view of another way of mounting of a jointing mechanism.
Figure 32:
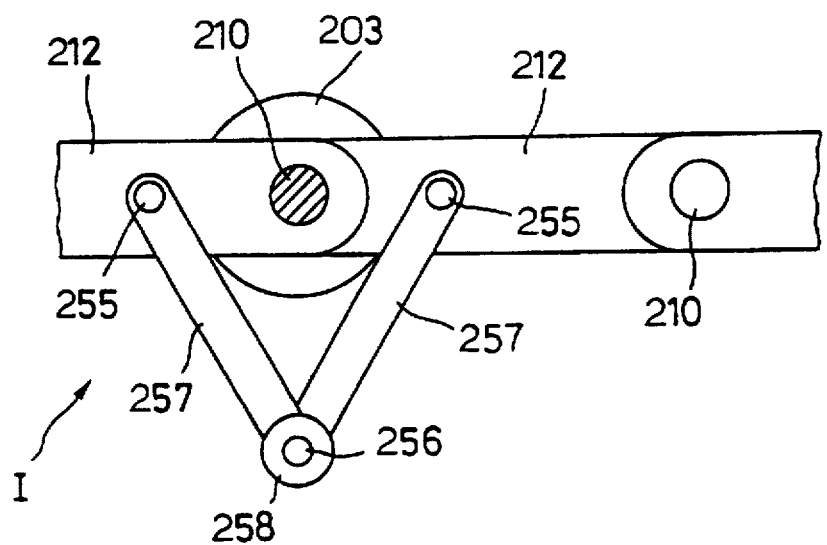
FIG. 32 is a sectional view taken along the lines 32—32 of FIG. 31.

FIGS. 31 and 32 show an embodiment of a position retention mechanism I.

The position retention mechanism I is composed of two. V-like stays 257, one end of each stay pivoted to the link arm 212 via a pin shaft 255 and the other end pivoted to a pin shaft 256, a fixing 258 fitted rotatably to the tip of the pin shaft 256, and a guide body 259 being secured to the rear of the box 222 and having a groove 259a to introduce fixing 258 in the diametric direction.

As seen from above, when the link arms pinching the jointing mechanism 205 bend inwardly, the stays 257 narrow the V-shaped angle with the shaft 210 and the pin shaft 256 as axis of symmetry while the pin shaft 256 moves inwardly. Fixing 258 at the edge of the pin shaft 256 moves as led by the groove 259a of the guide body 259. As a result, the box 222 is able to keep perpendicular to the pin 210 at all times by being held by means of the pin 210 and pin shaft 256.

The forming frame 201 incorporated with the guide rollers 202, when set up in the pipeline P, keeps rectangular as a whole, although it is kept round at the corners of the pipeline P.

Positions 1, 2

FIGS. 21 and 22 show Position 1 when lining pipe R is being produced, and FIG. 23 shows Position 2.

Position 1 shows such a state that the jointing mechanism 205 is in contact with the inner wall of the pipeline rectangular in section. Position 2 shows such a state that the jointing mechanism 205 reaches one corner of the pipeline rectangular in section and leaves the inner wall thereof. The four sides are in contact with the interior of the pipeline P.

Lining a pipeline

Figure 33:
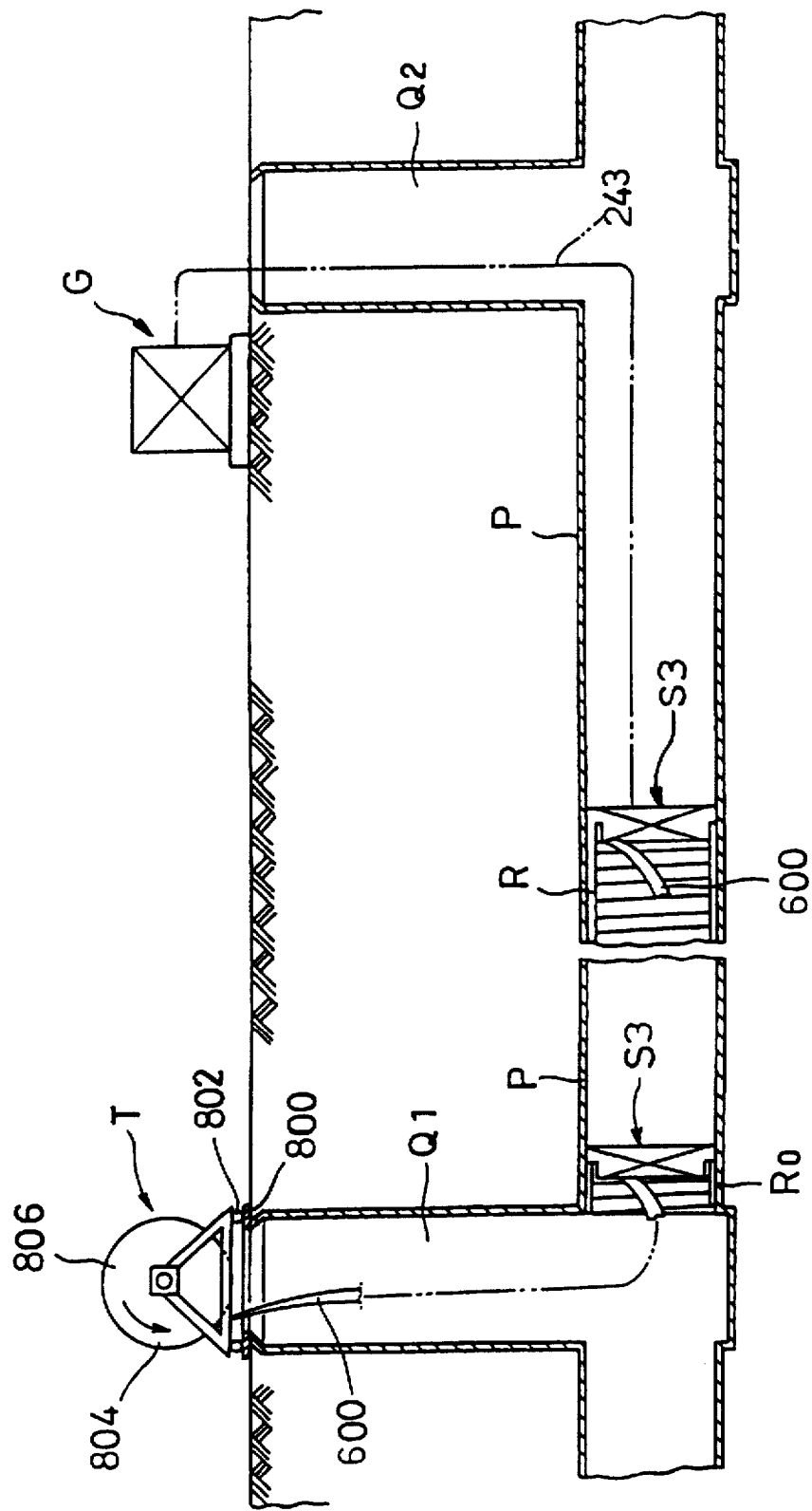
FIG. 33 is a view showing the execution procedures.
(Fourth embodiment)

Lining an underground pipeline using the lining apparatus S3 of the present embodiment will be described below in detail. FIG. 33 shows an outline of lining. As illustrated, Q1 is an upstream manhole, Q2 a downstream manhole, T an unwinder with a rotary table, and G a hydraulic drive source.

The processes of lining will be described in the following.

(1) The lining apparatus S3 is brought into the target pipeline P via manhole Q1. The forming frame 201 of the apparatus S3 is flexible and it is brought into the manhole Q1 with ease. If the opening of the manhole Q is narrow and it is not possible to bring the forming frame 201 into the pipeline P as usual, a sub stopper 216 may be removed temporarily which defines the angle of outward expansion (λ). The jointing mechanism 205 may be mounted by construction onto the forming frame 201, so it can be mounted readily at site.

The peripheral length of the apparatus S is a little longer than that of the inner wall of the rectangular pipeline P.

The peripheral length of the apparatus S3 is determined depending on the envelope length of the guide rolls 202 utmost outer circumference.

(2) Beltlike member 600 is pulled into the manhole Q1, and wound a few times (three times or so) manually there to produce a lining pipe (starting lining pipe) Ro. The peripheral length of the lining pipe Ro is equal to that of the lining apparatus S3. In addition, the starting lining pipe Ro is kept circular naturally without any force exercised thanks to the elasticity of beltlike member 600.

(3) The apparatus S3 is incorporated inside the starting lining pipe Ro, and the jointing mechanism 205 of the apparatus S3 is installed in position at the front edge of the starting lining pipe Ro. That is, inner roller 203 and outer roller 204 of the jointing roller block 220 are arranged where the lining pipe Ro is closed, the ring flange 226 of outer roller 204 fits into the groove 604 of beltlike member 600. In particular, the ring flange 226a shall be in contact with the closure H in a proper manner. The flange 203b of inner roller 203 shall engage with the concave groove 610 of beltlike member 600.

(4) The apparatus S3 provided with the starting lining pipe Ro is brought into the rectangular pipeline P, when the lining pipe Ro, circular, is deformed to be rectangular to meet with the inner wall of the rectangular pipeline P under restriction by the pipeline P. The apparatus S3 also follows such deformation by means of link bodies of the forming frame 201.

The apparatus S3 may be pulled into the pipeline preferably in accordance with Position 2 as illustrated in FIG. 23, but this does not exclude Position 1. In Position 1, to use proper tensile material (such as tie rod) may be a suitable and convenient measure to bring the apparatus into the pipeline to enable the subtenses of the forming frame 201 to be forcibly directed toward the center.

(5) Beltlike member 600 which is supplied following the starting lining pipe Ro is spliced at the closure H, through its joint construction when pinched by means of inner and outer rollers 203 and 204 of the jointing mechanism 205 which rotate. The engagement of the ring flange 226 of outer roller 204 with the groove 604 of beltlike member 604 helps at the same time the apparatus S3 revolves in the pipeline circumference and advances toward the pipeline axis.

Beltlike member 600 is thus wound involutely and lining pipe R is produced.

(5A) When the jointing mechanism 205 is in contact with the inner wall of one side of the pipeline P in this process (Position 1), the lining pipe R gets away from the inner wall and the adjacent lining pipe R comes into contact with the inner wall and becomes flat rectangular.

When the jointing mechanism 205 reaches one corner of the pipeline P in the course of traveling to another side thereof (Position 2), the lining pipe R comes into contact with the inner walls with an exception of corners and becomes rectangular to go with the pipeline P.

And, when the jointing mechanism 205 ends in coming into contact with the inner wall of another side of the pipeline P, lining pipe R on the side moves away from the inner wall, and lining pipe R on the next side will come into contact with the inner wall there to become flat rectangular. This is repeated to produce lining pipes R.

(5B) In addition, beltlike member 600 is successively supplied in the present process from unwinder T being installed on the ground. The unwinder T is such that a rotary table 804 is rotatably mounted via rollers on a ring rail 800 provided around the opening of manhole Q1, the rotary table 804 being designed to rotatably support a drum 806 wound with beltlike member 600 ready to unreel. With this, horizontal rotation of rotary table 804 along with ring rail 800 is synthesized with vertical rotation of the drum 806.

Along with pipe making, beltlike member 600 twists, but unwinder T follows with the rotary table 804, synchronizing with such twisting.

(6) As the apparatus S3 advances, the lining pipe left behind the apparatus comes close to the inner wall of the pipeline P with its elasticity.

(7) After lining pipe R covers the overall length of the pipeline P, gaps between them will be filled with cement milk. Lining will be completed when cement milk sets.
(Effects of the third embodiment)

The method of the lining of pipelines of differing cross-section according to the present embodiment is implemented in the above-mention mode, and it will show the following effects.

According to the present embodiment, lining pipe R as produced is left behind within the pipeline P as it is, with no restriction against the diameter and length of lining pipe. Accordingly, a long lining pipe will be available.

In addition, lining pipe R with a curve may be so produced as to cope with pipeline P with a curve.

The engagement of the ring flange of outer roller 204 with the groove 604 of beltlike member 600 enables the apparatus S3 to be guided with a fixed pitch to produce lining pipes R in a reliable manner.

The present embodiment is also able to produce lining pipes to cope with pipelines of differing cross-section by contacting the pipeline walls and making gaps between the lining pipe and the pipeline walls as small as possible.

FOURTH EMBODIMENT

FIGS. 34 to 37 show another embodiment of the present invention, that is, a lining apparatus (fourth embodiment) to perform the lining of a pipeline rectangular in section. S4 is the lining apparatus.

In FIGS. 34 to 37, common or equivalent members to those of the third embodiment have the same symbols.

Beltlike members 660 and 680 apply to this embodiment.
Lining apparatus S4

As shown in FIGS. 34 to 37, the lining apparatus S4 is provided with ① a ring, flexible forming frame 201 with a fixed width and having a link mechanism, ② guide rollers being arranged onto the shafts of forming frame 201 link mechanism, ③ main and sub jointing mechanisms (main jointing mechanism 205A and sub jointing mechanism 205B) comprising an outer roller 203 and an inner roller 204, and being mounted onto two positions, in opposition to each other, of the forming frame 201, ④ a rectangular restricting frame 206 being arranged inside of the forming frame and with a certain space, and ⑤ a guide 207 to cross the forming frame 201 and the restricting frame 206.

In other words, the lining apparatus S4 is the apparatus S3 with a restricting frame 206 and a guide 207 added.

The following is a description of the details.
Forming frame 201 and guide rollers 202

Forming frame 201 and guide rollers 202 are the same as used in the third embodiment. That is, forming frame 201 has a fixed width and is ring-like and flexible in the outer circumferential direction with a link mechanism. It also has lateral rigidity. Guide rollers 202 are mounted rotatably onto the shafts 210 of forming frame 201.
Jointing mechanism 205

Jointing mechanism 205 is the same as used in the third embodiment. That is, main and sub jointing mechanisms 205A and 205B form a pair and are mounted diagonally onto the forming frame 201. The mechanism is provided with a jointing block 220 having a pair of rollers 203 and 204, inner and outer, a box 222 housing a gear 221 being for synchronizing the rollers with each other, and a hydraulic motor 226 as a rotary drive source for the rollers.

Ring flange 226 made of plastic material is omitted from outer roller 204 of jointing mechanism 205 which deals with beltlike member 600.

Figure 34:
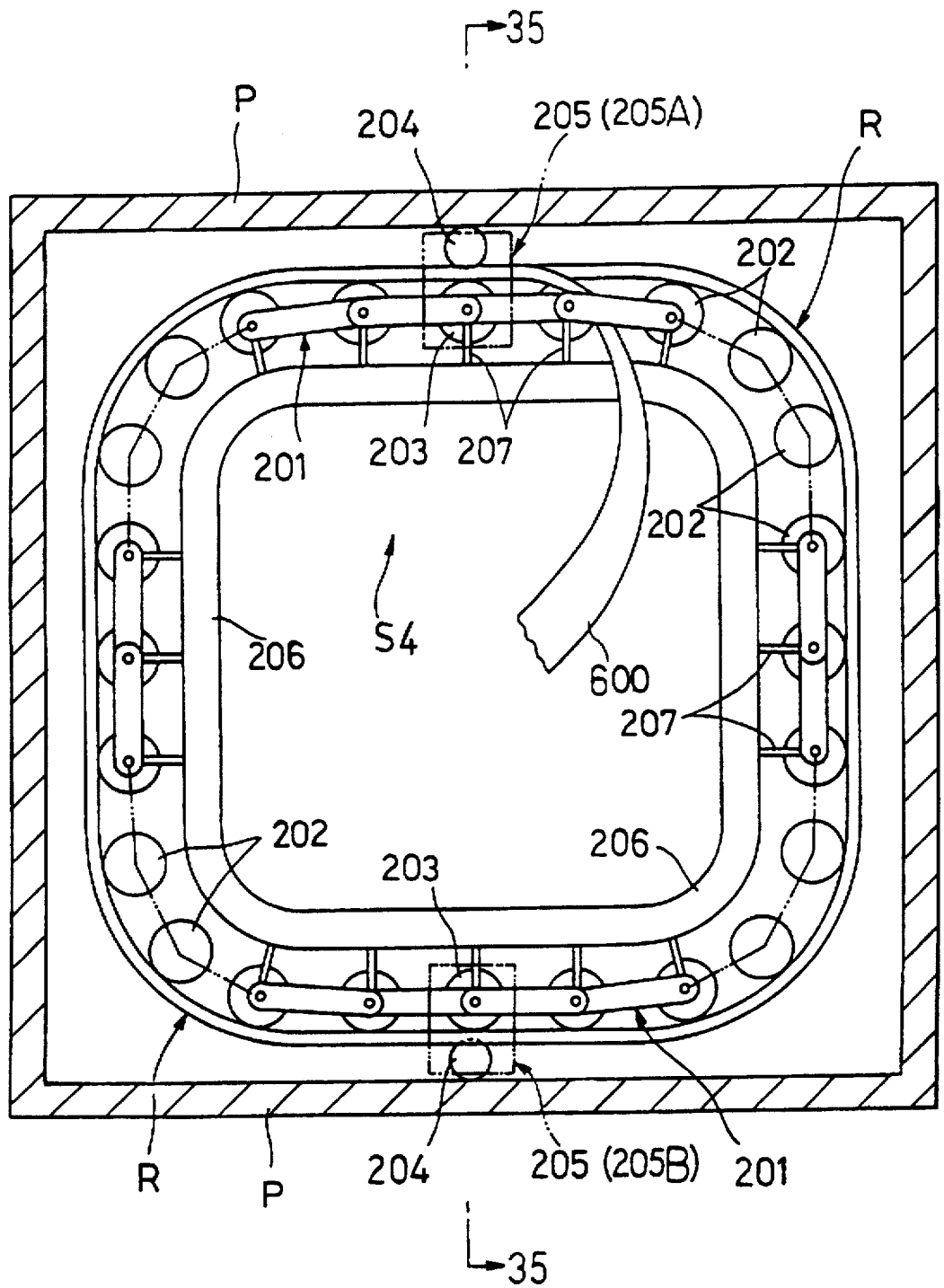
FIG. 34 is a vertical sectional view of the pipeline lining apparatus S4 of still another (fourth) embodiment of the present invention (view taken in the direction of 34 of FIG. 35).
Figure 35:
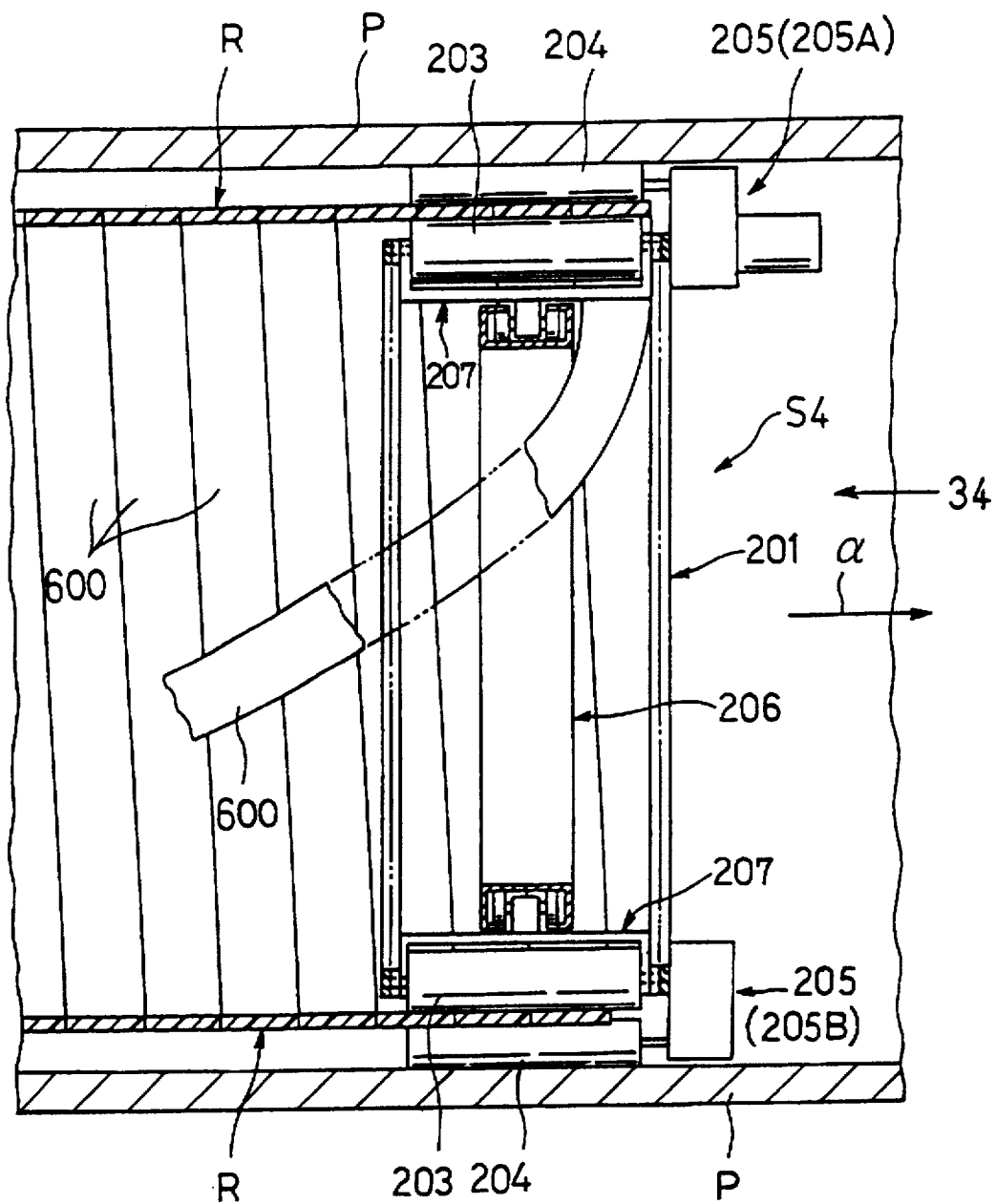
FIG. 35 is a sectional view taken along the lines 35—35 of FIG. 34.
Figure 36:
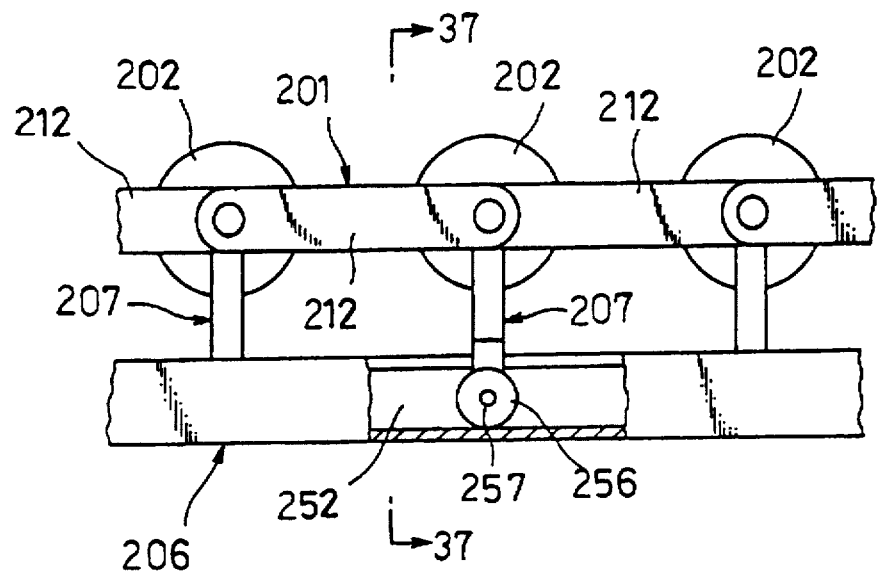
FIG. 36 is a partially enlarged side view of the lining apparatus.
Figure 37:
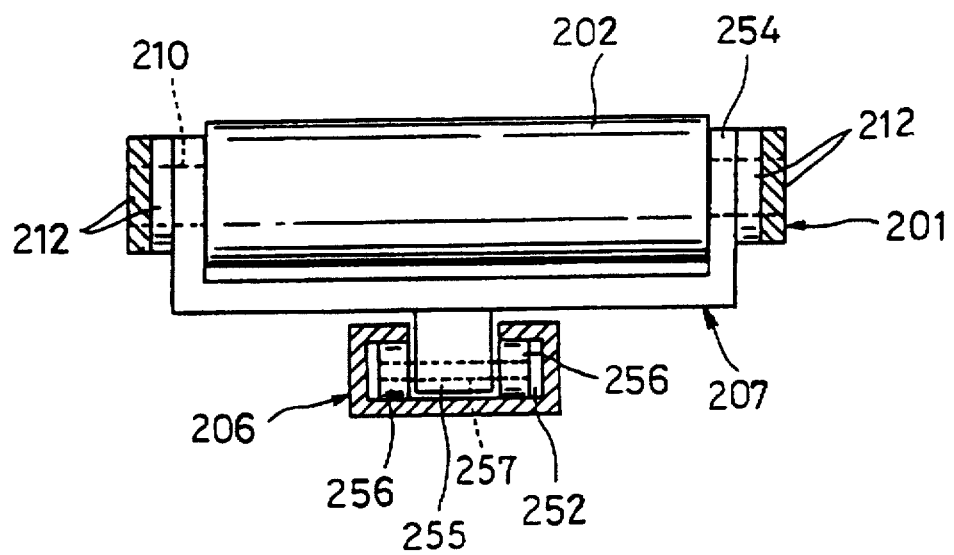
FIG. 37 is a sectional view taken along the lines 37—37 of FIG. 36.
Figure 38:
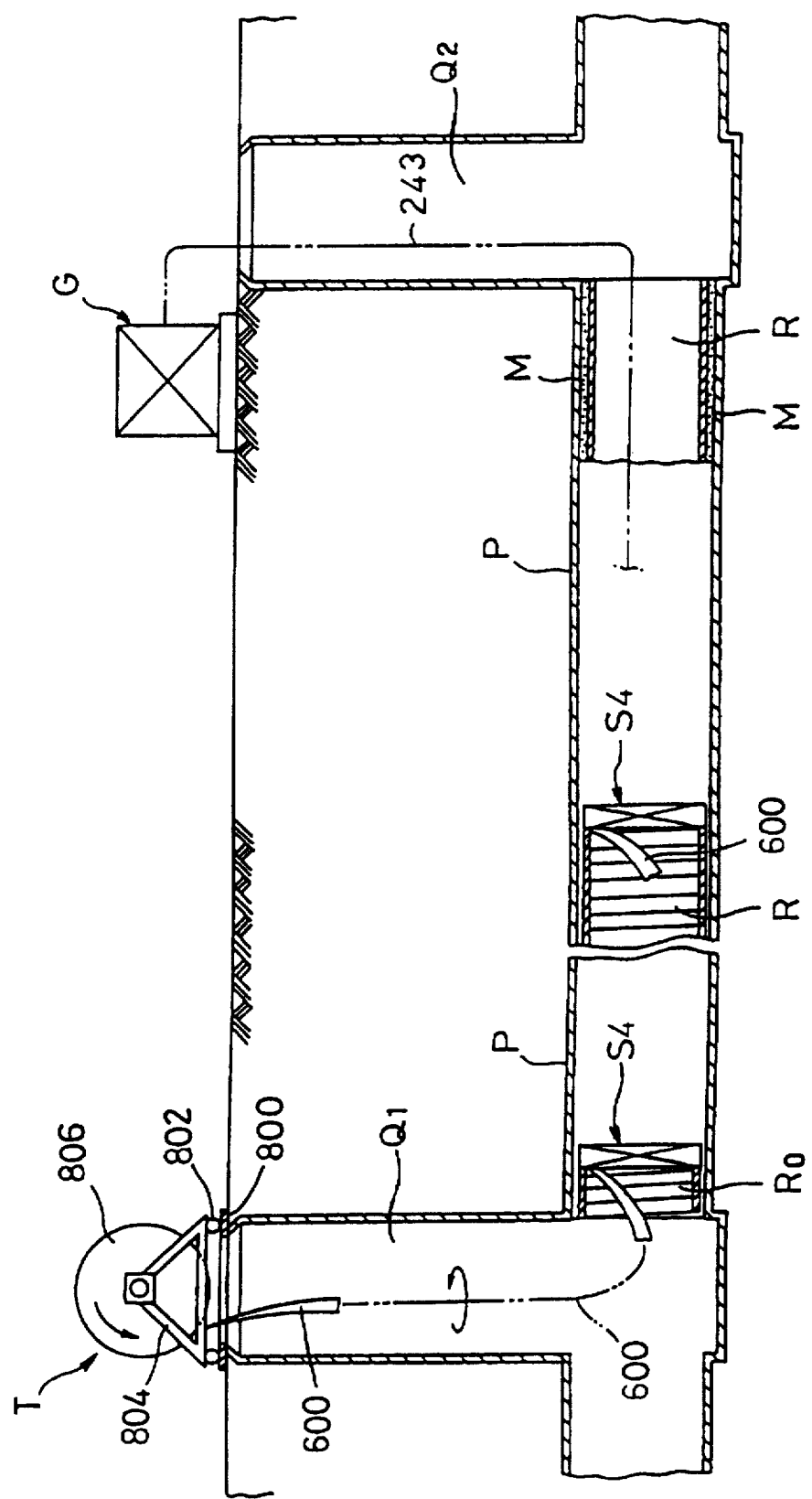
FIG. 38 is a view showing the execution procedures.

Restricting frame 206 (See FIGS. 34 to 36.)

Restricting frame 206 is highly rigid, and rectangular as a whole. The selected material for the present embodiment is shape steel having a hollow groove 252, which opens outwardly. Restricting frame 206 is assembled with segments.
Guide 207 (See FIGS. 34 to 37.)

Guide 207 is interposed between forming frame 201 and restricting frame 206 to move the former along the orbit of the latter.

More particularly, guide 207 is forked in shape, and has a bearing 254 at both ends of its body, the bearing 254 being designed to be pivoted to the shaft 210 of forming frame 201, and a roller support 255 extending from the body outwardly, the roller support 255 being for supporting rotatably a rotary shaft 257 having rollers 256 on both ends. The rollers 256 are fitted into the grooves 252 of restricting frame 206 to roll along the inner wall of the groove. Forming frame 201 incorporated with guide rollers 202 and jointing mechanisms 205 travels in accordance with the shape of restricting frame 206 having the same phase against the pipe section.
Lining a pipeline P Lining an underground pipeline using the lining apparatus S3 of the present embodiment will be described in detail below. When bringing the present apparatus S4 into a rectangular pipeline P, a restricting frame 206 suitable for the inner peripheral length of the pipeline P in size is selected. Restricting frame 206 is composed of segments, and they are assembled to be rectangular as adequate after they are brought into a manhole Q1. The present apparatus S4 is assembled in the manhole Q1.

Beltlike member 600 is pulled into the manhole Q1 and a starting lining pipe Ro is produced with the present apparatus S4. The starting lining pipe Ro is formed to be rectangular in shape, and introduced into the pipeline P. As jointing mechanism 205 of the present apparatus S4 is driven, forming frame 201 incorporated with guide rollers 202 and jointing mechanism 205 advances in accordance with the shape of restricting frame 206. At a corner of restricting frame 206, guide rollers 220 of jointing mechanism 205 bend beltlike member inwardly via guide 207. Restricting frame 206 keeps the same phase at all times. This shows that the present apparatus S4 is maintained to be rectangular by means of self-supporting force of the lining pipe R already produced when jointing mechanisms are situated on upper part and lower part as shown in FIG. 34 or they move to a side.

(Effects of the fourth embodiment)

The method of lining a pipeline different in section according to the present embodiment is implemented in the above-mentioned mode, and it will show the following effects.

According to the present embodiment, lining pipe R as produced is left behind within the pipeline P as it is, with no restriction against the diameter and length of lining pipe. Accordingly, a long lining pipe will be available. In addition, a lining pipe R with a curve may be so produced as to cope with a pipeline P having a curve. Furthermore, the engagement of the ring flange 226 of outer roller 204 with the groove 664 of beltlike member 660 enables the present apparatus S4 is guided with a fixed pitch to produce a lining pipe R in a reliable manner.

In addition, the present embodiment produces a lining pipe similar to an existing pipeline of differing cross-section, and it also produces lining pipes not similar to an existing pipeline as well (rectangular in circular section). The applicability of the present apparatus to pipelines of differing cross-section will be thus enhanced.

Beltlike members 660 and 680 having plastic material 670 and plastic linear material 690 incorporated are used with the present embodiment. It is more preferable if beltlike members 660 and 680 themselves are made of plastic material.

FIFTH EMBODIMENT

The following description is related to another method and apparatus embodied according to the present invention that provides lining pipes having an enlarged diameter.

FIGS. 39 to 48 show another embodiment (fifth) of the apparatus for lining a pipeline. FIG. 39 shows the overall composition of the lining apparatus S5 while FIGS. 40 through 48 illustrate the composition of each part of the apparatus S5.

Beltlike members 600, 620 and 640 apply to the present embodiment. For these beltlike materials, it is preferable that a sealing material 618 contains a sliding material to provide smoothness.

Lining apparatus S5

Referring now to FIGS. 39 through 48, the composition of the lining apparatus S5 of the present embodiment will be detailed.

As shown in FIGS. 39 through 48, the lining apparatus S5 is mainly composed of a ring-like frame 301, a plurality of guide rollers arranged around the outer circumstance of mounting frame 301 with a fixed pitch, a jointing mechanism mounted via mounting frame 301 and equipped with an inner roller 303 and an outer roller 304, a main feed roller for interlocking with jointing mechanism 305, and a plurality of follower feed rollers 307 arranged at the front of mounting frame 301 and on the same circumference.

Main and follower rollers 306 and 307 are the main components of a main feed mechanism A and a follower feed mechanism B respectively, and they form a feed mechanism together.

The lining apparatus S5 is similar to the lining apparatus S2 of the second embodiment with an exception for the feed mechanism.

A description of the parts will be given below.

Mounting frame 301

Mounting frame 301 is ring-like and maintains required rigidity with a fixed width and thickness. Part of the ring-like mounting frame is concave and used as a mount for jointing mechanism 305. Mounting frame 301 is composed of segments in a proper quantity, but it also can be a body. Each segment is equipped with a frame composed of side sheets 310, rear and front (front side sheet 310A, rear side sheet 310B) and flanges on both edges 311, and the frame has fixed rigidity and is reinforced as adequate with a reinforcing steel material for higher rigidity.

Flanges 311 are made to face each other and are assembled by means of bolts and nuts (not shown) in bolt holes 312 drilled in the flanges.

There are provided bearing concaves 313 at the outer edges of side sheet 310 at fixed intervals to receive the shafts of guide rollers 302.

The mount is a V-like recess, and the front side sheet 310 A is arranged more backward than front side sheets 310A of the other segments, and narrower enough to receive beltlike member 600. Front side sheet 310C at the V-like recess is used for the mounting of jointing mechanism 305. 315 is the bolt hole to this effect.

Guide rollers 302

Guide rollers 302 are arranged on the outer circumference of mounting frame 301 at fixed intervals and at a fixed angle. Guide rollers 302 are mounted tt an angle at of 90 de, that is, perpendicular to beltlike member 600 to form a lining pipe R. The roller body of a guide roller 302 is made of hard synthetic material or metal and rotatable with an axis of roller shaft 318 by way of bearing, coming in contact with the interior of beltlike member 600.

The number of guide rollers 302 depends on the diameter of lining pipe R or the diameter of mounting frame 301, and there is no limit on the number. The point is that the number may be determined within a range where the degree of roundness is assured.

Jointing mechanism 305 (See FIGS. 42 to 44)

Jointing mechanism 305 is fitted to mounting frame 301 via front side sheet 310C of the frame, and is mainly composed of a jointing roller block consisting of an inner roller 303 and an outer roller 304, comprising a box 323 housing a gear 321 for synchronizing the rollers 303 and 304 with each other and a main feed roller 306 being supported with gear 323, and a hydraulic motor 324 as a rotary drive source for the rollers. The mechanism 305 is arranged where involutely wound beltlike member 600 is jointed, that is, the member 600 is first closed.

(Box 323)

Box 323 is kept rigid with four walls, front and rear and both sides, and divided into upper part 323A and lower part 323B. Upper part 323A and lower part 323B are pivoted, and upper part 323 is openable on the axis of pin shaft 326.

Box 323 supports gear 321 overall with upper part 323A and 323B. The front of box 323 lower part 323B is used to mount hydraulic motor 324 and the rear thereof comes into contact with, and bolted to front sheet 310C of mounting frame 301 by matching front a bolt hole 315 drilled in the sheet with one (not shown) drilled in the rear and using a set bolt (not shown).

There is provided a closure device 330 on another side of box 323 to close upper part 323A to lower part 323B. Shown is an example, according to which a link rod 332 is pivoted to a rib 331 projecting from upper part 323A while lower part 323B has a forked shelf 333 with the same phase as rib 331, so that link rod 332 comes into the concave of shelf 333. Link rod 332 is fitted successively with a coil spring 334 and a nut 335 for the screw below. With nut 335 fastened, coil spring 334 is pressed against the lower part of shelf 334, and as a result, the fastening force of upper part 322A is adjusted as adequate by means of coil spring 334 elasticity.

(Gear 321)

Gear 321 is provided with three shafts 337, 338 and 339 successively from bottom crossing the rear and front walls of box 323, the first shaft 337 being fitted with a gearwheel 340, the second shaft 338 being fitted with a gearwheel 341 engageable with gear wheel 340, and the third shaft 339 being fitted with a gearwheel 342. Inner roller 303 is coupled with second shaft 338 while outer roller 304 with third shaft 339. As shown, second shaft 338 rotates reversely to and third shaft 339 forward with first shaft 337, resulting in that inner roller 303 and outer roller 304 are reverse to each other in rotation. The revolutional frequency of each of shafts 338 and 339, and rollers 303 and 304 may be adjusted by adjusting the number of gear teeth. According to the present embodiment, the shafts 337, 338 and 339 are supported by means of rotary bearings, and plain bearing may be used instead.

In addition, third shaft 339 is fitted rotatably with a spacer roller 344 for the purpose of keeping spaces. Spacer 344 is the same in diameter as the larger-diameter portion 350 of a feed roller 346 with a sprocket, the spacer roller being designed to come into contact with the inner wall of pipeline P with the outer circumference. Spacer roller 344, however, may be omitted as adequate.

(Main feed mechanism A and main feed roller 306)

Main feed roller 306 is the main component of main feed mechanism A.

Main feed mechanism A is composed of a drive sprocket 345 secured to second shaft 338 outside of box 323, main feed roller 306 with a sprocket being rotatably fitted onto third shaft 339, and a chain 346.

Drive sprocket 345 is equipped with a gearwheel 345 on the outer circumference thereof and secured to second shaft 338 via a key or by splicing and rotates together with shaft 338. Main feed roller 306 is composed of a smaller-diameter sprocket 349 and a larger-diameter roller block 350. The roller 306 is secured rotatably to third shaft 339 via a bearing 351. Sprocket 349 has a gearwheel 349a on the outer circumstance thereof. Feed roller 350 is made of steel in the present embodiment, and may be fitted with a beltlike elastic ring (not shown) around the outer circumference as adequate.

Chain 346 is stretched from drive sprocket 345 to main feed roller 306 sprocket 349 to transmit drive force from drive sprocket 345 to main feed roller 306.

Chain 346 is a so-called detachable one, removable along with the opening/closing of box 323.

Or, another mode may be adopted, according to which drive sprocket 345 and main feed roller 306 are removably fitted onto the shaft 338 and 339 respectively, and a unit feed mechanism A comprising drive sprocket 345, main feed roller 306 and chain 346 incorporated may be fitted to the shafts 338 and 339. In this mode, drive sprocket 345 is spliced with second shaft 338.

(Hydraulic motor 324)

A hydraulic motor 324 is mounted at the front of box 323 with the drive shaft 324a coupled with first shaft 337. Hydraulic motor 324 is connected to an in-piping 335a to provide the motor with oil and an out-piping 335b to discharge oil from the motor. These pipings are connected to a rotary joint 356 (see FIG. 39), the joint 356 being connected with a piping 357 for linking with an external pressure source.

Operating fluid is, by way of the joint 356, supplied to hydraulic motor 323 piping 355 with rotation and received by external piping 357 without rotation.

With gear 321 and hydraulic motor 324, drive force from hydraulic motor 324 is transmitted to first shaft 337, and then to second and third shafts 338 and 339 via gear 321. Second shaft 338 is reverse to third shaft 339 in rotation.

(Jointing roller block 320)

Jointing roller block 320

Jointing roller block 320 is such that inner roller 303 and outer roller 304 are arranged side by side in the pipe shaft direction with a certain gap to enable themselves to pinch beltlike member 600.

As seen earlier, inner roller 303 is directly coupled with second shaft 338 while outer roller 304 with third shaft 339.

FIG. 44 shows the composition of jointing roller block 320 in detail.

FIG. 44 is an enlarged view of inner and outer rollers 303 and 304 of jointing roller block 320, together with the correspondence of the rollers with beltlike member 600. As shown, the rollers 303 and 304 are so arranged as to cover the spans of a plurality of beltlike member 600 (3 according to the present embodiment). H shows the closure where beltlike member 600 is first closed.

Inner roller 303 is cylindrical and designed to close to the interior of beltlike member 600 to support the member when it is pressed from outside by outer roller 304, including the closure H. In addition, there is produced a larger-diameter portion 303a at the front edge of inner roller 30 with a flange 303b to engage with the inner groove 610 of beltlike member 600. This may be, however, omitted. Outer roller 304 is provided with a plurality of ring flanges at fixed intervals on the cylindrical body 360, the flanges being designed to come into grooves 604 between projections 602 of beltlike member 600. The outer circumstance of cylindrical body 360 is pressed against the exterior of beltlike member 600. Cylindrical body 350 has been knurled at the exterior to prevent slippage with beltlike member 600. Part 360a of cylindrical body 360 is reduced in diameter to come out of projections 602.

As to ring flanges 361, a pair of ring flanges 361a corresponding to the closure H comes into contact with belt-likemember 600 with their circumference. It is not always necessary for other ring flanges 361 to come into contact with beltlike member 600. The point is that they come into grooves 604 between projections 602.

The mounting jointing mechanism 305 onto lining pipe R is performed by opening upper part 323A of box 323, matching ring flanges 356 of outer roller 304 with projections 602 pitch of beltlike member 600, positioning ring flange 356a to the closure H, and then closing upper part 323A to lower part 323B, shutting closing device 330 and fastening nut 335.

Follower feed mechanism B and follower feed roller 307) (FIGS. 39 to 40, and 45 to 47)

Follower roller 307 is the main component of follower feed mechanism B, and a reaction force member 370, an extruding device 372, and a guide member 373 to the device 372 are other components, the reaction force member being secured to the front of mounting frame 301, and the extruding device being secured to reaction force member 370 at one end and to the retainer frame 371 of follower feed roller 307 at the other end.

Follower feed rollers are provided in a plurality (4 according to the present embodiment), each of which is inclined in correspondence to the spiraling pitch of beltlike member 600.

Extruding device 372 is a so-called pneumatic cylinder device, composed of a cylinder 372a and a piston rod 372b. Cylinder 372a is supported slidably with guide member 373 secured to mounting frame 301.

In addition, follower feed mechanism B is equipped with a brake 375.

With extruding device 372 operated, follower feed roller 307 is pressed against the wall surface of pipeline, keeping the pipeline-lining apparatus S5 in the center of the pipeline. In addition, with brake 375 put into operation, the apparatus S5 is kept stationary in the pipeline.

Lining apparatus S5' with a main feed mechanism

Lining apparatus S5' is another useful lining apparatus which has removed a follower feed mechanism B from the lining apparatus S5 of the fifth embodiment.

Lining apparatus S5' is such that the diameter d including feed mechanism roller 306 is maximum and set by far smaller than the diameter D of pipeline P. The diameter d+beltlike member 600 thickness t is much smaller than D, assuring allowance in diameter for handling and operating work.

Lining a pipeline

The method of lining an underground pipeline with the lining apparatus S5 of the present invention will be described in detail below.

FIG. 48 is an outline of such lining work. Q1 is an upstream manhole and Q2 a downstream manhole. There is provided an unwinder with a rotary table on the upstream manhole Q1 side while there are provided a hydraulic drive source G and a pneumatic drive source J on the downstream manhole Q2 side. Hydraulic drive source G is led to hydraulic motor 324 of jointing mechanism 305 via piping 357 and rotary joint 356. Pneumatic drive source G is, on the other hand, led to extruding device 372 of follower feed roller 307 via piping 377.

Another description will be given below to the processes of an mode (first example) of the lining method.

(1) The lining apparatus S5 is brought into the target pipeline P via manhole Q1.

Lining apparatus S5 is easily set up at site because the apparatus is such that mounting frame 301 is composed of segments ready to set up, and jointing mechanism 305 may be fitted onto mounting frame 301.

Jointing mechanism 305 is secured to mounting frame 301 with the rear of box 323 bolted to side sheet 310C of mounting frame 301.

Extruding device follower feed roller 307 of follower feed mechanism B is then at a retreat position.

(2) Beltlike member 600 pulled in from the ground is manually wound a few times ( three times or so) at the starting point of manhole Q1 in the pipeline P to produce a lining pipe (starting lining pipe) Ro.

The diameter (θ) of starting lining pipe Ro (θ) is set to be smaller than the inner diameter of the pipeline P, taking into consideration some allowance for the setting up of the present lining apparatus S5.

(3) Jointing mechanism 305 of lining apparatus S5 is installed in position at the front edge of starting lining pipe Ro. That is, inner and outer rollers 303 and 304 of jointing roller block 320 are arranged at the closure of lining pipe Ro with ring flange 361 of the roller 304 fitted into groove 604 of beltlike member 600, and in particular, ring flange 361a being contact with the closure H in a proper manner. In addition, flange 303b of the roller 303 is fitted into a concave groove 610 of beltlike member 600. Also, a guide roller 302 flange is engaged with a concave groove 610 of beltlike member.

Main feed mechanism A is, at the same time, arranged in position.

With this, follower feed roller 307 of follower feed mechanism B is so adjusted as to come into contact with the wall surface of the pipeline P, and lining apparatus S5 is thereby maintained in the center of the pipeline P.

(4) Jointing mechanism 305 and main feed mechanism A are driven.

As jointing mechanism 305 is rotary driven, inner roller 303 pinches portions of beltlike member 600 with outer roller 304 and portions of beltlike member 600 supplied after starting lining pipe Ro are jointed at the closure H with starting lining pipe Ro thanks to the joint structure of beltlike member. Joint roller block at the same time revolves in the pipe peripheral direction and moves toward the pipe direction by means of the engagement of ring flange 361 of outer roller 304 with groove 604 of beltlike member 600.

At this point, main feed mechanism A is also driven, and as main feed roller 306 rotates, jointing mechanism 305 rotates. As a result, the apparatus S5 rotates wholly and advances at a fixed pitch.

This results in that beltlike member 600 is involutely wound and lining pipe R is produced as it rotates on its axis.

The diameter of lining pipe R thus produced is equal to the θ of starting lining pipe Ro.

(4A) Feed rollers 306 and 307 of main and follower mechanisms A and B come into contact with the wall of the pipeline P in this process. As the rollers rotate in the same forward direction as lining apparatus S5, they help the apparatus rotate smoothly.

That is, with hydraulic motor 324 rotated, first drive shaft 337 is driven, and second shaft 338 is also driven via gear-wheels 340 and 341. Sprocket 345 rotates thereby together with shaft 338, so that main feed roller 306 rotates via chain 347 applied to sprocket 345.

Drive sprocket 345 and main feed roller 306 rotate in the same direction, which leads inner roller 303 to rotate in the same direction, too.

Main feed roller 306 comes into contact with the wall surface of the pipeline P. As the roller rotates, it is reacted by the wall surface to provide the lining apparatus S5 with rotational force, regulating same for rotation.

(4B) According to this process, beltlike member 600 is continuously supplied from unwinder T installed on the ground. Unwider T is rotatably arranged on rotary table 804 provided on a ring rail 800 viarollers 802, the rotary table 804 supporting rotatably a drum 800 wound with beltlike member ready to unreel. Horizontal rotation of rotary table 804 along the ring rail 800 is synthesized with vertical rotation drum 800.

Along with pipe making, beltlike member 600 twists, and unwinder T is synchronous with and follows such twisting with rotary table 804.

(5) This concludes the making of lining pipes R of a certain length while the lining apparatus rotates on its axis. After this, brake 375 of guide mechanism B is put into operation to brake follower roller 307 and the lining apparatus S5 is secured. The edge of starting lining pipe Ro is held stationarily.

In this state, jointing mechanism 305 is further driven. With jointing roller block of the mechanism operated, beltlike member is supplied to the already formed lining pipe R more than the level at which the lining apparatus produces a pipe while turning on its axis, and lining pipe R enlarges the diameter to Φ accordingly, overcoming the engaging force at joints of beltlike member. In addition, main roller 306 is then idling.

FIG. 39 shows such a state, where beltlike member 600 is restricted from enlarging in the vicinity of jointing mechanism 305 because of inner and outer rollers 303 and 304. Beltlike member 600 may be enlarged, however, at any other position thanks to the slippage of joints, till enlarging is restricted by the wall surface of the pipeline P.

(6) The above processes (4) and (5) are repeated to line the pipeline P. That is, jointing mechanism 305 and main feed mechanism A are driven to produce a lining pipe R of a small θ and a certain length before main and follower feed mechanisms A and B are braked and joining mechanism 305 is driven to enlarge lining pipe R.

(7) With this, lining pipe of Φ in diameter to cover the overall length of the pipeline P is formed. If there is caused a gap between the pipeline P and lining pipe R, cement milk will be used for the purpose of filling. Mounting pipe and the lining pipe R are drilled for connection.

What follows is another mode of lining (second example). In this mode, a lining pipe R is formed and the diameter is enlarged as the pipe rotate on its axis.

The processes (1) to (3) are the same as above.

The rotation of jointing mechanism 305 is set to be larger than that of main feed mechanism A main feed roller 306. To make this feasible, it is necessary, for example, to (i) put brake 375 of follower feed mechanism B into operation halfway to slow the lining apparatus S itself in rotation by applying a soft braking, and to (ii) reduce the rotation of main feed roller 306 according to the transmission ratio of jointing mechanism 305.

According to the mode mentioned above, lining pipe R is formed and enlarged for diameter while the pipe rotates on its axis.

Thus, lining pipe R which is continuously enlarged for diameter is provided in the mode without the process (5) in the first example.

(Effects of the fifth embodiment)

The method and the pipeline lining apparatus S5 of the present embodiment are implemented and operated as mentioned above. Lining pipes almost near to the diameter of a pipeline P may be formed without any sectional loss. As a whole, lining pipes R may be produced in an economical manner.

Rollers 397 in a proper quantity may be provided with drive force in the present mode. The present apparatus S5 may have thereby a higher rotational force. Drive force to drive main roller 306 is given by means of a hydraulic motor 32 which drives rollers 303 and 304 in the present mode, but in another mode, main roller 306 may be driven by means of an independent hydraulic motor.

Beltlike members 600 and 620 (one-piece type) as shown in FIGS. 55 and 56 are applicable to the above-mentioned modes. The same steps are taken for such a beltlike member (two-piece type) as shown in FIG. 57. That is, fitting material 650 is supplied to the closure position H of beltlike member 640 at the same time so that they are jointed together. The feeding speed can be faster than the rotation of lining apparatus S5 by discontinuing (first example) or continuing (second example) as known in the above mode.

In addition, after beltlike member 640 portions may be temporarily jointed in the 2-piece mode and a lining pipe R is formed and enlarged in diameter, fitting material 650 may be jointed. In such a mode, the edge jointing portions 640A and 640B of beltlike member 640 have, as shown in FIG. 58, sub jointing portions 654 and 656, for example, and the portions are jointed for temporary jointing of beltlike member portions 640.

(Lining with lining apparatus S5' having a main feed mechanism)

Lining with lining apparatus S5' having a main feed mechanism works as follows in the above process (4A).

(4A') Feed roller 306 of feed mechanism A comes into contact with the wall of the pipeline P and rotates in the same forward direction as lining apparatus S5', so that the rotation of lining apparatus S5' may be smooth.

That is, with hydraulic motor 324 rotated, first shaft 337 is rotationally driven, and second shaft 338 is also rotationally driven by way of gearwheels 340 and 341.

Drive sprocket 345 rotates thereby together with shat 338, resulting in that roller 346 with a sprocket is rotated by way of chain 347 applied to drive sprocket 345.

Drive sprocket 345 and roller 346 rotate in the same direction, and inner roller also rotates in the same direction.

When jointing mechanism 305 is at the upper position, lining apparatus S5' comes into less contact with the wall surface of the pipeline P, causing no problem with rotation.

As jointing mechanism 305 goes down, feed roller 306 of feed mechanism A comes in contact with the wall surface of the pipeline P more.

Feed roller 306 projects utmost outwardly at jointing mechanism 305, preventing outer roler 304 from coming into contact with the wall surface.

When jointing mechanism 305 is at the bottom, feed roller is applied the maximum load, but spacer roller 344 share the load applied to feed roller 306.

Furthermore, feed roller 306 contacts the wall surface of the pipeline P, and reacted from the wall surface as it rotates. This provides lining apparatus S5' with rotational force to help the apparatus S5' rotate gently.

SIXTH EMBODIMENT

FIGS. 49 to 51 show another embodiment (sixth) of lining apparatus to implement pipeline lining according to the present invention.

S6 denotes the lining apparatus.

In FIGS. 49 to 51, the members common or equivalent to those used in the fifth embodiment have the same symbols.

Beltlike members 600, 620 and 640 apply to the present embodiment.

Lining apparatus S6

AS shown in FIGS. 49 through 51, lining apparatus S6 is composed of a mounting frame 401 having 4 extensions arranged radially, guide rollers 402 arranged at the front edges of three extensions of mounting frame 401, a jointing mechanism 405 arranged at the otherextention of forming frame 401 and composed of an innerroller 403 and an outer roller 404, and two feed rollers 408 via an arm extending foward from the center of mounting frame 401. Feed rollers 408 are the main components of a feed mechanism C.

The following is a description of the details.

(Mounting frame 401)

Mounting frame 401 is comprised of round pipes being connected crosswise, and there is provided a guide roller 502 or a jointing mechanism 405 at each front edge of the pipes (extensions). Each extension may be adjustable for length in the diametric direction with a sliding mechanism. The number of extensions is not limited to four. It may be three or five, instead.

(Guide rollers 402)

Guide rollers are fitted onto the edges of three extensions of mounting frame 401 via a roller retainer frame 408. The envelope of a plurality of guide rollers (3 in the present embodiment) and that of inner roller 304 are on the same circumference so as to regulate a lining pipe R for diameter.

(Jointing mechanism 405)

Jointing mechanism 405 is fitted onto the other extension of mounting frame 401 by way of a mounting material 482.

Mounting frame 401 is almost the same as shown in the second and fifth embodiments, and they are equal to each other in function, except that mounting frame 401 is not equipped with a main feed mechanism A including a main feed roller.

(Feed mechanism C and feed roller 408)

Feed roller 408 is the main component of feed mechanism C, and the other components of the mechanism are a horizontal arm 484 extending horizontally from the front of mounting frame 401, a vertical arm 485 being connected to horizontal arm 484, hydraulic motors arranged at both ends of vertical arm 484 one each and a rotary joint 487 being arranged in the center of vertical arm 486. Hydraulic motors 486 drive horizontal arm 408.

More particularly, horizontal arm 484 and vertical arm 485 being connected orthogonally to the arm 484 rotate together with mounting frame 401. Hydraulic motors 486 are connected to a hydraulic source with a piping (not shown) via rotary shaft 487.

Feed rollers 408 are composed of two rollers, 408A and 408B, which are driven by means of hydraulic motors 486. It is also possible to drive at least one roller hydraulically.

Feed rollers 408A and 408B have a brake mechanism respectively.

Horizontal arm 484 is not limited to the present mode. Two arms which are parallel to each other may be available, instead. Vertical arm 485 may be crosswise. The arm 485 also may be used as a sliding mechanism to adjust feed roller 408 for contact with the wall surface of a pipeline. A hydraulic motor 486 may be connected to a rotary joint 456 of jointing mechanism 405.

Compared with the first embodiment, lining apparatus S6 is simplified in composition and can implement the method of lining as mentioned above.

SEVENTH EMBODIMENT

FIGS. 52 through 54 show another embodiment (seventh) of the lining apparatus to carry out pipeline lining depending on the present invention.

S7 is the lining apparatus.

In FIGS. 52 to 53, the members common or equivalent to those used in the fifth embodiment have the same symbols.

Beltlike members 600, 620 and 640 apply to the present embodiment.

Lining apparatus S7

As shown in FIGS. 52 through 54, mounting frame 301, guide roller block 320, jointing mechanism 320 consisting of inner roller 303 and outer roller 304, jointing mechanism 305 including the drive system of the block 320 of lining apparatus S7 are the same as those of the first embodiment. In addition, jointing mechanism 305 is not equipped with a main feed roller although mounting frame 301 is provided with a feed mechanism D, whose main component is a feed roller 309.

More particularly, feed mechanism D is also comprised of a mounting sheet 390, a roller retainer frame 391, a retainer 392 and a hydraulic motor 393.

Mounting sheet 390 is secured to the front of mounting frame 301. Mounting sheet 390 may slide toward mounting frame 301 in the diametric direction and secured as adequate. Roller retainer frame 391 supports the shaft 309a of feed roller 309 pivotedly, supporting the roller 309 rotatably. Retainer 392 is interposed between mounting sheet 390 and roller retainer frame 391, allowing roller retainer frame 391 to displace in the diametric direction so as to hold retainer frame 391 to mounting sheet 390. Retainer 392 has a built-in coil spring 394 to press roller retainer frame 391, and then feed roller 309 against the wall of a pipeline. Hydraulic motor 393 is secured to roller retainer frame 391 and coupled with the shaft 309a of feed roller 309 to drive the roller 309. Hydraulic motor 393, when applied load by handling operating oil, can show a braking action.

A plurality of feed rollers 309 (4 according to the present embodiment) are provided at equal intervals on the circumference. The rollers 309A, 309B, 309C and 309D of the present embodiment are hydraulically driven. It is also possible to hydraulically drive at least one of them or two rollers, 309A and 309A being in the diametric direction.

The supply of operating oil to hydraulic motor 393 is made via a rotary joint, but rotary joint 356 of jointing mechanism 305 may be used to this effect.

With the lining apparatus S7 of the present embodiment, the method of lining as detailed in the first and second examples of the fifth embodiment may be readily carried out. In particular, lining apparatus S7 is suitable for the implementing of the second example.

That is, jointing mechanism 305 is driven by means of hydraulic motor 324 while feed mechanism D slows down feed roller, using hydraulic motor 393, so that the differential between the feeding speed of beltlike member 600 and the rotary speed of the lining apparatus S7 may be adjusted as desired, allowing the diameter of a lining pipe R to be enlarged.

The present embodiment allows the following change in design.

① Hydraulic and pneumatic drive sources are interchangeable, and electric power supply may also be used.

What is claimed is:

1. A method of lining an inside of a pipeline comprising the steps of:

forming a pipe out of a long beltlike member being supplied continuously to and wound involutely within the pipeline by engaging adjoining joints formed on both edges of the beltlike members;

forming an additional length of pipe, using an additional length of beltlike member being supplied anew and ahead of the already formed pipe while leaving the already formed pipe behind;

using a jointing roller block consisting of an inner and an outer roller in such a manner that the inner roller comes into contact with the interior of the beltlike member and the outer roller comes into contact with the exterior thereof, where said jointing roller block is provided on a mounting frame and disposed at an edge of the already formed pipe, said mounting frame being a circumferentially extending frame positioned within the already formed pipe;

shaping the pipe with a plurality of guide rollers rigidly fixed to the mounting frame and where the guide rollers are disposed to contact the inner surface of the pipe;

pinching the beltlike member between the outer and inner rollers where the newly supplied beltlike member is closed with the already formed pipe; and driving at least the outer roller by rotation.

2. A pipeline-lining apparatus for forming, and leaving behind, a pipe out of a long beltlike member being supplied continuously to and wound involutely within the pipeline by engaging adjoining joints formed on both edges of the belt-like member with an additional length of pipe being additionally produced, using an additional length of beltlike member being supplied anew and ahead of the already formed pipe, the pipeline-lining apparatus comprising:

a mounting frame arranged in the axial center of the pipeline, said frame radially rigid and equipped with radially protruding extensions;

a jointing mechanism including a jointing roller block consisting of an outer roller having a flange for fitting into a vertical groove in the exterior of the beltlike member and an inner roller for making contact with the interior of the beltlike member, and being arranged at the tip of one extension of the mounting frame, and a guide mechanism arranged at another extension of the mounting frame and equipped at a tip of the extension with guide rollers to contact the interior of the beltlike member.

3. A pipeline-lining apparatus according to claim 2, wherein the jointing mechanism is provided with a spacer roller.

4. A pipeline-lining apparatus for forming, and leaving behind, a pipe out of a long beltlike member being supplied continuously to and wound involutely within the pipeline by engaging adjoining joints formed on both edges of the beltlike member with an additional length of pipe being additionally produced, using the beltlike member being supplied anew and ahead of the already formed pipe, the pipeline-lining apparatus comprising:

a mounting frame having a fixed width, said mounting frame being annular and rigid and arranged inside of the already formed pipe, a plurality of guide rollers arranged on an outer circumference of the mounting frame with a fixed pitch in the direction of the circumference for contacting the interior of the pipe, and a jointing mechanism mounted via the mounting frame and equipped with an outer and an inner roller, the rollers being arranged at a position where the already formed pipe is closed with an additional length of beltlike member, said rollers arranged for pinching the beltlike member.

5. The pipeline-lining apparatus according to claim 4, wherein the mounting frame is assembled of individual segments divided about its periphery and can be taken apart.

6. A pipeline-lining apparatus according to claim 5, wherein the jointing mechanism is provided with a spacer roller.

7. A pipeline-lining apparatus according to claim 4, wherein the jointing mechanism is provided with a spacer roller.

8. A pipeline-lining apparatus for forming, and leaving behind, a pipe out of a long beltlike member being supplied continuously to and wound involutely within the pipeline by engaging adjoining joints formed on both edges of the beltlike member with an additional length of pipe being additionally produced, using an additional length of beltlike member being supplied anew and ahead of the already formed pipe, the pipeline-lining apparatus comprising:

a mounting frame being rigid and arranged inside of the pipe;

a plurality of guide rollers mounted to said mounting frame at a fixed pitch so as to come into contact with the interior of the pipe; and, a jointing mechanism mounted via the mounting frame and consisting of an outer roller and an inner roller, the rollers being arranged at a position where the already formed pipe is closed with an additional length of beltlike member said jointing mechanism constructed to pinch the beltlike member, said jointing mechanism including a feed roller which is arranged to project the most outwardly and which rotates in a specified direction for adding a feed force along a spiral wind of said beltlike member while retaining contact with a wall surface of the pipeline.

9. A pipeline-lining apparatus according to claim 8, wherein the jointing mechanism is provided with a spacer roller.

10. A method of lining a pipeline, comprising the steps of:

forming a pipe out of a long beltlike member being supplied continuously to and wound involutely within the pipeline by engaging adjoining joints formed on both edges of the beltlike members;

forming an additional length of pipe, using an additional length of beltlike member being supplied anew and ahead of the already formed pipe while leaving the already formed pipe behind;

using a jointing roller block consisting of an inner and an outer roller in such a manner that the inner roller comes into contact with the interior of the beltlike member and the outer roller comes into contact with the exterior thereof;

shaping the pipe with a forming frame having a fixed width and lateral rigidity and being radially flexible and including a link mechanism consisting of link bodies having stopping means for preventing the frame from denting radially inward, a plurality of guide rollers arranged around the mounting frame to make contact with the interior of the beltlike member and said jointing mechanism arranged on the forming frame;

pinching the beltlike member between the outer and inner rollers where the newly supplied beltlike member is closed with the already formed pipe; and driving at least the outer roller by rotation.

11. A pipeline-lining apparatus for lining a pipeline, with an additional pipe being formed out of a long beltlike member being supplied continuously to and wound involutely within the pipeline by engaging adjoining joints formed on both edges of the beltlike member, the pipeline-lining apparatus comprising:

a forming frame having a fixed width, being laterally rigid and being radially flexible;

a link mechanism including a plurality of link bodies, said link bodies including stopping means for preventing said frame from denting radially inward;

guide rollers arranged around said forming frame for contacting an interior of the pipe, and a jointing mechanism mounted to said forming frame and composed of an outer roller and an inner roller, said rollers being arranged at a jointing position where the already formed pipe is jointed with an additional length of beltlike member, said rollers arranged for pinching the beltlike member.

12. A pipeline-lining apparatus according to claim 11, wherein the jointing mechanism is provided with a spacer roller.

13. A method of lining a pipeline, comprising the steps of:

forming a pipe from a long beltlike member to be supplied continuously to and wound involutely within the pipeline by engaging adjoining joints formed on both edges of the beltlike member;

producing an additional length of pipe using an additional length of beltlike member being supplied anew and ahead of the already formed pipe portion;

using a forming frame having a fixed width, being laterally rigid and being radially flexible with a link mechanism, guide rollers arranged around the forming frame for coming into contact with the interior of the beltlike member, a joining mechanism arranged at an edge of the already formed pipe and composed of an outer roller for coming into contact with the exterior of the beltlike member and an inner roller for coming in contact with the interior of the beltlike member, wherein the joining mechanism is designed to rotate;

pinching the beltlike member between the inner and outer rollers; and shaping the pipe with a restricting frame arranged inside the forming frame to enable the forming frame to rotate around the restricting frame while keeping rigid and taking such a shape of suitable for the shape of the pipeline being different in section.

14. A pipeline-lining method of lining a pipeline according to claim 13, wherein plastic material is contained in the beltlike material.

15. A pipeline-lining apparatus for lining a pipeline, wherein a pipe is formed of a long beltlike member being supplied continuously and wound involutely with adjoining joints formed on both edges of the beltlike member being engaged, the pipeline-lining apparatus comprising:

a forming frame having a fixed width, being laterally rigid and being radially flexible, said frame including a link mechanism, guide rollers arranged around said forming frame to come in contact with the interior of the beltlike member, a jointing mechanism attached to said forming frame and composed of an outer roller and an inner roller, the rollers being arranged where the already formed pipe is closed with an additional length of beltlike member, said rollers arranged to pinch the beltlike member, and a restricting frame arranged inside of the forming frame, being rigid and having a guide rail of differing cross-section so as to restrict the forming frame from traveling.

16. A pipeline-lining apparatus according to claim 15, wherein a guide is provided between the forming and restricting frames and secured to the forming frame, and moves along the guide rail of the restricting frame.

17. A method of lining a pipeline, comprising the steps of:

forming a pipe out of a long beltlike member being supplied continuously to and wound involutely within the pipeline by engaging adjoining joints formed on both edges of the beltlike members;

using a pipe making machine mounted to a rigid mounting frame equipped with a jointing mechanism consisting of an outer roller and an inner roller being arranged at a position where an already formed pipe is closed with an additional length of beltlike member and said rollers are arranged to pinch the beltlike member;

enlarging the already formed pipe in diameter by feeding an additional length of beltlike member at a higher level than the jointing mechanism travels and by sliding the joints of the beltlike members of the already formed pipe.

18. A method of lining a pipeline according to claim 17, further comprising the steps of:

securing the mounting frame to the pipeline after a pipe is made as defined by the mounting frame; and, feeding an additional length of beltlike member to enlarge the diameter of the already formed pipe.

19. A method of lining a pipeline according to claim 17, wherein a pipe is formed as defined by the mounting frame while a newly supplied beltlike member is fed to enlarge the already formed pipe in diameter.

20. A pipeline-lining apparatus for forming, and leaving behind, a pipe out of a long beltlike member being supplied continuously to and wound involutely within the pipeline by engaging adjoining joints formed on both edges of the beltlike member with an additional length of pipe being additionally produced out of an additional length of beltlike member being supplied anew and ahead of the already formed beltlike member, the pipeline-lining apparatus comprising:

a rigid mounting frame arranged inside the pipe;

a plurality of guide rollers mounted on said mounting frame at a fixed pitch;

a jointing mechanism consisting of an outer and an inner roller mounted said mounting frame and arranged where the already formed pipe is closed with an additional length of beltlike member, said rollers arranged to pinch the beltlike member at the same time; and a plurality of feed rollers mounted to the forming frame and for making contact with the inner wall of the pipeline and rotating along the inner wall of the pipeline, and wherein at least one of the feed rollers providing the main driving operation.

* * * * *